United States Patent
Dagher et al.

(10) Patent No.: US 12,161,121 B2
(45) Date of Patent: Dec. 10, 2024

(54) **BACTERIAL AND FUNGAL METABOLITES POSSESSING ANTI-MICROBIAL ACTIVITY AGAINST *XANTHOMONAS* SPECIES, COMPOSITIONS, METHODS, KITS AND USES RELATING TO SAME**

(71) Applicant: Institut National De La Recherche Scientifique, Quebec (CA)

(72) Inventors: Fadi Dagher, Laval (CA); Eric Deziel, Rosemere (CA); Snizhana Olishevska, Montreal (CA)

(73) Assignee: Instut National De La Recherche Scientifique, Québec (CA)

( * ) Notice: Subject to any disclaimer, the term of this patent is extended or adjusted under 35 U.S.C. 154(b) by 269 days.

(21) Appl. No.: 17/373,703

(22) Filed: Jul. 12, 2021

(65) Prior Publication Data
US 2021/0337806 A1    Nov. 4, 2021

Related U.S. Application Data

(63) Continuation of application No. 16/070,703, filed as application No. PCT/CA2016/050571 on May 20, 2016, now Pat. No. 11,089,785.

(60) Provisional application No. 62/165,412, filed on May 22, 2015.

(51) Int. Cl.
| | |
|---|---|
| *A01N 63/25* | (2020.01) |
| *A01N 63/10* | (2020.01) |
| *A01N 63/22* | (2020.01) |
| *A01N 63/30* | (2020.01) |

(52) U.S. Cl.
CPC ............ *A01N 63/25* (2020.01); *A01N 63/10* (2020.01); *A01N 63/22* (2020.01); *A01N 63/30* (2020.01)

(58) Field of Classification Search
CPC ........ A01N 63/25; A01N 63/30; A01N 63/10; A01N 63/22
See application file for complete search history.

(56) References Cited

U.S. PATENT DOCUMENTS

| | | |
|---|---|---|
| 11,089,785 B2 | 8/2021 | Dagher et al. |
| 2012/0302494 A1 | 11/2012 | Guilhabert-Goya et al. |
| 2019/0230938 A1 | 8/2019 | Dagher et al. |

FOREIGN PATENT DOCUMENTS

WO    WO 2013/034940 A2    3/2013

OTHER PUBLICATIONS

Mageshwaran et al. (Isolation and parital characterization of antibacterial lipopeptide produced by Paenibacillus polymyxa HKA-15 against phytopathogen Xanthomonas campestris pv. Phaseoli M-5, World J Microbiol Biotechnol (2012) 28:909-917) (Year: 2012).*

Niu et al. (Polymyxin P is the active principle in suppressing phytopathogenic *Erwinia* spp. By the biocontrol rhizobacterium Paenibacillus polymyxa M-1, BMC Microbiology 2013, 13:137) (Year: 2013).*

Jeong et al. (Draft Genome Sequence of Paenibacillus peoriae strain KCTC 3763, Journal of Bacteriology, 2011, p. 1237-1238) (Year: 2011).*

Espinoza, C. et al., "Antibacterial activity against plant pathogens by cruded extracts and compounds from Idriella sp.," Revista Mexicana de Micologica, vol. 26; 9-15 (2008).

Ghanbarnia, K., "Modeling blackleg severity and incidence in canola and identification of molecular markers linked to a Leptosphaeria maculans avirulence gene," Doctoral thesis, University of Manitoba, Winnipeg, Manitoba, Canada (2008).

Ghazalibiglar, H., "Discovery of a Pacnibacillus isolate for biocontrol of black rot in brassicas," Doctoral Thesis, Lincoln University (1994).

Kang, Y.-S et al., "Antibacterial activity of a disaccharide isolated from *Streptomyces* sp. strain JJ45 against *Xanthomonos* sp.," Federation of European Microbiological Societies, vol. 294; 119-125 (2009).

Lorentz, R.H. et al., "Evaluation of antimicrobial activity in *Paenibacillus* spp. Strains isolated from natural environment," Letters in Applied Microbiology, vol. 43; 541-547 (2006).

Mageshwaran, V. et al., "Antibacterial activity of metabolite produced by Paenibacillus polymyxa strain HKA-15 against Xanthomonas campestris pv. phaseoli," Indian Journal of Experimental Biology, vol. 49; 229-233 (2011).

Mageshwaran, V. et al., "Isolation and partial characterization of antibacterial lipopeptide produced by paenibacillus polymyxa HKA-15 against phytopathogen Xanthomonas campestris pv. phaseoli M-5," World J. Microbiol. Biotechnol., vol. 28; 909-917 (2012).

Rabbee, M.F et al., "Bacillus velezensis: A Valuable Member of Bioactive Molecules within Plant Microbiomes," Molecules, vol. 24; 13 pages (2019).

Von der Weid, I. et al., "Antimicrobial activity of *Paenibacillus peoriae* strain NRRL BD-62 against a broad spectrum of phytopathogenic bacteria and fungi," Journal of Applied Microbiology, vol. 95; 1143-1151 (2003).

International Preliminary Report on Patentability for International Application No. PCT/CA2016/050571, entitled: "Bacterial And Fungal Metabolites Possessing Anti-Microbial Activity Against *Xanthomonas* Species, Compositions, Methods, Kits And Uses Relating To Same," mailed Nov. 28, 2017.

International Search Report for International Application No. PCT/CA2016/050571, entitled: "Bacterial And Fungal Metabolites Possessing Anti-Microbial Activity Against *Xanthomonas* Species, Compositions, Methods, Kits And Uses Relating To Same," mailed Aug. 4, 2016.

(Continued)

*Primary Examiner* — Johann R Richter
*Assistant Examiner* — Danielle Johnson
(74) *Attorney, Agent, or Firm* — Hamilton, Brook, Smith & Reynolds, P.C.

(57) ABSTRACT

Anti-microbial metabolites secreted from various bacterial and/or fungal species are described that have anti-bacterial activity against *Xanthomonas* species, which cause disease in plant hosts, including a wide variety of crops. Bacterial and fungal species producing such metabolites were identified from environmental samples (seeds, different vegetable organs and soil) from different geographic locations. Compositions, methods, uses, and kits relating to the identified anti-microbial metabolites are also described.

11 Claims, 16 Drawing Sheets

Specification includes a Sequence Listing.

(56) References Cited

OTHER PUBLICATIONS

Written Opinion for International Application No. PCT/CA2016/050571, entitled: "Bacterial And Fungal Metabolites Possessing Anti-Microbial Activity Against *Xanthomonas* Species, Compositions, Methods, Kits And Uses Relating To Same," mailed Aug. 4, 2016.
Non-Final Office Action for U.S. Appl. No. 16/070,703, mailed Jun. 30, 2020.
Notice of Allowance for U.S. Appl. No. 16/070,703, mailed Apr. 14, 2021.
Notice of Allowance for U.S. Appl. No. 16/070,703, mailed May 12, 2021.

Ali, A. et al., "Functional Analysis and Genome Mining Reveal High Potential of Biocontrol and Plant Growth Promotion in Nodule-Inhabiting Bacteria Within Paenibacillus polymyxa Complex," Frontiers in Microbiology, vol. 11; Article 618601, 16 pages (2021).
Qiu, S. et al., "Identification of fusaricidins from the antifungal microbial strain Paenibacillus sp. MS2379 using ultra-high performance liquid chromatography coupled to quadrupole time-of-flight mass spectrometry," Journal of Chromatography, vol. 1586; 91-100 (2019).
Vater, J. et al., "Characterization of Novel Fusaricidins Produced by Paenibacillus polymyxa-M1 Using MALDI-TOF Mass Spectrometry," Americal Society for Mass Spectrometry, vol. 26; 1548-1558 (2015).

* cited by examiner recA (A) not-infected, treated with water (B) infected by *X. perforans* T4, treated with TSB Infected by *X. perforans* T4, treated with water: adaxial (C) and abaxial (D) leaves surfaces Infected by *X. perforans* T4, treated with copper plus mancozeb: adaxial (E) and abaxial (F) leaves surfaces

Figure 9

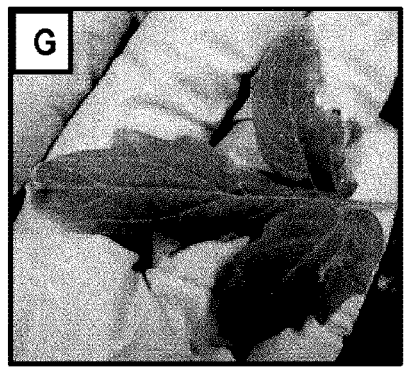
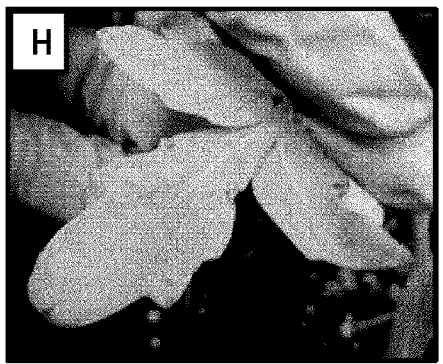

infected by *X. perforans* T4, treated by cell-free supernatant of
*B. amyloliquefaciens* subsp. *plantarum* 71: adaxial (G) and abaxial (H) leaves surfaces

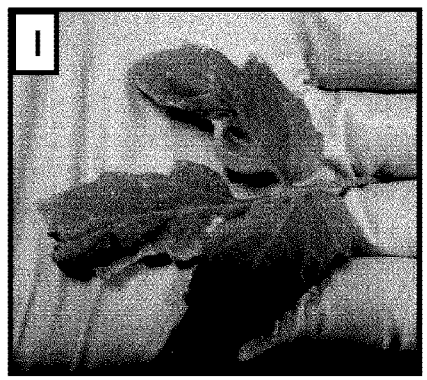
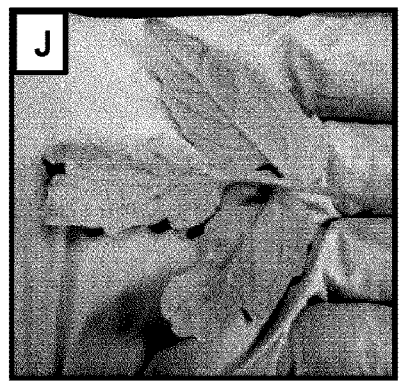

infected by *X. perforans* T4 and treated by cell-free supernatant of
*P. polymyxa* To99: adaxial (I) and abaxial (J) leaves surfaces

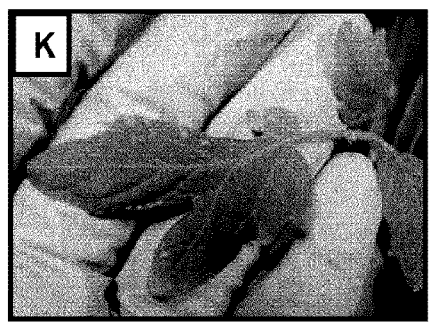

infected by *X. perforans* T4 and treated by cell-free supernatant of
*P. polymyxa* TFr101: adaxial (K) and abaxial (L) leaves surfaces

Figure 9

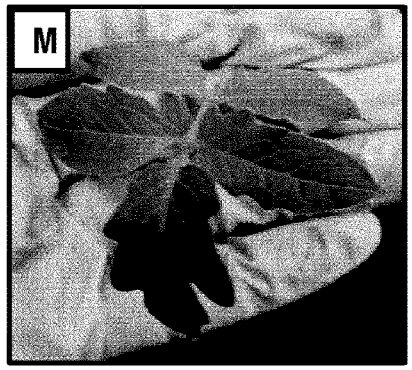 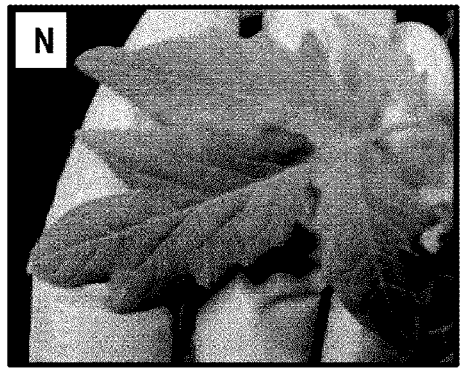

not-infected, treated with cell-free supernatant of *B. amyloliquefaciens* subsp. *plantarum* 71 (M) and *P. polymyxa* To99 (N)

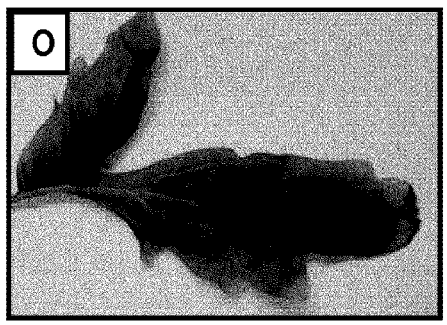 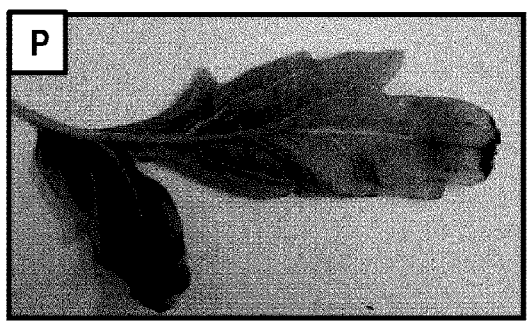

infected by *X. perforans* T4, treated with cell-free supernatant of
*B. amyloliquefaciens* subsp. *plantarum* VFb49: adaxial (O) and abaxial (P) leaves surfaces

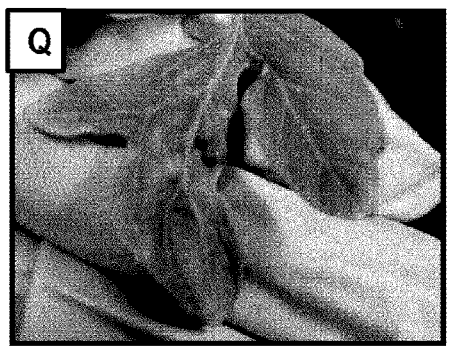 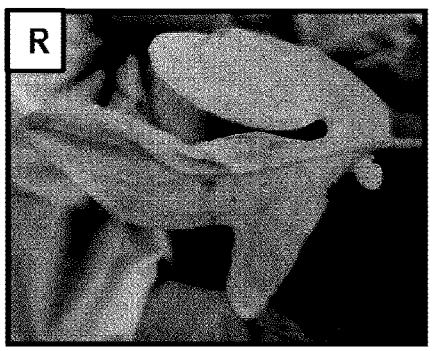

infected by *X. perforans* T4, treated with cell-free supernatant of
*P. polymyxa* 273: adaxial (Q) and abaxial (R) leaves surfaces

*Bacillus amyloliquefaciens* subsp. *plantarum* 71

*Bacillus amyloliquefaciens* subsp. *plantarum* VFb49

*Paenibacillus polymyxa* To99

*Paenibacillus polymyxa* TFr101

*Paenibacillus polymyxa* 273

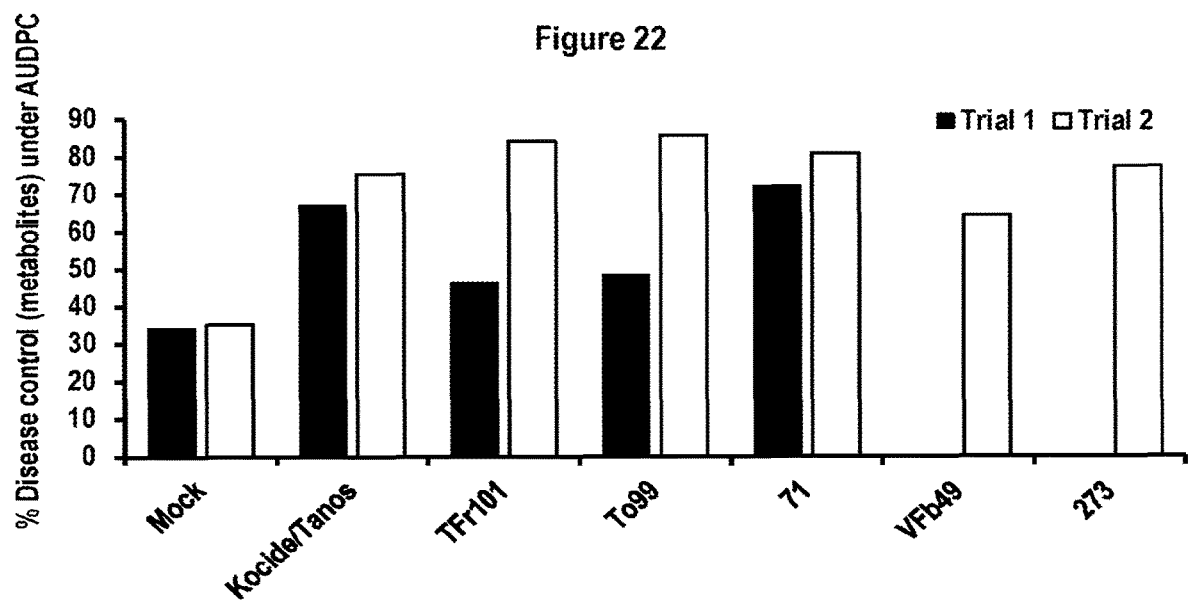
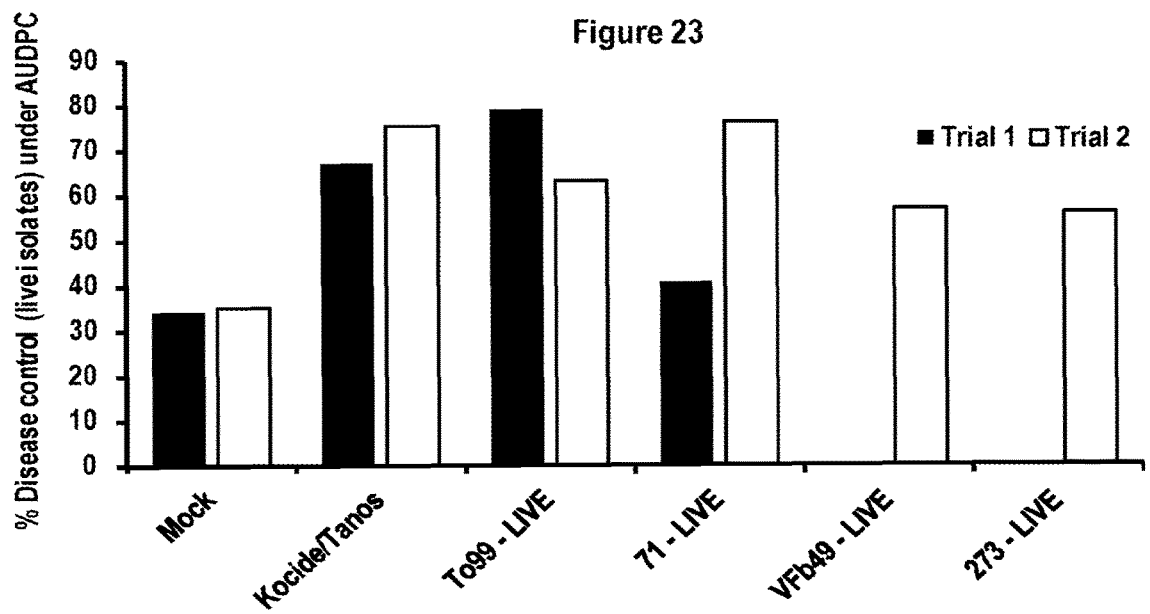

```
                            SEQUENCE LISTING

<160> NUMBER OF SEQ ID NOS: 48

<210> SEQ ID NO 1
<211> LENGTH: 20
<212> TYPE: DNA
<213> ORGANISM: ARTIFICIAL SEQUENCE
<220> FEATURE:
<223> OTHER INFORMATION: pA-27f-YM primer

<400> SEQUENCE: 1
agagtttgat ymtggctcag                                               20

<210> SEQ ID NO 2
<211> LENGTH: 20
<212> TYPE: DNA
<213> ORGANISM: ARTIFICIAL SEQUENCE
<220> FEATURE:
<223> OTHER INFORMATION: pH primer

<400> SEQUENCE: 2
aaggaggtga tccarccgca                                               20

<210> SEQ ID NO 3
<211> LENGTH: 22
<212> TYPE: DNA
<213> ORGANISM: ARTIFICIAL SEQUENCE
<220> FEATURE:
<223> OTHER INFORMATION: ITS1-F primer

<400> SEQUENCE: 3
cttggtcatt tagaggaagt aa                                            22

<210> SEQ ID NO 4
<211> LENGTH: 20
<212> TYPE: DNA
<213> ORGANISM: ARTIFICIAL SEQUENCE
<220> FEATURE:
<223> OTHER INFORMATION: ITS4 primer

<400> SEQUENCE: 4
tcctccgctt attgatatgc                                               20

<210> SEQ ID NO 5
<211> LENGTH: 19
<212> TYPE: DNA
<213> ORGANISM: ARTIFICIAL SEQUENCE
<220> FEATURE:
<223> OTHER INFORMATION: recA_FS primer

<400> SEQUENCE: 5
tgaccgccga gaagagcaa                                                19

<210> SEQ ID NO 6
<211> LENGTH: 18
<212> TYPE: DNA
<213> ORGANISM: ARTIFICIAL SEQUENCE
<220> FEATURE:
<223> OTHER INFORMATION: recA_RS primer

<400> SEQUENCE: 6
gaccgagtcg atgacgat                                                 18

<210> SEQ ID NO 7
```

-continued

```
<211> LENGTH: 18
<212> TYPE: DNA
<213> ORGANISM: ARTIFICIAL SEQUENCE
<220> FEATURE:
<223> OTHER INFORMATION: rpoB1698f primer

<400> SEQUENCE: 7
aacatcggtt tgatcaac                                                 18

<210> SEQ ID NO 8
<211> LENGTH: 20
<212> TYPE: DNA
<213> ORGANISM: ARTIFICIAL SEQUENCE
<220> FEATURE:
<223> OTHER INFORMATION: rpoB2041r primer

<400> SEQUENCE: 8
cgttgcatgt tggtacccat                                               20

<210> SEQ ID NO 9
<211> LENGTH: 23
<212> TYPE: DNA
<213> ORGANISM: ARTIFICIAL SEQUENCE
<220> FEATURE:
<223> OTHER INFORMATION: rpoB-f primer

<400> SEQUENCE: 9
aggtcaacta gttcagtatg gac                                           23

<210> SEQ ID NO 10
<211> LENGTH: 21
<212> TYPE: DNA
<213> ORGANISM: ARTIFICIAL SEQUENCE
<220> FEATURE:
<223> OTHER INFORMATION: rpoB-r primer

<400> SEQUENCE: 10
aagaaccgta accggcaact t                                             21

<210> SEQ ID NO 11
<211> LENGTH: 24
<212> TYPE: DNA
<213> ORGANISM: ARTIFICIAL SEQUENCE
<220> FEATURE:
<223> OTHER INFORMATION: gyrA-f primer

<400> SEQUENCE: 11
cagtcaggaa atgcgtacgt cctt                                          24

<210> SEQ ID NO 12
<211> LENGTH: 24
<212> TYPE: DNA
<213> ORGANISM: ARTIFICIAL SEQUENCE
<220> FEATURE:
<223> OTHER INFORMATION: gyrA-r primer

<400> SEQUENCE: 12
caaggtaatg ctccaggcat tgct                                          24

<210> SEQ ID NO 13
<211> LENGTH: 41
<212> TYPE: DNA
<213> ORGANISM: ARTIFICIAL SEQUENCE
<220> FEATURE:
<223> OTHER INFORMATION: UP-1 primer
<220> FEATURE:
<221> NAME/KEY: misc_feature
```

```
<222> LOCATION: (27)..(27)
<223> OTHER INFORMATION: n is a, c, g, or t
<220> FEATURE:
<221> NAME/KEY: misc_feature
<222> LOCATION: (30)..(30)
<223> OTHER INFORMATION: n is a, c, g, or t
<220> FEATURE:
<221> NAME/KEY: misc_feature
<222> LOCATION: (33)..(33)
<223> OTHER INFORMATION: n is a, c, g, or t

<400> SEQUENCE: 13
gaagtcatca tgaccgttct gcaygcnggn ggnaarttyg a                41

<210> SEQ ID NO 14
<211> LENGTH: 44
<212> TYPE: DNA
<213> ORGANISM: ARTIFICIAL SEQUENCE
<220> FEATURE:
<223> OTHER INFORMATION: UP-2r primer
<220> FEATURE:
<221> NAME/KEY: misc_feature
<222> LOCATION: (27)..(27)
<223> OTHER INFORMATION: n is a, c, g, or t
<220> FEATURE:
<221> NAME/KEY: misc_feature
<222> LOCATION: (33)..(33)
<223> OTHER INFORMATION: n is a, c, g, or t
<220> FEATURE:
<221> NAME/KEY: misc_feature
<222> LOCATION: (39)..(39)
<223> OTHER INFORMATION: n is a, c, g, or t

<400> SEQUENCE: 14
agcagggtac ggatgtgcga gccrtcnacr tcngcrtcng tcat            44

<210> SEQ ID NO 15
<211> LENGTH: 23
<212> TYPE: DNA
<213> ORGANISM: ARTIFICIAL SEQUENCE
<220> FEATURE:
<223> OTHER INFORMATION: UP-1S primer

<400> SEQUENCE: 15
gaagtcatca tgaccgttct gca                                   23

<210> SEQ ID NO 16
<211> LENGTH: 23
<212> TYPE: DNA
<213> ORGANISM: ARTIFICIAL SEQUENCE
<220> FEATURE:
<223> OTHER INFORMATION: UP-2Sr primer

<400> SEQUENCE: 16
agcagggtac ggatgtgcga gcc                                   23

<210> SEQ ID NO 17
<211> LENGTH: 22
<212> TYPE: DNA
<213> ORGANISM: ARTIFICIAL SEQUENCE
<220> FEATURE:
<223> OTHER INFORMATION: Sp6 primer

<400> SEQUENCE: 17
agctatttag gtgacactat ag                                    22

<210> SEQ ID NO 18
<211> LENGTH: 23
<212> TYPE: DNA
```

```
<213> ORGANISM: ARTIFICIAL SEQUENCE
<220> FEATURE:
<223> OTHER INFORMATION: T7 primer

<400> SEQUENCE: 18
ttgtaatacg actcactata ggg                                              23

<210> SEQ ID NO 19
<211> LENGTH: 23
<212> TYPE: DNA
<213> ORGANISM: ARTIFICIAL SEQUENCE
<220> FEATURE:
<223> OTHER INFORMATION: OsboP1N primer

<400> SEQUENCE: 19
cctcatgacc aggacttcgc ctt                                              23

<210> SEQ ID NO 20
<211> LENGTH: 20
<212> TYPE: DNA
<213> ORGANISM: ARTIFICIAL SEQUENCE
<220> FEATURE:
<223> OTHER INFORMATION: OsboP2N primer

<400> SEQUENCE: 20
cggtgccgag cgcttcaggt                                                  20

<210> SEQ ID NO 21
<211> LENGTH: 28
<212> TYPE: DNA
<213> ORGANISM: ARTIFICIAL SEQUENCE
<220> FEATURE:
<223> OTHER INFORMATION: SpaS_F primer

<400> SEQUENCE: 21
caaagttcga tgatttcgat ttggatgt                                         28

<210> SEQ ID NO 22
<211> LENGTH: 27
<212> TYPE: DNA
<213> ORGANISM: ARTIFICIAL SEQUENCE
<220> FEATURE:
<223> OTHER INFORMATION: SpaS_R primer

<400> SEQUENCE: 22
gcagttacaa gttagtgttt gaaggaa                                          27

<210> SEQ ID NO 23
<211> LENGTH: 20
<212> TYPE: DNA
<213> ORGANISM: ARTIFICIAL SEQUENCE
<220> FEATURE:
<223> OTHER INFORMATION: Eric_F primer

<400> SEQUENCE: 23
tcaactgacc gggcaggagc                                                  20

<210> SEQ ID NO 24
<211> LENGTH: 24
<212> TYPE: DNA
<213> ORGANISM: ARTIFICIAL SEQUENCE
<220> FEATURE:
<223> OTHER INFORMATION: Eric_R primer

<400> SEQUENCE: 24
aagtatttgg cctacagcga ctcg                                             24
```

-continued

<210> SEQ ID NO 25
<211> LENGTH: 22
<212> TYPE: DNA
<213> ORGANISM: ARTIFICIAL SEQUENCE
<220> FEATURE:
<223> OTHER INFORMATION: SUNT-F1 primer

<400> SEQUENCE: 25
gctttgttag aaggggagga at                                            22

<210> SEQ ID NO 26
<211> LENGTH: 22
<212> TYPE: DNA
<213> ORGANISM: ARTIFICIAL SEQUENCE
<220> FEATURE:
<223> OTHER INFORMATION: SUNT-R1 primer

<400> SEQUENCE: 26
cttgtcccaa cccataggat aa                                            22

<210> SEQ ID NO 27
<211> LENGTH: 20
<212> TYPE: DNA
<213> ORGANISM: ARTIFICIAL SEQUENCE
<220> FEATURE:
<223> OTHER INFORMATION: ITUC-F1 primer

<400> SEQUENCE: 27 cccccctcggt caagtgaata                                              20

<210> SEQ ID NO 28
<211> LENGTH: 20
<212> TYPE: DNA
<213> ORGANISM: ARTIFICIAL SEQUENCE
<220> FEATURE:
<223> OTHER INFORMATION: ITUC-R1 primer

<400> SEQUENCE: 28
ttggttaagc cctgatgctc                                               20

<210> SEQ ID NO 29
<211> LENGTH: 20
<212> TYPE: DNA
<213> ORGANISM: ARTIFICIAL SEQUENCE
<220> FEATURE:
<223> OTHER INFORMATION: ITUD1F primer

<400> SEQUENCE: 29
gatgcgatct ccttggatgt                                               20

<210> SEQ ID NO 30
<211> LENGTH: 20
<212> TYPE: DNA
<213> ORGANISM: ARTIFICIAL SEQUENCE
<220> FEATURE:
<223> OTHER INFORMATION: ITUD1R primer

<400> SEQUENCE: 30
atcgtcatgt gctgcttgag                                               20

<210> SEQ ID NO 31
<211> LENGTH: 22
<212> TYPE: DNA
<213> ORGANISM: ARTIFICIAL SEQUENCE
<220> FEATURE:

<223> OTHER INFORMATION: SRFA-F1 primer

<400> SEQUENCE: 31
agagcacatt gagcgttaca aa    22

<210> SEQ ID NO 32
<211> LENGTH: 22
<212> TYPE: DNA
<213> ORGANISM: ARTIFICIAL SEQUENCE
<220> FEATURE:
<223> OTHER INFORMATION: SRFA-R1 primer

<400> SEQUENCE: 32
cagcatctcg ttcaactttc ac    22

<210> SEQ ID NO 33
<211> LENGTH: 20
<212> TYPE: DNA
<213> ORGANISM: ARTIFICIAL SEQUENCE
<220> FEATURE:
<223> OTHER INFORMATION: Am1-F primer

<400> SEQUENCE: 33
cakcargtsa aaatycgmgg    20

<210> SEQ ID NO 34
<211> LENGTH: 20
<212> TYPE: DNA
<213> ORGANISM: ARTIFICIAL SEQUENCE
<220> FEATURE:
<223> OTHER INFORMATION: Tm1-R primer

<400> SEQUENCE: 34
ccdasatcaa araadttatc    20

<210> SEQ ID NO 35
<211> LENGTH: 20
<212> TYPE: DNA
<213> ORGANISM: ARTIFICIAL SEQUENCE
<220> FEATURE:
<223> OTHER INFORMATION: Af2-F primer

<400> SEQUENCE: 35
gaataymtcg gmcgtmtkga    20

<210> SEQ ID NO 36
<211> LENGTH: 20
<212> TYPE: DNA
<213> ORGANISM: ARTIFICIAL SEQUENCE
<220> FEATURE:
<223> OTHER INFORMATION: Tf1-R primer

<400> SEQUENCE: 36
gctttwadkg aatsbccgcc    20

<210> SEQ ID NO 37
<211> LENGTH: 20
<212> TYPE: DNA
<213> ORGANISM: ARTIFICIAL SEQUENCE
<220> FEATURE:
<223> OTHER INFORMATION: Ap1-F primer

<400> SEQUENCE: 37
agmcagcksg cmasatcmcc    20

```
<210> SEQ ID NO 38
<211> LENGTH: 20
<212> TYPE: DNA
<213> ORGANISM: ARTIFICIAL SEQUENCE
<220> FEATURE:
<223> OTHER INFORMATION: Tp1-R primer

<400> SEQUENCE: 38
gckatwwtga arrccggcgg                                               20

<210> SEQ ID NO 39
<211> LENGTH: 20
<212> TYPE: DNA
<213> ORGANISM: ARTIFICIAL SEQUENCE
<220> FEATURE:
<223> OTHER INFORMATION: baeR_F primer

<400> SEQUENCE: 39
atgtcagctc agtttccgca                                               20

<210> SEQ ID NO 40
<211> LENGTH: 20
<212> TYPE: DNA
<213> ORGANISM: ARTIFICIAL SEQUENCE
<220> FEATURE:
<223> OTHER INFORMATION: baeR_R primer

<400> SEQUENCE: 40
gatcgccgtc ttcaattgcc                                               20

<210> SEQ ID NO 41
<211> LENGTH: 20
<212> TYPE: DNA
<213> ORGANISM: ARTIFICIAL SEQUENCE
<220> FEATURE:
<223> OTHER INFORMATION: mlnA_F primer

<400> SEQUENCE: 41
ccgtgatcgg actggatgag                                               20

<210> SEQ ID NO 42
<211> LENGTH: 20
<212> TYPE: DNA
<213> ORGANISM: ARTIFICIAL SEQUENCE
<220> FEATURE:
<223> OTHER INFORMATION: mnlA_R primer

<400> SEQUENCE: 42
catcgcacct gccaaatacg                                               20

<210> SEQ ID NO 43
<211> LENGTH: 20
<212> TYPE: DNA
<213> ORGANISM: ARTIFICIAL SEQUENCE
<220> FEATURE:
<223> OTHER INFORMATION: bacA/B_F primer

<400> SEQUENCE: 43
tgctctgtta tagcgcggag                                               20

<210> SEQ ID NO 44
<211> LENGTH: 20
<212> TYPE: DNA
<213> ORGANISM: ARTIFICIAL SEQUENCE
<220> FEATURE:
<223> OTHER INFORMATION: bacA/B_R primer
```

```
<400> SEQUENCE: 44
gtcatcgtat cccacccgtc                                               20

<210> SEQ ID NO 45
<211> LENGTH: 20
<212> TYPE: DNA
<213> ORGANISM: ARTIFICIAL SEQUENCE
<220> FEATURE:
<223> OTHER INFORMATION: bmyA_F primer

<400> SEQUENCE: 45
ctcattgctg ccgctcaatc                                               20

<210> SEQ ID NO 46
<211> LENGTH: 20
<212> TYPE: DNA
<213> ORGANISM: ARTIFICIAL SEQUENCE
<220> FEATURE:
<223> OTHER INFORMATION: bmyA_R primer

<400> SEQUENCE: 46
ccgaatctac gaggggaacg                                               20

<210> SEQ ID NO 47
<211> LENGTH: 20
<212> TYPE: DNA
<213> ORGANISM: ARTIFICIAL SEQUENCE
<220> FEATURE:
<223> OTHER INFORMATION: dfnA_F primer

<400> SEQUENCE: 47
ggattcagga gggcataccg                                               20

<210> SEQ ID NO 48
<211> LENGTH: 20
<212> TYPE: DNA
<213> ORGANISM: ARTIFICIAL SEQUENCE
<220> FEATURE:
<223> OTHER INFORMATION: dfnA_R primer

<400> SEQUENCE: 48
attgattaaa cgcgccgagc                                               20
```

BACTERIAL AND FUNGAL METABOLITES POSSESSING ANTI-MICROBIAL ACTIVITY AGAINST *XANTHOMONAS* SPECIES, COMPOSITIONS, METHODS, KITS AND USES RELATING TO SAME

RELATED APPLICATION(S)

This application is a Continuation of U.S. application Ser. No. 16/070,703, filed May 20, 2016, which is the U.S. National Stage of International Application No. PCT/CA2016/050571, filed May 20, 2016, which designates the U.S., published in English, and claims the benefit of U.S. Provisional Application No. 62/165,412, filed May 22, 2015. The entire teachings of the above applications are incorporated herein by reference.

The present invention relates to anti-microbial metabolites from various bacterial and fungal species. More particularly, the present invention relates to bacterial and fungal metabolites having anti-microbial activity against *Xanthomonas* species.

INCORPORATION BY REFERENCE OF MATERIAL IN ASCII TEXT FILE

This application incorporates by reference the Sequence Listing contained in the following ASCII text file submitted in prior application Ser. No. 16/070,703 on Apr. 10, 2019:
   File Name: 55911000001SequenceListing.txt; created Apr. 10, 2019; 10 KB in size.

BACKGROUND

*Xanthomonas* is a genus of Gram-negative rod-shaped bacteria that acts as a plant pathogen. Many *Xanthomonas* species cause serious diseases in hundreds of plant hosts, including a wide variety of economically important crops, such as tomato, pepper, lettuce, strawberries, walnuts, rice, citrus, banana, cabbage, and bean.

Approaches to control *Xanthomonas* pathogenic species on plants include the use of non-specific chemicals such as copper-based formulations, in which copper ions bind indescriminantly to sulfhydryl groups, accounting for their non-specific biocidal and anti-bacterial activity. However, free copper ions can penetrate through plant cuticles and cause severe phytotoxicity. Furthermore, reduced copper sensitivity among *Xanthomonas* strains has been reported in some areas (i.e., some *Xanthomonas* strains became copper-tolerant), necessitating the addition of other agents such as Maneb™ or Mancozeb™ fungicides to the copper-based formulations to increase efficacy. The use of copper-based formulations may also have a negative environmental impact, since copper ions are not degraded in soil and can accumulate to high levels at locations with a history of intensive copper application.

Alternative chemical control approaches have been investigated in which chemicals are applied that activate plant defense responses. For example, Systemic Acquired Resistance (SAR) is a biochemical state of the plant in which the plant develops greater resistance to a pathogen by previous infection by that pathogen or a different pathogen. Several substances that induce SAR have been investigated (e.g., acibenzolar-S-methyl; ASM). However, such SAR inducers may reduce crop yield since it is argued that energy is spent to activate the plant defense system instead of growth.

Biological control of plant diseases may offer a safer and more specific effective alternative to the use of synthetic chemicals, and may pose less environmental concerns. There is thus a need for biological products for controlling plant pest diseases, such as *Xanthomonas* species.

SUMMARY

The present inventors have unexpectedly discovered anti-microbial metabolites secreted by various bacterial and/or fungal species that have anti-bacterial activity against *Xanthomonas* species, which cause disease in plant hosts, including a wide variety of crops. Bacterial and fungal species producing these metabolites were identified from environmental samples (seeds, different vegetable organs and soil) from different geographic locations. Compositions, methods, uses, and kits relating to the identified anti-microbial metabolites are also described herein.

Accordingly, in some aspects, the present description relates to a composition comprising metabolites from a bacterial and/or fungal species, wherein the metabolites have antimicrobial activity against *Xanthomonas* species. In some embodiments, the metabolites may be extracellular bacterial and/or extracellular fungal metabolites (e.g., secondary metabolites). In some embodiments, the metabolites may be from a: *Bacillus* species; *Paenibacillus* species; *Burkholderia* species; *Mortierella* species; *Giberella* species; *Fusarium* species; *Aspergillus* species; *Penicillium* species; or any combination thereof. In some embodiments, the metabolites may be from: *Paenibacillus polymyxa*; *Paenibacillus peoriae*; *Bacillus amyloliquefaciens*; *Burkholderia cepacia*; *Mortierella alpine*; *Giberella monilformis*; *Fusarium oxysporum*; *Aspergillus niger* Tiegh; *Aspergillus hiratsukae*; *Penicillium ochrochloron*; or any combination thereof. In some embodiments, the metabolites may be from *Burkholderia cepacia*, *Paenibacillus polymyxa*, *Paenibacillus peoriae*, and/or *Bacillus amyloliquefaciens*. In some embodiments, the metabolites may be from *Paenibacillus peoriae*. In some embodiments, the metabolites may be from *Bacillus amyloliquefaciens*. In some embodiments, the metabolites may be from *Paenibacillus polymyxa* T1B; *Paenibacillus polymyxa* 44; *Paenibacillus* sp. 62; *Paenibacillus polymyxa* 273 (since renamed as *Paenibacillus peoriae* 273); *Paenibacillus polymyxa* 329; *Paenibacillus* sp. 344; *Paenibacillus polymyxa* 390; *Paenibacillus polymyxa* To99 (since renamed as *Paenibacillus peoriae* To99; deposited on Mar. 9, 2015 at the NRRL under No NRRL B-67020); *Paenibacillus polymyxa* TP12; *Paenibacillus polymyxa* TP29; *Paenibacillus polymyxa* TP77; *Paenibacillus polymyxa* V25T; *Paenibacillus polymyxa* TFr60; *Paenibacillus* sp. TFr101 (since renamed as *Paenibacillus peoriae* TFr101; deposited on Mar. 9, 2015 at the NRRL under No NRRL B-67019); *Paenibacillus polymyxa* TAu1; *Paenibacillus polymyxa* TM54; *Bacillus amyloliquefaciens* subsp. *plantarum* 16; *Bacillus amyloliquefaciens* subsp. *plantarum* 33; *Bacillus amyloliquefaciens* subsp. *plantarum* 71 (deposited on Mar. 9, 2015 at the NRRL under No NRRL B-67021); *Bacillus amyloliquefaciens* subsp. *plantarum* 237; *Bacillus amyloliquefaciens* subsp. *plantarum* 335; *Bacillus amyloliquefaciens* subsp. *plantarum* VFb49; *Burkholderia cepacia* BC19; *Burkholderia cepacia* BC153; *Mortierella* sp. VFb1; *Giberella* sp. TFr4; *Fusarium* sp. F13S; *Aspergillus* sp. 8PT; *Aspergillus* sp. FG; *Penicillium* sp. VFr37; or any combination thereof. In some embodiments, the metabolites may be from: *Bacillus amyloliquefaciens* subsp. *plantarum* 71 (deposited on Mar. 9, 2015 at the NRRL under No NRRL B-67021); *Paenibacillus polymyxa* To99 (since renamed as *Paenibacillus peoriae* To99; deposited on Mar. 9, 2015 at the NRRL under No NRRL B-67020); *Paenibacillus polymyxa* TFr101 (since renamed as *Paenibacillus peoriae* TFr101; deposited on Mar. 9, 2015 at the NRRL under No NRRL B-67019); or any combination thereof. In some embodiments, the metabolites may have antimicrobial activity against phytopathogenic *Xanthomonas* species. In some embodiments, the metabolites may have antimicrobial activity against *Xanthomonas campestris, Xanthomonas perforans, Xanthomonas gardneri*, or any combination thereof. In some embodiments, the *Xanthomonas campestris* may comprise *Xanthomonas campestris* MAPAQ #901 and/or *Xanthomonas campestris* ED1985, or the *Xanthomonas gardneri* may comprise *Xanthomonas gardneri* DC00T7A. In some embodiments, the *Xanthomonas perforans* may comprises *Xanthomonas perforans* T1, T2, T3, T4, T5, or any combination thereof. In some embodiments, the *Xanthomonas perforans* may comprise *Xanthomonas perforans* T4. In some embodiments, the metabolites may further have antimicrobial activity against a plant and/or a human pathogenic microorganism. In some embodiments, the pathogenic microorganism may be a virus, bacteria, fungus (including a microscopic fungus), yeast, mold, or any combination thereof. In some embodiments, the pathogenic microorganism may be: *Xanthomonas euvesicatoria; Xanthomonas fragariae; Xanthomonas perforans; Xanthomonas campestris; Xanthomonas gardneri; Pseudomonas syringae; Erwinia amylovora; Burkholderia glumae; Escherichia coli; Bacillus subtilis; Staphylococcus aureus; Pseudomonas aeruginosa*; or any combination thereof. In some embodiments, the pathogenic microorganism may be: *Xanthomonas euvesicatoria* R4; *Xanthomonas gardneri* DC00T7A; *Xanthomonas fragariae* LMG 708; *Pseudomonas syringae* DC3000; *Erwinia amylovora* 435; *Burkholderia glumae* LMG10905; *Escherichia coli* 0157: H7 EDL933; *Bacillus subtilis* ED66; *Staphylococcus aureus* ED711; *Pseudomonas aeruginosa* PA416A; or any combination thereof. In some embodiments, the antimicrobial activity may comprise anti-bacterial and/or anti-fungal antagonistic activity. In some embodiments, the metabolites may exhibit higher antimicrobial activity against *Xanthomonas* species, as compared to other species. In some embodiments, the metabolites may comprise lipopeptides and/or siderophores having anti-*Xanthomonas* activity. In some embodiments, the lipopeptides and/or siderophores may be from *Bacillus* and/or *Paenibacillus*. In some embodiments, the lipopeptides may be non-ribosomal lipopeptides (NRPs). In some embodiments, the lipopeptides and/or siderophores may comprise surfactin, fengycin, plipastatin, iturin, bacilysin, bacillibactin, bacillomycin, locillomycin, paenilarvin, pelgipeptin, polymyxin, paenibacterin, fusaricidin, bacitracin, tridecaptin, or any combination thereof. In some embodiments, the metabolites may comprise plipastatin and/or locillomycin. In some embodiments, the composition defined herein may further comprise an agriculturally acceptable excipient. In some embodiments, the composition defined herein may further comprise one or more of: non-toxic carriers, surfactants, preservatives, nutrients, UV protectants, stickers, spreaders and chelating agents. In some embodiments, the composition may lack viable cells from the bacterial and/or fungal species. In some embodiments, the composition may be a cell-free composition. In some embodiments, the composition may be a cell-free supernatant. In some embodiments, the composition may comprise killed cells from the bacterial and/or fungal species. In some embodiments, the composition may lack viable cells from the bacterial and/or fungal species. In some embodiments, the composition may comprise viable cells from the bacterial and/or fungal species. In some embodiments, the composition may comprise spores from the bacterial and/or fungal species. In some embodiments, the composition may be in the form of a liquid, concentrate, powder, tablet, gel, pellets, granules, or any combination thereof. In some embodiments, the composition, once applied to a target plant, may have no detectable phytotoxic effect on the target plant, or on the fruits, nuts, or leaves thereof. In some embodiments, the composition may comprise at least 100 ppm, 200 ppm, 300 ppm, 400 ppm, 500 ppm, 600 ppm, 700 ppm, 800 ppm, 900 ppm, 1000 ppm, 1500 ppm, 2000 ppm, 2500 ppm, 3000 ppm, 3500 ppm, 4000 ppm, 4500 ppm, 5000 ppm, 5500 ppm, 6000 ppm, 6500 ppm, 7000 ppm, 8000 ppm, 8500 ppm, 9000 ppm, or 9500 ppm of the metabolites. In some embodiments, the composition may comprise between about 100 ppm, 200 ppm, 300 ppm, 400 ppm, 500 ppm, 600 ppm, 700 ppm, 800 ppm, 900 ppm, 1000 ppm, 1500 ppm, 2000 ppm, 2500 ppm, 3000 ppm, 3500 ppm, 4000 ppm, 4500 ppm, 5000 ppm, to about 10 000 ppm of the metabolites. In some embodiments, the compositions defined herein may be for use as an anti-microbial agent against a plant and/or human pathogenic microorganism. In some embodiments, the composition as defined herein may be a biopesticide.

In some aspects, the present description relates to the use of the compositions as defined herein as an anti-microbial agent against a plant and/or human pathogenic microorganism. In some aspects, the present description relates to the use of the compositions as defined herein for the manufacture of an anti-microbial agent against a plant and/or human pathogenic microorganism. In some embodiments, the pathogenic microorganism may be a *Xanthomonas* species. In some embodiments, the compositions or uses defined herein may be for application to a growing plant. In some embodiments, the growing plant may be a fruit plant, nut, cereal, vegetable, or flower. In some embodiments, the fruit may be: apple, apricot, banana, blackberry, blueberry, cantaloupe, cherry, cranberry, currant, grapes, greengage, gooseberry, honeydew, lemon, mandarin, melon, orange, peach, pears, pineapple, plum, raspberry, strawberry, tomatoes, watermelon, grapefruit, pepper, olive, or lime. In some embodiments, the nut may be: almond, beech nut, Brazil nut, butternut, cashew, chestnut, chinquapin, filbert, hickory nut, macadamia nut, pecan, walnut, or pistachio. In some embodiments, the cereal may be: amaranth, breadnut, barley, buckwheat, canola, corn, fonio, kamut, millet, oats, *quinoa*, cattail, chia, flax, kaniwa, pitseed goosefoot, wattleseed, rice, rye, sorghum, spelt, teff, triticale, wheat, or colza. In some embodiments, the vegetable may be: artichoke, bean, beetroot, broad bean, broccoli, cabbage, carrot, cauliflower, celery, chicory, chives, cress, cucumber, kale, dill, eggplant, kohlrabi, lettuce, onion, pepper, parsnip, parsley, pea, potato, pumpkin, radish, shallot, soybean, spinach, turnip, or peanut. In some embodiments, the growing plant may be a tomato plant; a pepper plant; a berry plant; a strawberry plant; lettuce; a citrus plant; a walnut plant; a rice plant; and/or a kiwi plant. In some embodiments, the flower may be: a species of the Euphorbiaceae; *Euphorbia pulcherrima* (poinsettia), *Euphorbia milii* (crown-of-thorns), *Codiaeum variegatum* (croton); a member of the family Rosaceae (Rosoideae Rosa), Begoniaceae (*Begonia*), Araceae; Dieffenbachia, *Anthurium*, Philodendreae (Philodendron), Caladieae (*Syngonium*), English ivy or another Araliaceae species; *Pelargonium* (geranium), *Ficus, Hydrangea, Zinnia*, ornamental *Prunus* species, ornamental Peppers, or another flower and/or ornamental plant susceptible to infection by *Xanthamonas*. In some embodiments, the compositions or uses defined herein may be for application to a plant cell or tissue which may be: a leaf, a stem, a flower, a fruit, a tuber, a rhizome, a corm, a root, or any combination thereof.

In some aspects, the present description relates to a method for producing a composition as defined herein, the method comprising culturing viable cells from the bacterial and/or fungal species to produce the metabolites; and harvesting the metabolites produced therefrom. In some embodiments, the viable cells may be cultured in Landy medium or Tryptic Soy Broth (TSB). In some aspects, the present description relates to an antimicrobial composition produced by a method defined herein. In some aspects, the present description relates to a method for controlling the growth of a pathogenic microorganism on a target plant or tissue; the method comprising contacting the target plant or tissue with a composition as defined herein. In some embodiments, the contacting comprising spraying, irrigating, painting, daubing, and/or fogging, onto and/or into the target plant or tissue, the target plant or tissue's hydroponic substrate, and/or the target plant or tissue's agricultural earth.

In some aspects, the present description relates to a kit for preparing an aqueous solution for use in controlling pathogens on a plant tissue of a growing plant, the kit comprising: (a) an organism as defined herein which produces metabolites having antimicrobial activity against *Xanthomonas* species, and/or a composition as defined herein; and (b) a suitable container. In some embodiments, the container may be a pouch, a tablet, or a bucket. In some embodiments, the kit may be for use in controlling infection by the pathogenic microorganism on a plant. In some embodiments, the pathogenic microorganism may be a *Xanthomonas* species.

Deposit of Biological Material

Purified cultures of each of the bacterial strains *Bacillus amyloliquefaciens* subsp. *plantarum* 71; *Paenibacillus peoriae* To99; and *Paenibacillus peoriae* TFr101 were deposited at the Agricultural Research Service Culture Collection (NRRL) (USDA, ARS, 1815 North University Street, Peoria, Ill., 61604, USA) on Mar. 9, 2015. The deposits were made under the terms of the Budapest Treaty. "*Bacillus amyloliquefaciens* subsp. *plantarum* 71" has been assigned Accession number NRRL B-67021; "*Paenibacillus peoriae* To99" has been assigned Accession number NRRL B-67020; and "*Paenibacillus peoriae* TFr101" has been assigned Accession number NRRL B-67019. At the time of the deposit, isolates To99 and TFr101 were initially identified as "*Paenibacillus polymyxa*". Further whole genome sequencing analyses presented herein (Example 7) subsequently revealed that these isolates may be more accurately classified as "*Paenibacillus peoriae*". Thus, in some sections of the present description, while the isolates To99 and/or TFr101 may be still be referred to as *Paenibacillus polymyxa*, it is understood that they may also be referred to as *Paenibacillus peoriae*, while still referring to the same deposited organisms.

BRIEF DESCRIPTION OF THE DRAWINGS

In the appended drawings:

FIGS. 20-23 show the results of four greenhouse trials that were conducted to determine the efficacy of metabolites and/or live bacterial strains to control bacterial leaf spots, as compared to standard chemicals agents.

DESCRIPTION OF ILLUSTRATIVE EMBODIMENTS

In some aspects, the present invention relates to a composition comprising metabolites from a bacterial and/or fungal species, wherein said metabolites have antimicrobial (e.g., bactericidal) activity against *Xanthomonas* species.

The use of the word "a" or "an" when used in conjunction with the term "comprising" in the claims and/or the specification may mean "one" but it is also consistent with the meaning of "one or more", "at least one", and "one or more than one".

As used herein, the term "metabolites" refers to any compound, substance or by-product obtainable by the culture or fermentation of a microorganism as described herein. In some embodiments, the metabolites of the present description may be produced by culturing microorganisms and harvesting extracellular metabolites produced therefrom (e.g., released into the culture supernatants). In other embodiments, the metabolites of the present description may be produced using recombinant DNA technology (e.g., recombinant proteins). In some embodiments, the metabolite may be a proteinaceous substance (i.e., a substance comprising a linear polymer chain of at least 3 amino acids bonded together by peptide bonds), bacteriocins, lantibiotics, lipopeptides and/or polyketides. In some embodiments, the metabolites may be extracellular bacterial and/or extracellular fungal secondary metabolites. As used herein, "secondary metabolites" refers to compounds that are not directly involved in normal growth, development, or reproduction. Unlike primary metabolites, the absence of secondary metabolites does not result in immediate death, but rather in long-term impairment of survivability, fecundity or aesthetics.

As used herein, the expression "antimicrobial" refers to the ability of the metabolites of the present description to prevent, inhibit, and/or destroy the growth of pathogenic microbes such as pathogenic bacteria and/or pathogenic fungi. In some embodiments, the expression "antimicrobial" encompasses agents or compounds exhibiting antagonistic activity against pathogenic microbes. In some embodiments, the antimicrobial activity may be in vitro antimicrobial activity or in vivo antimicrobial activity.

In some embodiments, the present description relates to metabolites having antimicrobial activity against phytopathogenic *Xanthomonas* species. As used herein, term "pathogen" or "pathogenic" refers to an organism capable of producing a disease in a plant or animal. The term "phytopathogen" as used herein refers to a pathogenic organism that infects a plant.

Figure 1:
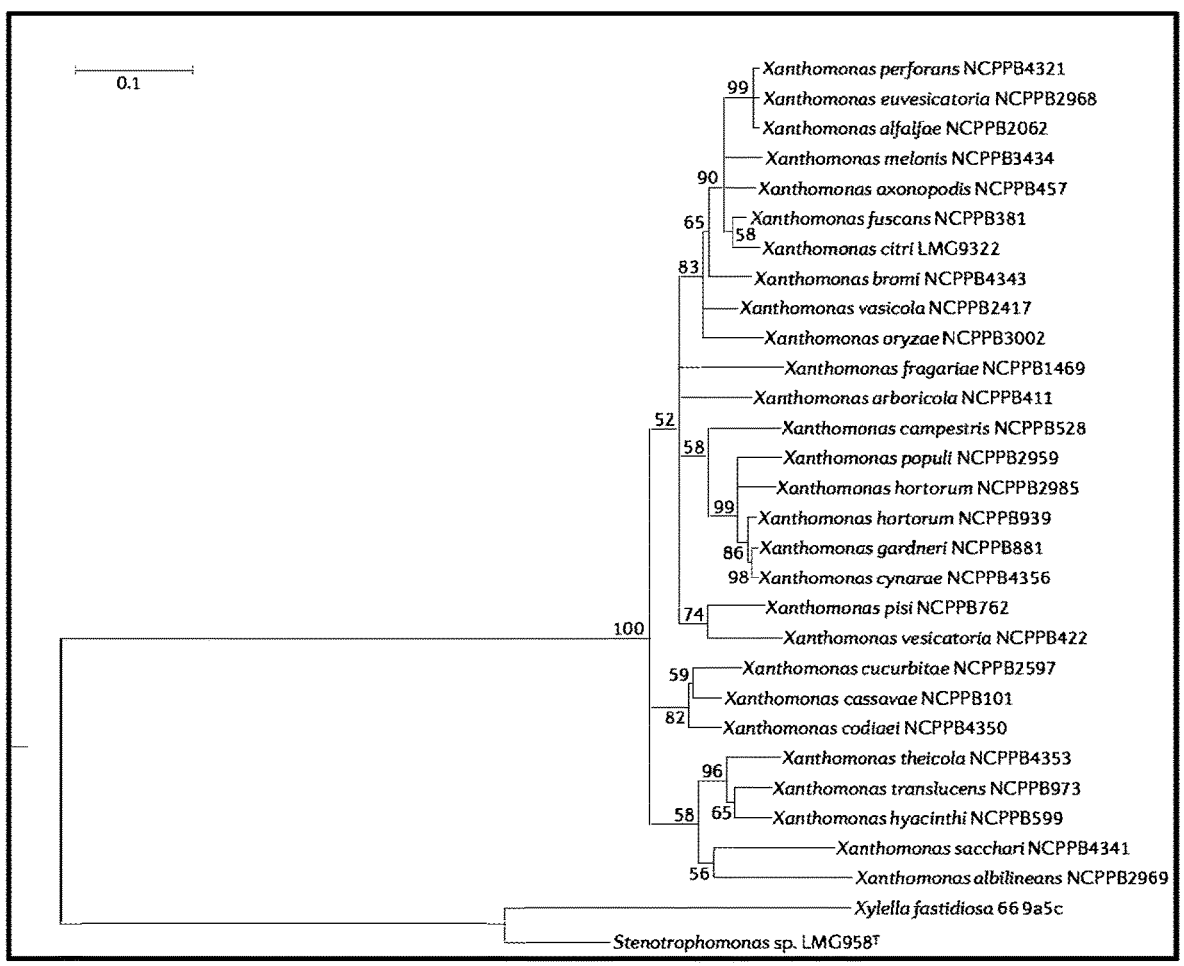
FIG. 1 shows the results of a phylogenetic analysis of bacteria within the genus *Xanthomonas* and the related genera Xylella and *Stenotrophomonas*.

As used herein, the expression "*Xanthomonas* species" refers to a microorganism belonging to the genus *Xanthomonas* (including pathogenic *Xanthomonas* species). Phylogenetic analysis of bacteria within the genus *Xanthomonas* and the related genera Xylella and *Stenotrophomonas* is shown in FIG. 1. In some embodiments, "*Xanthomonas* species" includes the *Xanthomonas* species listed in FIG. 1. Without being bound by theory, the virulence of *Xanthomonas* species may be due to their secretion of extracellular enzymes such as endoglucanases (e.g., carboxymethylcellulases) that hydrolyze cellulose. *Xanthomonas* species produce also high molecular weight exopolysaccharides (EPS) xanthan and effectors of type III secretion that contribute to its virulence (Ray et al., 2000).

In some embodiments, the metabolites of the present description may have antimicrobial activity against *Xanthomonas campestris* and/or *Xanthomonas perforans*. In more particular embodiments, the *Xanthomonas campestris* may comprise *Xanthomonas campestris* MAPAQ #901 and/or *Xanthomonas campestris* ED1985.

There are at least five races of *Xanthomonas* spp. (T1, T2, T3, T4, and T5), which were described as causal agents of bacterial spot in tomato. Jones et al. (2004) proposed a new classification for the genus, as follows: race T1 was identified as *X. euvesicatoria*; race T2 as *X. vesicatoria*, and the races T3, T4 and T5 were identified as *Xanthomonas perforans* (Jones et al., 2004). Race T4 came about as a result of a mutation in the *X. perforans* avrXv3 gene, and has become prevalent and a major problem on tomato in the state of Florida (USA). Accordingly, in some embodiments, the metabolites of the present description may have antimicrobial activity against *Xanthomonas perforans* T1, T2, T3, T4, T5, or any combination thereof. In a more particular embodiment, the metabolites of the present description may have antimicrobial activity against *Xanthomonas perforans* T4. In some instances, new phylogenic analyses of bacterial and/or fungal species (and others) have resulted in taxonomic reclassifications. Such changes in taxonomic classification are within the scope of the present invention and, regardless of future reclassifications, a person of skill in the art would be able to identify the organisms of the present description using methods described herein and other methods within the capabilities of the skilled person.

In some embodiments, the present description relates to metabolites which may be extracellular bacterial and/or extracellular fungal metabolites. As used herein, the term "extracellular" refers to the compounds that are secreted or released (either actively or passively) into the extracellular medium upon culture of viable cells, but may also include compounds that contact the extracellular medium, but which remain associated with the cell membrane.

In some embodiments, the present description relates to metabolites from a: *Bacillus* species; *Paenibacillus* species; *Burkholderia* species; *Mortierella* species; *Giberella* species; *Fusarium* species; *Aspergillus* species; *Penicillium* species; or any combination thereof. As use herein, the expression "from a [genus] species" or "obtainable from a [genus] species", refers to a compound that may be obtained (i.e., that is obtainable) from the culture or fermentation of a species belonging to the recited genus, but does not necessarily mean that the metabolite must be obtained from that particular species or from the culture of a microorganism per se. For example, compounds produced recombinantly or synthetically, but which have a structure substantially corresponding to the metabolite from the recited species, are also encompassed in the aforementioned expressions. In contrast, as used herein, the expression "produced from" is intended to refer to a compound which is obtained from the culture or fermentation of a microorganism of the present description.

In some embodiments, the present description relates to metabolites from an organism that is naturally-occurring and/or that has not been genetically modified using recombinant DNA technology, and thus qualifies as a natural biopesticide and/or natural bioproduct.

In some embodiments, the present description relates to metabolites are from a: *Bacillus* species; *Paenibacillus* species; *Burkholderia* species; *Mortierella* species; *Giberella* species; *Fusarium* species; *Aspergillus* species; *Penicillium* species; or any combination thereof.

In some embodiments, the present description relates to metabolites from: *Paenibacillus polymyxa*; *Paenibacillus peoriae*; *Bacillus amyloliquefaciens*; *Burkholderia cepacia*; *Mortierella alpine*; *Giberella moniliformis*; *Fusarium oxysporum*; *Aspergillus niger* Tiegh; *Aspergillus hiratsukae*; *Penicillium ochrochloron*; or any combination thereof. In a more particular embodiment, the metabolites may be from *Burkholderia cepacia, Paenibacillus polymyxa; Paenibacillus peoriae*; and/or *Bacillus amyloliquefaciens*. In a more particular embodiments, the metabolites may be from: *Paenibacillus polymyxa* T1B; *Paenibacillus polymyxa* 44; *Paenibacillus* sp. 62; *Paenibacillus polymyxa* 273 (since renamed as *Paenibacillus peoriae* 273); *Paenibacillus polymyxa* 329; *Paenibacillus* sp. 344; *Paenibacillus polymyxa* 390; *Paenibacillus polymyxa* To99 (NRRL B-67020; since renamed as *Paenibacillus peoriae* To99); *Paenibacillus polymyxa* TP12; *Paenibacillus polymyxa* TP29; *Paenibacillus polymyxa* TP77; *Paenibacillus polymyxa* V25T; *Paenibacillus polymyxa* TFr60; *Paenibacillus* sp. TFr101 (NRRL B-67019; since renamed as *Paenibacillus peoriae* TFr101); *Paenibacillus polymyxa* TAu1; *Paenibacillus polymyxa* TM54; *Bacillus amyloliquefaciens* subsp. *plantarum* 16; *Bacillus amyloliquefaciens* sub sp. *plantarum* 33; *Bacillus amyloliquefaciens* sub sp. *plantarum* 71 (NRRL B-67021); *Bacillus amyloliquefaciens* subsp. *plantarum* 237; *Bacillus amyloliquefaciens* subsp. *plantarum* 335; *Bacillus amyloliquefaciens* subsp. *plantarum* VFb49; *Burkholderia cepacia* BC19; *Burkholderia cepacia* BC153; *Mortierella* sp. VFb1; *Giberella* sp. TFr4; *Fusarium* sp. F13 S; *Aspergillus* sp. 8PT; *Aspergillus* sp. FG; *Penicillium* sp. VFr37; or any combination thereof.

In some embodiments, the present description relates to metabolites that may have further antimicrobial, bactericidal, and/or fungicidal activity against a plant and/or a human pathogenic microorganism, such as a virus, bacteria, fungus, yeast, mold, or any combination thereof. In some embodiments, the antimicrobial activity may comprise antagonistic activity. As used herein the terms "bactericidal" or "fungicidal" refers to the ability of a composition or substance to increase mortality or inhibit the growth rate of bacteria or fungi, respectively. In some embodiments, the pathogenic microorganism may be: *Xanthomonas euvesicatoria*; *Xanthomonas fragariae*; *Xanthomonas perforans*; *Xanthomonas campestris*; *Xanthomonas gardneri*, *Pseudomonas syringae*; *Erwinia amylovora*; *Burkholderia glumae*; *Escherichia coli*; *Bacillus subtilis*; *Staphylococcus aureus*; *Pseudomonas aeruginosa*; or any combination thereof. In a more particular embodiment, the pathogenic microorganism may be: *Xanthomonas euvesicatoria* R4; *Xanthomonas gardneri* DC00T7A; *Xanthomonas fragariae* LMG 708; *Pseudomonas syringae* DC3000; *Erwinia amylovora* 435; *Burkholderia glumae* LMG10905; *Escherichia coli* 0157:H7 EDL933; *Bacillus subtilis* ED66; *Staphylococcus aureus* ED711; *Pseudomonas aeruginosa* PA416A; or any combination thereof. In some embodiments, "mold" refers to a fungus that grows in the form of multicellular filaments called hyphae.

In some embodiments, the present description relates to metabolites that may exhibit higher antimicrobial activity against *Xanthomonas* species, as compared to other species (e.g., non-*Xanthomonas* species). In some embodiments, the metabolites of the present description are specifically active against *Xanthomonas* species. In used herein, "specifically active" means that metabolites of the present description show relatively higher antimicrobial activity against *Xanthomonas* species, than phytopathogenic non-*Xanthomonas* species.

In some embodiments, the present description relates to metabolites that may comprise lipopeptides and/or siderophores having anti-*Xanthomonas* activity such as lipopeptides and/or siderophores from *Bacillus* and/or *Paenibacillus*. In some embodiments, the lipopeptides may be non-ribosomal lipopeptides (NRPs). In some embodiments, the lipopeptides and/or siderophores may comprise one or more of surfactin, fengycin, plipastatin, iturin, bacilysin, bacillibactin, bacillomycin, locillomycin, paenilarvin, pelgipeptin, polymyxin, paenibacterin, fusaricidin, bacitracin, and tridecaptin. In some embodiments, the metabolites may comprise plipastatin and/or locillomycin.

In some embodiments, the compositions of the present description may further comprise an agriculturally acceptable excipient. As used herein, the phrase "agriculturally acceptable excipient" refers to an essentially inert substance that can be used as a diluent and/or carrier for an active agent (e.g., antimicrobial metabolites of the present description) in a composition for treatment of plants. In some embodiments, the compositions of the present description may further comprise one or more of: non-toxic carriers, surfactants, preservatives, nutrients, UV protectants, stickers, spreaders and chelating agents.

In some embodiments, the compositions of the present description may lack viable cells of the bacterial and/or fungal species from which the antimicrobial metabolites originate. In some embodiments, the compositions of the present description may be a cell-free composition (e.g., a cell-free supernatant). Cells can be removed by, for example, filtration and/or centrifugation. In some embodiments, the compositions of the present description may comprise killed cells from the bacterial and/or fungal species. In some embodiments, the compositions of the present description may comprise viable cells and/or spores from the bacterial and/or fungal species.

In some embodiments, the compositions of the present description may be in the form of a liquid, concentrate, powder, tablet, gel, paste, pellets, granules, or any combination thereof.

In some embodiments, the compositions of the present description, once applied to a target plant, may have no detectable phytotoxic effect on the target plant, or on the fruits, nuts, or leaves thereof, as compared to a control plant that is untreated (e.g., treated with water or with another agent).

In some embodiments, the compositions comprise an effective amount of antimicrobial metabolites of the present description. An "effective amount", as used herein, is an amount sufficient to effect beneficial or desired results. An effective amount can be administered in one or more administrations. In terms of treatment, inhibition or protection, an effective amount is that amount sufficient to ameliorate, stabilize, reverse, slow or delay progression of the target infection or disease states.

In some embodiments, the compositions may comprise at least 100 ppm, 200 ppm, 300 ppm, 400 ppm, 500 ppm, 600 ppm, 700 ppm, 800 ppm, 900 ppm, 1000 ppm, 1500 ppm, 2000 ppm, 2500 ppm, 3000 ppm, 3500 ppm, 4000 ppm, 4500 ppm, 5000 ppm, 5500 ppm, 6000 ppm, 6500 ppm, 7000 ppm, 8000 ppm, 8500 ppm, 9000 ppm, or 9500 ppm of the metabolites of the present description. In some embodiments, the compositions may comprise between about 100 ppm, 200 ppm, 300 ppm, 400 ppm, 500 ppm, 600 ppm, 700 ppm, 800 ppm, 900 ppm, 1000 ppm, 1500 ppm, 2000 ppm, 2500 ppm, 3000 ppm, 3500 ppm, 4000 ppm, 4500 ppm, 5000 ppm, to about 10 000 ppm of said metabolites of the present description. The term "about" is used herein to indicate that a value includes the standard deviation of error for the device or method being employed to determine the value. In general, the terminology "about" is meant to designate a possible variation of up to 10%. Therefore, a variation of 1, 2, 3, 4, 5, 6, 7, 8, 9 and 10% of a value is included in the term "about".

In some embodiments, compositions of the present description may be used as an anti-microbial (e.g., bactericidal and/or fungicidal) agent against a plant and/or human pathogenic microorganism, or for the manufacture of an anti-microbial agent for same. In some embodiments, the pathogenic microorganism may be a *Xanthomonas* species. In some embodiments, antimicrobial compositions, bacterial or fungal strains of the present description may be used for biological control. As used herein, the expression "biological control" refers to the control of a pathogen or any other undesirable organism by the use of at least a second organism other than man. An example of known mechanisms of biological control is the use of microorganisms that control root rot by out-competing fungi for space on the surface of the root, or microorganisms that either inhibit the growth of or kill the pathogen. The "host plant" in the context of biological control is the plant that is susceptible to disease caused by the pathogen. In the context of isolation of an organism, such as a bacterium or fungal species, from its natural environment, the host plant is a plant that supports the growth of the bacterium or fungus, for example, a plant of a species the bacterium or fungus is an endophyte of.

In some embodiments, the compositions defined herein may be a biopesticide or biological pesticide. As used herein, the expressions "biopesticide" and "biological pesticide" refer to non-naturally occurring commercial products that include naturally occurring metabolites/microorganisms which are formulated to have anti-microbial activity when applied to plants. Such formulations may increase the stability and/or concentrations of the metabolites/miroorganisms, which enable them to be useful as plant pesticides.

In some embodiments, the present description relates to an isolated strain of antimicrobial bacterial or fungal strains as defined herein. As used herein, an "isolated" strain of a microbe is a strain that has been removed from its natural milieu. As such, the term "isolated" does not necessarily reflect the extent to which the microbe has been purified. But in different embodiments an "isolated" culture has been purified at least 2×, 5×, 10×, 50× or 100× from the raw material from which it is isolated. As a non-limiting example, if a culture is isolated from soil as raw material, the organism can be isolated to an extent that its concentration in a given quantity of purified or partially purified material (e.g., soil) is at least 2×, 5×, 10×, 50× or 100× that in the original raw material. A "substantially pure culture" of the strain of microbe refers to a culture which contains substantially no other microbes than the desired strain or strains of microbe. In other words, a substantially pure culture of a strain of microbe is substantially free of other contaminants, which can include microbial contaminants as well as undesirable chemical contaminants. Further, as used herein, the expression "enriched culture" of an isolated microbial strain refers to a microbial culture wherein the total microbial population of the culture contains more than 50%, 60%, 70%, 80%, 90%, or 95% of the isolated strain.

In some embodiments, the present description relates to genetically modified or mutant antimicrobial bacterial or fungal strains as defined herein. As used herein, the term "mutant" making reference to a microorganism refers to a modification of the parental strain in which the desired biological activity (e.g., ability to produce antimicrobial metabolites as defined herein) is similar to or higher than that expressed by the parental strain.

In some embodiments, compositions of the present description may be applied to a growing plant, such as a fruit plant, nut, cereal, vegetable, or flower. Examples of fruit plants include: apple, apricot, banana, blackberry, blueberry, cantaloupe, cherry, cranberry, currant, grapes, greengage, gooseberry, honeydew, lemon, mandarin, melon, orange, peach, pears, pineapple, plum, raspberry, strawberry, tomatoes, watermelon, grapefruit, pepper, olive, or lime. Examples of nuts include: almond, beech nut, Brazil nut, butternut, cashew, chestnut, chinquapin, filbert, hickory nut, macadamia nut, pecan, walnut, or pistachio. Examples of cereals include: amaranth, breadnut, barley, buckwheat, canola, corn, fonio, kamut, millet, oats, *quinoa*, cattail, chia, flax, kaniwa, pitseed goosefoot, wattleseed, rice, rye, sorghum, spelt, teff, triticale, wheat, or colza. Examples of vegetables include: artichoke, bean, beetroot, broad bean, broccoli, cabbage, carrot, cauliflower, celery, chicory, chives, cress, cucumber, kale, dill, eggplant, kohlrabi, lettuce, onion, pepper, parsnip, parsley, pea, potato, pumpkin, radish, shallot, soybean, spinach, turnip, or peanut. Examples of flowers include: species of the Euphorbiaceae (e.g., *Euphorbia pulcherrima* (poinsettia), *Euphorbia milii* (crown-of-thorns), *Codiaeum variegatum* (croton)), members of the family Rosaceae (Rosoideae/Rosa), Begoniaceae (*Begonia*), Araceae (e.g., Dieffenbachia, *Anthurium*, Philodendreae (Philodendron), and Caladieae (*Syngonium*), English ivy and other Araliaceae species, *Pelargonium* (geranium), *Ficus, Hydrangea, Zinnia*, ornamental *Prunus* species, ornamental Peppers, as well as other flowers and/or ornamental plants susceptible to infection by *Xanthamonas*.

In particular embodiments, compositions of the present description may be applied to a tomato plant, a pepper plant, a berry plant (e.g., strawberry plant), lettuce, a citrus plant, a walnut plant, a rice plant, a kiwi plant, or any combination thereof.

In particular embodiments, compositions of the present description may be applied to a plant cell or tissue or organ obtained from: a leaf, a stem, a flower, a fruit, a tuber, a rhizome, a corm, a root, or any combination thereof, or a part thereof.

In some aspects, the present description relates to a method for producing a composition as defined herein, the method comprising culturing viable cells from a suitable bacterial and/or fungal species to produce the metabolites; and harvesting the metabolites of the present description produced therefrom. The term "culturing", as used herein, refers to the propagation of organisms on or in media of various kinds.

The culture media and/or culture/fermentation conditions may be modified and/or optimized to increase the anti-*Xanthomonas* activity of the metabolites that are produced. In some embodiments, Landy medium or variations thereof may be used to enhance the anti-*Xanthomonas* activity of metabolites produced by *B. amyloliquefaciens* (e.g., subsp. *plantarum* isolates 71 and VFb49). Such medium may typically contain: glucose (e.g., 20 g/L), L-glutamic acid (e.g., 5.0 g/L), yeast extract (e.g., 1.0 g/L), $K_2HPO_4$ (e.g., 1.0 g/L), $MgSO_4\text{-}7H_2O$ (e.g., 0.5 g/L), KCl (e.g., 0.5 g/L), $CuSO_4$ (e.g., 1.6 mg/L), $Fe_2(SO_4)_3$ (e.g., 1.2 mg/L), $MnSO_4$ (e.g., 0.4 mg/L). Without being bound by theory, Landy medium or variations thereof may facilitate the production of polyketides and lipopeptides (Chen et al., 2009), as well as to enhance the production of biosurfactant (e.g., Ben Ayed, Jemil et al. 2015). Furthermore, without being bound by theory, Landy medium or variations thereof may increase the production of fusaricidin-family antibiotics (e.g., Vater et al., 2015) and/or siderophore bacillibactin (e.g., Li et al., 2014). In some embodiments, tryptic soy broth (TSB) (Kim et al., 2015) or variations thereof may be used to enhance the anti-*Xanthomonas* activity of metabolites produced by *P. polymyxa* isolates (e.g., To99, TFr101 and 273). In some embodiments, fermentation may be conducted at about 30° C. (e.g., with shaking at 250 rpm). Without being bound by theory, optimization of the culture media and/or culture/fermentation conditions may improve the production and/or relative concentrations of lipopeptides (e.g., surfactin, fengycin, and/or iturin) and/or other metabolites having anti-*Xanthomonas* activity.

In some aspects, the present description relates to an antimicrobial composition produced by the aforementioned method.

In some aspects, the present description relates to a method for controlling the growth of a pathogenic microorganism on a target plant or tissue, the method comprising contacting the target plant or tissue with the composition of the present description. In some embodiments, the contacting may comprise spraying, irrigating, painting, daubing, and/or fogging, onto and/or into the target plant or tissue, the target plant or tissue's hydroponic substrate, and/or the target plant or tissue's agricultural earth.

In some aspects, the present description relates to a kit for preparing an aqueous solution for use in controlling pathogens on a plant tissue and/or plant cells of a growing plant, the kit comprising the composition as defined herein, and a suitable container. In some embodiments, the container may be a pouch, a tablet, or a bucket. In some embodiments, the kit may be used for controlling infection by the pathogenic microorganism (e.g., *Xanthomonas* species) on a plant.

In some embodiments, the compositions of the present description may be used or formulated with other antimicrobial agents, such as one or more of the agents described in Table 1.

TABLE 1

Commercially available biopesticides composed of active microorganisms

| Product: Bioagent | Mode of action | Target pathogens | Crop | Company-Registered and commercialized-Reference |
|---|---|---|---|---|
| Actinovate: *Streptomyces lydicus* | Antibiosis | Soilborne disease | Greenhouse and nursery crops, turf | Natural Industries Inc., USA McSpadden Gardner B. B. 2002 |
| *Bacillus* SPP ®: *Bacillus* spp. | Antibiosis | *Xanthomonas campestris* pv. *vesicatoria, Pseudomonas syringae* pv. *syringae* | Several crops | Bio InsumosNativa Ltda., Chili Cawoy H. et al., 2011 |
| Ballad ®: *Bacillus pumilus* | Antibiosis, competition, growth promotion, resistance induction | *Xanthomonas* spp. | Cereals, oil plants, sugar beet | AgraQuest Inc., USA Cawoy H. et al., 2011 |
| BioPro ®: *Bacillus subtilis* StrainBsBD 170 | Antibiosis | *Erwinia amylovora* | Apple, pear, oriental pear, quince, loquat | Germany, USA Zeller W., 2006 |

TABLE 1-continued

Commercially available biopesticides composed of active microorganisms

| Product: Bioagent | Mode of action | Target pathogens | Crop | Company-Registered and commercialized-Reference |
|---|---|---|---|---|
| Biosubtilin: *Bacillus subtilis* | Antibiosis, competition | *Xanthomonas* spp. | Cotton, cereals, ornamental plants and vegetable crops | Biotech International Ltd., India Cawoy H. et al., 2011 |
| BlightBanA506 ™: *Pseudomonas fluorescens* A506 | Competition of sites and nutrients | *Erwinia amylovora* and russet-inducing bacteria | Almond, apple, apricot, tomato blueberry, cherry, peach, pear, potato, strawberry, | NuFarm Inc., USA Cawoy H. et al., 2011 |
| BloomtimeBiological ™: *Pantoea agglomerans* (syn. *Erwinia herbicola*) | Antibiosis (herbicolin, pantocin A and B) | *Erwinia amylovora* | Apple, pear, oriental pear, quince, loquat | Northwest Agri Products, USA Grantastein 2014 |
| Blossom Protect ™: *Aureobasidium pullulans* (strains DSM 14940 and DSM 14941) | Antibiosis | *Erwinia amylovora* | Apple, crabapple, pear, oriental pear, quince, loquat | Bio-ferm GmbH, Austria Germany, USA, New Zealand Grantastein 2014 and Kunz et al., 2011 |
| Botrycid ®: *Burkholderia cepacia* | Antibiosis | *Xanthomonas* sp., *Erwinia* sp., *Agrobacterium* sp. | Several crops | Safer Agrobiologicos, Colombia Cawoy H. et al., 2011 |
| Cease ®: *Bacillus subtilis* | Antibiosis | *Xanthomonas* spp. | Several crops | BioWorks Inc. USA, Mexico Cawoy H. et al., 2011 |
| Cedomon ™: *Pseudomonas chlororaphis* | Antibiosis | *Pseudomonas syringae* | Barley and oats; other cereals | BioAgri AB Sweden McSpadden Gardner B. B., 2002 |
| Companion ®: *Bacillus subtilis* | Antibiosis, competition, growth promotion, resistance induction | *Xanthomonas campestris, Pseudomonas syringae* | Cotton, bean, pea, soybean, peanut, corn and others | Growth Products Ltd., USA Cawoy H. et al., 2011 |
| Galltrol ™: *Agrobacterium radiobacter* Strain 84 | Antibiosis | *Agrobacterium tumefaciens* | Fruit, nut, and ornamental nursery stock | AgBioChem Inc., USA McSpadden Gardner B .B., 2002 |
| Messenger ™: *Erwinia amylovora* (HrpNharpin protein) | Plant activator | Many | Field ornamental and vegetable crops | EDEN Bioscience Corporation, USA McSpadden Gardner B. B. 2002 |
| NacillusPro ™: *Brevibacillus parabrevis* strain N4, *Bacillus subtilis* strain N5, *Bacillus cereus* strain N6, *Bacillus cereus* strain N7 | Antibiosis, competition | *Pseudomonas syringae* pv. *syringae*, *P. syringae* pv. *tomato*, *Xanthomonas campestris* pv. *vesicatoria*, *X. campestris* pv. *coralina*, | Tomato, peppers, cucurbits, walnut, peanut, hop, leafy vegetables | Bio InsumosNativa Ltda., Chili Valdes et al., 2012 |

TABLE 1-continued

Commercially available biopesticides composed of active microorganisms

| Product: Bioagent | Mode of action | Target pathogens | Crop | Company-Registered and commercialized-Reference |
|---|---|---|---|---|
| Nogall ™: *Agrobacterium radiobacter* K1026 | Antibiosis | *Xanthomonas juglandis*, *Clavibacter michiganensis* sub sp. *michiganensis*, *Acetobacter* sp., *Erwinia caratovora* *Agrobacterium tumefaciens* | Fruit, nut, and ornamental nursery stock | Bio-care Technology, Australia/ New BioProducts Inc., Australia, USA McSpadden Gardner B. B. 2002 |
| Serenade ®: *Bacillus subtilis* strain QST 713 | Antibiosis | *Xanthomonas* spp. (bacterial spot), *Xanthomonas campestris* (walnut blight), *Erwinia amylovora* (fire blight) | Grape, apples, pear, banana, cherry, walnut, peanut, hop, leafy vegetables, tomato, peppers, cucurbits, mango, bean, onion, garlic, potato, broccoli, carrot | AgraQuest Inc., Chile, USA, New Zealand, Mexico, Japan, Israel, Costa Rica, Philippines, Guatemala, Honduras, Argentina, Italy, France, Turkey, Switzerland, Korea, Ecuador, Peru Cawoy H. et al., 2011 |

Although the present invention has been described hereinabove by way of specific embodiments thereof, it can be modified, without departing from the spirit and nature of the subject invention as defined in the appended claims.

EXAMPLES a) Example 1

Isolation and antagonistic/antimicrobial screening of microorganisms
i. 1.1 Samples for isolation of microorganisms
Different plant organs (leaves, stems and fruits) and seeds of tomatoes, peppers, onions, corns, eggplants, strawberries and raspberries, as well as soil samples from agricultural fields were collected in 2011-2013 from various locations (Table 2).

TABLE 2

Characteristics of environmental samples collected for isolation of microorganisms

| Sample | Location and date of sampling | Quantity |
|---|---|---|
| Soil of agricultural fields | Laval (Québec, Canada), November 2012 | 60 |
| Soil of agricultural fields | Sherrington (Québec, Canada), November 2011 | 11 |
| Soil from vegetable garden of INRS-Institut Armand-Frappier | Laval (Québec, Canada), November 2012 | 2 |

TABLE 2-continued

Characteristics of environmental samples collected for isolation of microorganisms

| Sample | Location and date of sampling | Quantity |
|---|---|---|
| Soil from a strawberries field | Florida Area (USA), April 2013 | 2 |
| Dead plant leaves, stems and roots from agricultural fields | Laval (Québec, Canada), November 2012 | 12 |
| Dead plant leaves, stems and roots from agricultural fields | Sherrington (Québec, Canada), November 2011 | 4 |
| Fruits and leaves of fresh plants from vegetable garden of INRS-Institut Armand-Frappier | Laval (Québec, Canada), June 2012 | 6 |
| Fruits and leaves of fresh plants | Sherrington (Québec, Canada), November 2011 | 4 |
| Fruits and leaves of tomatoes | Florida Area (USA), June and July 2012 | 4 |
| Fruits and leaves of citrus | Florida Area (USA), June 2012 | 2 |
| Leaves of garden strawberries | Florida Area (USA), July 2012 | 2 |
| Vegetables seeds (tomatoes, peppers, onions) | Provided by farmers from Laval (Québec, Canada), November 2012 | 8 |
| Ditch water | Sherrington (Québec, Canada), November 2011 | 2 |
| Mud from a river | Riviere des Prairies, Laval (Québec, Canada), June 2012 | 2 |
| Soil of rhizosphere from vegetable garden of INRS-Institut Armand-Frappier | Laval (Québec, Canada), June 2012 | 2 |
| | Total | 123 | ii. 1.2 Isolation of microorganisms from environmental samples

Media. Three solid nonselective media (R2A, Tryptic Soy Agar (TSA) agar and Plate Count Agar) and three selective media (Benedict, BCSA and Gould) with cycloheximide (50 mg/mL) were used for isolation of bacteria from environmental samples. Potato Dextrose Agar (PDA) and Malt Extract Agar (MEA) with a mix of antibiotics (streptomycin, penicillin and chloramphenicol in concentrations of 1.0, 0.5 and 0.05 mg/mL, respectively) were used for isolation of microscopic fungi.

Isolation of microorganisms from plants. Ten seeds and 3 segments (0.5 cm$^2$) randomly cut out from each leaf, stem, root and fruit were resuspended by vortexing in 5 mL of 0.85% NaCl. Aliquots (100 µL) of each suspension were spread on nonselective media and selective media plates. Plates for isolation of bacteria were incubated in the dark for 2 days at room temperature (approximately 21° C.). PDA and MEA plates were incubated in the dark for 7-10 days at 25±2° C. [Roberts and Koenraadt, 2014; International Seed Federation, 2011; Remeeus and Sheppard, 2006; Yin et al., 2011; Pusey et al., 2009; Yoshida et al., 2001].

Isolation of microorganisms from soil and water. Suspensions were prepared with 1 g of soil or 1 mL of water added to 9 mL of Phosphate-Buffered Saline (PBS), under agitation for 30 min. For isolation of sporulating bacteria, soil suspensions were preheated at +80° C. for 30 min. Sample suspensions were submitted to serial dilutions. Hundred µL of each dilution ($10^{-2}$, $10^{-3}$ and $10^{-4}$) were spread on nonselective media and selective media plates for isolation of bacteria and fungi. Plates were incubated under the same conditions described above [Zanatta et al., 2007]. Isolation of microorganisms was performed in triplicate.

Preservation of isolated bacteria and fungi. Colonies of bacteria with different morphological characteristics were transferred to tubes containing 3 mL of Tryptic Soy Broth (TSB) and were cultivated overnight at 30° C. Bacteria were preserved in 15% of glycerol at −80° C. for further manipulations.

A fragment of mycelium from a fungus colony which was morphologically different from others was picked up and transferred into a 20-mL tube with PDA slant, incubated at 25±2° C. for 14 days to form a new colony, and stored at +4° C. under a layer of mineral oil for further manipulations [Humber, 1997].

iii. 1.3 Strains Used to Evaluate the Antimicrobial Activity of Isolates

Pathogenic strains used as indicators for evaluating antagonistic and antimicrobial activity of bacterial and fungal isolates are the following: *Xanthomonas campestris* ED1985 was isolated from Sherrington lettuce leaves. *Xanthomonas campestris* 901 was received from MAPAQ-Agri-R6seau-Phytoprotection. *Xanthomonas perforans* T4 and *Xanthomonas euvesicatoria* R4 were provided by University of Florida, Plant Pathology Faculty (USA). *Xanthomonas gardneri* DC00T7A was provided by Agriculture and Agri-Food Canada (London, ON, Canada). *Xanthomonas fragariae* LMG 708 and *Burkholderia glumae* LMG10905 were received from the Belgian co-ordinated collections of microorganisms (BCCM). *Erwinia amylovora* 435 was provided by Institut de recherche et de developpement en agroenvironnement (TRDA, QC, Canada). Multi-drug resistant, clinical strains *Pseudomonas aeruginosa* PA416A and *Staphylococcus aureus* ED711, as well as *Pseudomonas syringae* DC3000 and *Bacillus subtilis* ED66 were used from the Deziel lab collection, INRS-Institut Armand-Frappier (Laval, QC, Canada). *Escherichia coli* 0157:117 EDL933 was also tested. All strains are stored in 15% glycerol at −80° C.

iv. 1.4 First Step of Screening: Antagonistic Activity Assays

Antagonistic activity of bacterial isolates against *Xanthomonas* was determined by various Petri dish plate assays.

Bacteria

Figure 2:
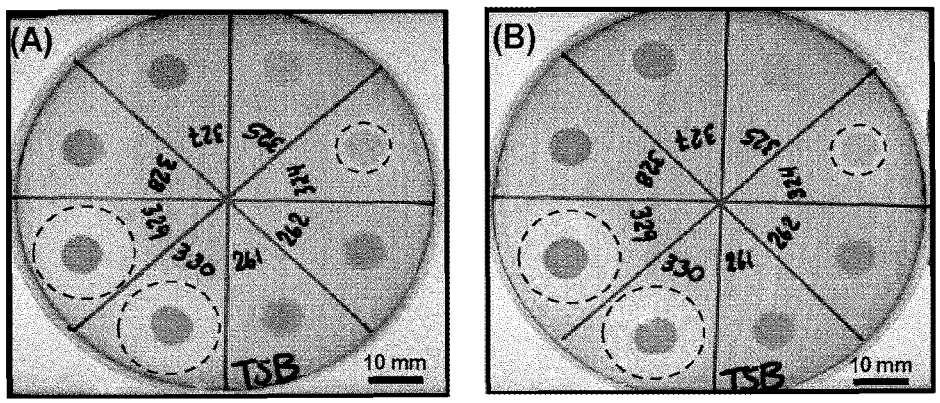
FIG. 2 shows an example of how the isolated bacterial strains were screened to identify those having antagonistic activity against *X. campestris* ED740 (A) and *X. campestris* ED1985 (B). Halo boundaries are delineated by dotted circles.

Method 1. Individual bacterial colonies were picked for each bacterial strain and incubated in 3 mL of Tryptic Soy Broth (TSB) overnight at 30° C. Five µL of each bacterial suspension was dropped on a lawn of target bacteria *X. campestris* ED1985 or *X. campestris* ED740 (OD620=0.2) on TSA plates. Petri dishes were incubated at room temperature (approx. 21° C.) for 2 days. Bacterial strains which formed a clear halo (inhibition zone) around of the colonies on the lawn of *X. campestris*, (e.g. see FIGS. 2A and B) were selected for determination of antimicrobial activity against *X. perforans* T4, the second step of screening (see below).

Figure 3:
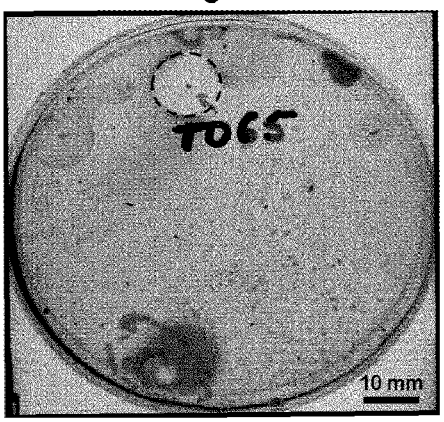
FIG. 3 shows antagonistic activity of the bacterial strain "To65" against *X. campestris* ED1985. The halo boundary around the bacterial colony of strain "To65" is indicated with a dotted circle.

Method 2. Bacterial colonies appeared on Petri dishes with nonselective and selective media after 2 days of incubation at room temperature (approx. 21° C.) were covered by a layer of 5 mL of Top Agar containing 100 µL of *X. campestris* ED1985 (OD620=0.2). Bacterial strains which formed a halo around of theirs colonies, zones of growth inhibition of *X. campestris*, (e.g., FIG. 3) were selected for determination of antimicrobial activity against *X. perforans* T4, the second step of screening (see below).

Figure 4:
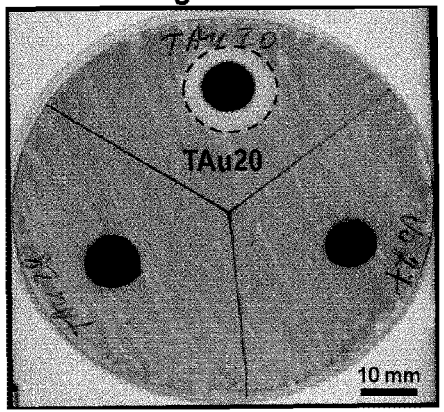
FIG. 4 shows an example of how isolated fungal strains were screened to identify those having antagonistic activity against *X. campestris* ED1985. The halo boundary around the fungal colony of strain "TAu20" is indicated with a dotted circle.

Fungi o estimate antagonistic activity of fungi against *X. campestris*, block-agar diffusion assay was used [Yoshida et al., 2001; Agarry, 2005]. First of all, 50 µL of *X. campestris* ED1985 (OD620=0.2) grown overnight in TSB at 30° C. and resuspended in sterile water was spread on TSA plates to obtain a lawn of pathogenic bacteria. The mycelial plug (10×10 mm) of fungal colony appeared after 10 days of incubation at 25±2° C. on PDA plate and was placed at the center of a lawn of *X. campestris* ED1985. All plates were incubated at room temperature (approx. 21° C.) for 2 days. After this period, the plates were checked for the presence or absence of *X. campestris* ED1985 growing inhibition halo, indicating the occurrence of antibiosis between the microorganisms tested (FIG. 4). Fungal strains formed a halo were used for determination of antimicrobial activity against *X. perforans* T4, the second step of screening.

v. 1.5 Second Step of Screening: Antimicrobial Activity Assays

For evaluation of extracellular antimicrobial activity, bacterial strains were cultivated in 3 mL of TSB at 30° C., 150 rpm for 2 days. Fungal strains were grown in 250 mL Erlenmeyer flasks containing 50 mL of Czapek-Dox Broth at 25±2° C., 150 rpm. After 10 days of incubation, fungal biomass was discarded. The cultures of bacteria and fungi were centrifuged at 18 000× g for 10 min at 20° C. To get cell-free fermentation filtrate, the supernatants of bacterial and fungal strains were separately collected and filtered (0.22 µm pore diameter) [Velmurugan, 2009; Rashid and Khan, 2000].

The antimicrobial activity against *X. perforans* T4 was assessed using well-diffusion inhibition assay [Obradovic et al., 2002; WO/2012/051699; Lindow et al., 2003]. First, a lawn of indicator bacteria was produced on the surface of the agar plates. Fifty µL of *X. perforans* T4 (OD620=0.2) grown overnight in TSB at 30° C. and resuspended in sterile water was spread on TSA plates. Wells were bored into the agar layer with a sterile glass tube (10 mm diameter) and filled with 200 µL of cell-free fermentation filtrate, taking care to avoid spillage on the surface of the medium. The plates were then incubated at room temperature (approx. 21° C.) and the inhibition diameter of *X. perforans* T4 growth around the wells was measured after 2 days. To establish the controls, 200 µL of TSB and Czapek-Dox liquid medium were added to the wells on the lawn of *X. perforans* T4 instead of cell-free fermentation filtrates. Plates were incubated under the same conditions described above. Three replicates were performed for each treatment.

vi. 1.6 Results

A total of 123 environmental samples (seeds, different vegetable tissues, and soil) from different geographic locations were used for isolation of microorganisms during the period from November 2011 to August 2013. About 5000 isolated bacterial and 333 fungal strains were tested against *X. campestris* ED740 and *X. campestris* ED1985 using antagonistic activity assay (the $1^{st}$ step of screening), as described in Example 1.4.

According to the results of the $1^{st}$ step of screening, 612 bacterial and 124 fungal strains showed inhibition zones with different areas for different strains and were considered as possessing antagonistic activity against *X. campestris* ED740 and *X. campestris* ED1985 (e.g., FIG. 2A, 2B, FIG. 3, and FIG. 4). All these isolates were stored in glycerol at −80° C. These strains were chosen for estimation of their cell-free filtrate activity against both phytopathogenic indicators.

During the $2^{nd}$ step of screening (Example 1.5), antimicrobial activity was observed in 108 bacterial and 6 fungal strains which showed growth inhibition zones with different areas for different strains (Table 2 and 3). Among them, cell-free filtrate of *Paenibacillus* and *Bacillus* species showed the strongest antimicrobial activity against *X. perforans* T4 and *X. campestris* ED740 no matter where these strains were isolated from.

Figure 5:
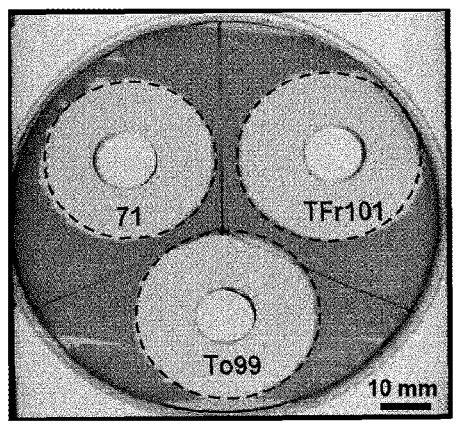
FIG. 5 shows the antimicrobial activity of three bacterial strains against *X. perforans* T4: *Bacillus amyloliquefaciens* subsp. *plantarum* 71 ("71"); *P. polymyxa* TFr101 ("TFr101"); and *P. polymyxa* To99 ("To99"). Halo boundaries are delineated by dotted circles.
Figure 6:
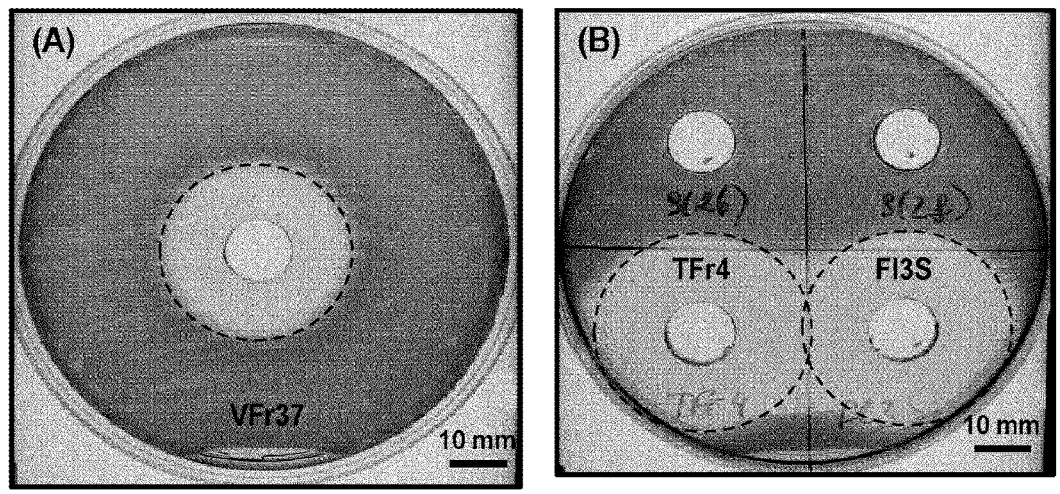
FIG. 6 shows the antimicrobial activity of several fungal strains against *X. perforans* T4: (A) *Penicillium* sp. VFr37 ("VRf37"); and (B) *Giberella* sp. TFr4 ("TFr4"), *Fusarium* sp. F13S ("F13S"). Halo boundaries are delineated by dotted circles.

Clear inhibition halos with diameter 29.0-33.0 mm were formed by cell-free filtrate of 3 bacterial and 3 fungal strains, and were retained for further analysis (FIG. 5 and FIG. 6 A, B). The same antimicrobial activity was shown against *X. campestris* ED740 (Table 3). The active strains described in Table 3 and 4 were identified using various techniques as will be discussed later.

TABLE 3

Characteristics of the most active bacterial strains against *Xanthomonas perforans* T4

| N | Bacterial isolates | Environmental sample | Medium | Diameter of growth inhibition zone (including well diameter)*, mm |
|---|---|---|---|---|
| Phylum *Firmicutes*, Class *Bacilli*, Order *Bacilliales*, Family *Paenibacilliaceae* | | | | |
| 1 | *Paenibacillus polymyxa* T1B | Soil from vegetable garden (pepper) of INRS-Institut Armand-Frappier, Laval, (Québec), 2011 | TSA | 29.5 ± 0.85 |
| 2 | *Paenibacillus polymyxa* 44 | Lettuce leaves, Sherrington (Québec), 2011 | R2A | 25.5 ± 0.28 |
| 3 | *Paenibacillus* sp. 62 | Soil of rhizosphere from lettuce, Sherrington (Québec), 2011 | R2A | 19.5 ± 0.28 |
| 4 | *Paenibacillus polymyxa* 273 | Soil of rhizosphere, Sherrington (Québec), 2011 | Benedict | 29.7 ± 0.85 |

TABLE 3-continued

Characteristics of the most active bacterial strains against *Xanthomonas perforans* T4

| N | Bacterial isolates | Environmental sample | Medium | Diameter of growth inhibition zone (including well diameter)*, mm |
|---|---|---|---|---|
| 5 | *Paenibacillus polymyxa* 329 | Soil from tomato field of INRS-Institut Armand-Frappier, Laval, (Québec), 2011 | TSA | 34.0 ± 0.91 |
| 6 | *Paenibacillus* sp. 344 | Dead lettuce plants, Sherrington (Québec), 2011 | TSA | 29.5 ± 0.28 |
| 7 | *Paenibacillus polymyxa* 390 | Stems and leaves of lettuce plants, Sherrington (Québec), 2011 | Benedict | 32.0 ± 0.28 |
| 8 | *Paenibacillus polymyxa* To99 | Soil from onion field, Laval (Québec), 2012 | TSA | 30.5 ± 0.21 |
| 9 | *Paenibacillus polymyxa* TP12 | Soil from pepper field, Laval (Québec), 2012 | PCA | 26.5 ± 0.29 |
| 10 | *Paenibacillus polymyxa* TP29 | | TSA | 28.3 ± 0.21 |
| 11 | *Paenibacillus polymyxa* TP77 | | TSA | 23.5 ± 0.29 |
| 12 | *Paenibacillus polymyxa* V25T | Soil from tomato field, Laval (Québec), 2012 | PCA | 27.5 ± 0.85 |
| 13 | *Paenibacillus polymyxa* TFr60 | Soil from strawberry field, Laval (Québec), 2012 | TSA | 24.5 ± 0.29 |
| 14 | *Paenibacillus* sp. TFr101 | Soil from strawberry field, Laval (Québec), 2012 | TSA | 32.3 ± 0.21 |
| 15 | *Paenibacillus polymyxa* TAu1 | Soil from eggplant field, Laval (Québec), 2012 | TSA | 24.7 ± 0.25 |
| 16 | *Paenibacillus polymyxa* TM54 | Soil from corn field, Laval (Québec), 2012 | TSA | 24.0 ± 0.41 |
| Phylum *Firmicutes*, Class *Bacilli*, Order *Bacilliales*, Family *Bacilliaceae* | | | | |
| 1 | *Bacillus amyloliquefaciens* subsp. *plantarum* 16 | Soil of rhizosphere from lettuce garden, Sherrington (Québec), 2011 | R2A | 16.5 ± 0.28 |
| 2 | *Bacillus amyloliquefaciens* subsp. *plantarum* 33 | Stems and leaves of lettuce plants, Sherrington (Québec), 2011 | R2A | 19.5 ± 0.28 |
| 3 | *Bacillus amyloliquefaciens* subsp. *plantarum* 71 | Soil of rhizosphere from lettuce garden, Sherrington (Québec), 2011 | R2A | 25.1 ± 0.31 |
| 4 | *Bacillus amyloliquefaciens* subsp. *plantarum* 237 | Mud from a river, Rivière des Prairies, Laval (Québec), 2012 | R2A | 21.0 ± 0.41 |
| 5 | *Bacillus amyloliquefaciens* subsp. *plantarum* 335 | Dead lettuce plants, Sherrington (Québec), 2011 | TSA* | 17.7 ± 0.28 |
| 6 | *Bacillus amyloliquefaciens* subsp. *plantarum* VFb49 | Soil from raspberry field, Laval (Québec), 2012 | TSA | 20.5 ± 0.22 |
| Phylum *Proteobacteria*, Class *Betaproteobacteria*, Order *Burkholderiales*, Family Burkholderiaceae | | | | |
| 1 | *Burkholderia cepacia* BC19 | Tomato leaves, Florida Area (USA), 2012 | BCSA | 20.0 ± 0.16 |
| 2 | *Burkholderia cepacia* BC153 | Tomato leaves, Florida Area (USA), 2012 | BCSA | 17.8 ± 0.6 |

Nonselective media: R2A, Tryptic Soy Agar (TSA), Plate Count Agar (PCA).

Selective media: *Burkholderia cepacia* selective agar (BCSA), Benedict (for *Steptomyces* species), ± Standard Error of Mean (SEM),

*Diameter of well is 10 mm.

TABLE 4

Characteristics of the most active fungal strains against *Xanthomonas perforans* T4

| N | Isolated fungal strains | Environmental sample | Similarity with type isolates based on BLAST database, % | Diameter of growth inhibition zone (including well diameter)*, mm |
|---|---|---|---|---|
| Zygomycota, Mucoromycotina, Mortierellales, Mortierellaceae | | | | |
| 1 | *Mortierella* sp. VFb 1 | Soil from strawberry bed, Laval, Québec, 2012 | *Mortierella alpina* Peyronel, 99% | 15.6 ± 0.21 |
| Ascomycota, Pezizomycotina, Sordariomycetes, Hypercreomycetidae, Hypocreales, Nectriaceae | | | | |
| 2 | *Giberella* sp. TFr4 | Soil from strawberry bed, Laval, Québec, 2012 | *Giberella moniliformis* Wineland, 99% | 32.7 ± 0.90 |
| 3 | *Fusarium* sp.F13S | Soil from strawberry bed, Florida Area (USA), 2012 | *Fusarium oxysporum* Schldtl., 99% | 31.5 ± 0.60 |
| Ascomycota, Pezizomycotina, Eurotiomycetes, Eurotiomycetidae, Eurotiales, Trichocomaceae | | | | |
| 4 | *Aspergillus* sp. 8PT | Soil pepper field, Laval, Québec, 2012 | *Aspergillus niger* Tiegh., 99% | 15.5 ± 0.22 |
| 5 | *Aspergillus* sp. FG | Tissue sample | *Neosartorya hiratsukae* Udagawa, Tsub. & *Y. Horie*(*Aspergillus hiratsukae*), 99% | 21.6 ± 0.21 |
| 6 | *Penicillium* sp. VFr37 | Soil from strawberry bed, Laval, Québec, 2012 | *Penicillium ochrochloron* Biourge, 98% | 31.5 ± 0.6 |

± Standard Error of Mean (SEM),
*Diameter of well is 10 mm

In summary, thousands of microorganisms were screened from 123 different environmental samples collected from different geographical areas for their activity against phytopathogenic *Xanthomonas* species. High anti-*Xanthomonas* activity was observed in 108 bacterial and 6 fungal isolates, which showed growth inhibition zones with different areas for different strains. The most active isolates were identified using microscopic diagnostic, biochemistry assays, fatty acid analysis and genes sequencing. Unexpectedly, most of the bacterial isolates having the highest activity against *Xanthomonas* species belonged to the genus *Paenibacillus* (16 isolates) and *Bacillus* (6 isolates). Interestingly, fifteen isolates of *Paenibacillus* were identified as *Paenibacillus polymyxa* and one isolate was identified as *Paenibacillus jamilae*. All six isolates of the genus *Bacillus* were identified as *B. amyloliquefaciens* subsp. *plantarum*. Thus, not only *Paenibacillus* species but also *Bacillus* species were found to be active against pathogenic *Xanthomonas* bacteria.

It is worth mentioning, that fungi and other bacteria such as *Burkholderia* (Tables 3 and 4) were also found to be active against *Xanthomonas* species. Thus, activity against *Xanthomonas* pathogenic strains is not limited to *Bacillus* and *Paenibacillus* species but it is most prevalent in these two species.

b) Example 2

Identification of Bacterial and Fungal Isolates i. 2.1 DNA extraction of the isolates A 1.5 mL of overnight culture in TSB was pelleted in a microcentrifuge tube at 13000 rpm for 10 minutes. The supernatant was then discarded and the pellet was resuspended in 1 mL of extraction buffer (50 mM Tris-HCl, 5 mM EDTA, 3% SDS, pH 8). The resuspended cells were transferred in a microtube containing 150-200 mg of sterile glass beads. The tubes were then placed in the Fastprep™ for 50 seconds at a 4 m/s speed, for two rounds and put on ice for 2 minutes between the rounds. The broken cells were then centrifuged at 13000 rpm for 10 minutes and the supernatant was mixed with 1:5 volume of ammonium acetate 10 N. The mixture was vortexed, placed on ice for 5 minutes, and centrifuged at 13000 rpm for 15 minutes at 4° C. The supernatant was placed on ice for 5 minutes and centrifuged again at 13000 rpm for 15 minutes at 4° C. The supernatant was then mixed with 1:1 volume of ice-cold isopropanol, and the DNA was precipitated for 1-2 hours at 4° C. The tubes were centrifuged at 13000 rpm for 15 minutes at 4° C. and the supernatant was discarded. 500 μL of ice-cold 70% was added to the pellet to wash the precipitated DNA and centrifuged at 13000 rpm for 15 minutes at 4° C. The supernatant was discarded and the pellet was dried under the biosafety cabinet. The dry DNA pellet was resuspended in 50 μL of sterile $ddH_2O$ and kept at −20° C. All the DNA samples were dosed and diluted to a final concentration of 50 ng/μL [Nakamura, 1987; Aguilera et al., 2001; Priest et al., 1987].

ii. 2.2 16S rRNA and 18S rRNA gene sequence analysis

In order to identify the isolates that showed the strongest anti-*Xanthomonas perforans* activity, PCR amplification of the gene coding for 16S rRNA (for 18 bacterial isolates) or 18S rRNA (for 6 fungal isolates) was performed using primers well described in the literature (Table 5) [Priest et al., 1987; Frank et al., 2008].

TABLE 5

Primers used to determine 16S and 18S rRNA gene sequences of bacterial and fungal isolates

| Primers | Target | Sequence5'→3' | Product size | Reference |
|---------|--------|---------------|--------------|-----------|
| pA-27f-YM<br>pH | 16S rDNA | AGAGTTTGATYMTGGCTCAG<br>(SEQ ID NO: 1)<br>AAGGAGGTGATCCARCCGCA<br>(SEQ ID NO: 2) | 1.6 kb | Frank et al., 2008 |
| ITS1-F<br><br>ITS4 | 18S rDNA,<br>ITS regions | CTTGGTCATTTAGAGGAAGTAA<br>(SEQ ID NO: 3)<br>TCCTCCGCTTATTGATATGC<br>(SEQ ID NO: 4) | 750 bp | Martin and Rygiewicz, 2005 |

PCR-amplifications were carried out in a 50-μL reaction mixture (Table 6) containing Feldan Taq DNA Polymerase (Bio Basic Canada Inc., Markham, Ontario, Canada).

TABLE 6

Reaction mixture
In a final volume of 50 μL

| 1X | Taq buffer |
| 200 μM | dNTPs mix |
| 0.4 μM | Primer F |
| 0.4 μM | Primer R |
| 1 unit | Taq DNA polymerase |
| 50 ng | DNA extract |

The amplifications were performed in a C1000 Touch™ Thermal Cycler (Bio-Rad Laboratory Inc., Canada) using specific PCR temperature protocol (Table 7).

TABLE 7

PCR Program for amplification of 16S and 18S rRNA fragments of bacterial and fungal isolates

| Step | 16S | 18S | Protocol |
|------|-----|-----|----------|
| 1 | 5 min 95° C. | 5 min 95° C. | initial denaturation |
| 2 | 30 s 95° C. | 30 s 95° C. | denaturation |
| 3 | 40 s 55° C. | 30 s 59° C. | annealing |
| 4 | 1.5 min 72° C. | 50 s 72° C. | elongation |
| 5 | Repeat steps 2 to 4 | Repeat steps 2 to 4 | 29 times |
| 6 | 10 min 72° C. | 10 min 72° C. | final elongation |
| 7 | ∞ 4° C. | ∞ 4° C. | stop PCR reaction and refrigerate DNA products |
|   | end | end | |

After DNA amplification, PCR products were analyzed by agarose gel electrophoresis (1.0% of agarose, 100V, 60 min), DNA was stained by ethidium bromide (0.5 pg/mL), and visualized under UV illumination.

All PCR products were purified on a 1% agarose gel using a Gel extraction kit (Bio Basic Canada Inc., Markham, Ontario, Canada) and sent to the sequencing platform to Institut de recherches cliniques de Montreal (IRCM). The same primers were used for the initial PCR reaction and the sequencing reactions.

The obtained sequences of each isolate were processed with the BioEdit™ sequence alignment editor and analyzed using the basic local alignment search tool (BLAST) sequence alignment system (http://blast.ncbi.nlm.nih.gov/Blast.cgi?PROGRAM=blastn&PAGE TYPE=BlastSearch&LINK LOC=blasthome), using the 16S ribosomal RNA sequences for Bacteria and Archaea and the nucleotide collection (nr/nt) for Fungi databases. This search tool was developed by the National Center for Biotechnology Information (NCBI) (US). If the sequence identity is above 99%, we could conclude that bacterial isolate belongs to the same species, and if the identity is higher than 97, strains are classified into the same genus or the same family.

A 1.6 kb 16S rRNA and 750 bp 18S rRNA and ITS regions fragments were amplified and sequenced from bacterial and fungal isolates respectively. Twenty-four bacterial and six fungal isolates were identified by gene sequencing (Table 8). Thus, using the BLAST alignment system, 2 bacterial isolates belong to the *Burkholderia cepacia* complex, 16 isolates belong to the *Paenibacillus* genus and 6 isolates belong to the *Bacillus subtilis* group. The 6 fungal isolates were identified as *Mortierella alpina* Peyronel; *Gibberella moniliformis* Wineland; *Fusarium oxysporum* Schltdl; *Aspergillus niger* Tiegh; Neosartorya hiratsukae Udagawa, Tsub. & Y. Horie (*Aspergillus hiratsukae*); and *Penicillium ochrochloron* Biourge (Table 8).

BLAST analysis of pairwise alignment of 16S rDNA sequences were highly similar to each other within the same genus and could not be used to distinguish different but closely related bacterial species, as *P. polymyxa, P. peoriae, P. jamilae* and *P. kribbensis* (Table 8). Thus, the next step was the strain identification by sequencing of specific genes of *Burkholderia cepacia* complex, *Paenibacillus* species and *Bacillus subtilis* group.

TABLE 8

16S and 18S rRNA gene sequence identification of bacterial and fungal isolates

| Isolate | Microorganism | % of similarity |
|---|---|---|
| | Bacteria | |
| 19 | *Burkholderia cepacia* complex | 99% |
| 153 | *Burkholderia cepacia* complex | 99% |
| 62 | *Paenibacillus polymyxa/P. peoriae* | 99% |
| 344 | *Paenibacillus polymyxa/P. peoriae/P. jamilae/P. kribbensis* | 96-97% |
| TFr101 | *Paenibacillus polymyxa/P. peoriae/P. jamilae/P. kribbensis* | 99% |
| V25T | *Paenibacillus polymyxa/P. peoriae/P. jamilae/P. kribbensis* | 99% |
| TP77 | *Paenibacillus polymyxa/P. peoriae/P. jamilae/P. kribbensis* | 99% |
| 329 | *Paenibacillus polymyxa/P. peoriae/P. jamilae/P. kribbensis* | 99% |
| T1B | *Paenibacillus polymyxa/P. peoriae/P. jamilae/P. kribbensis* | 99% |
| TP12 | *Paenibacillus polymyxa/P. peoriae* | 99% |
| 390 | *Paenibacillus polymyxa/P. peoriae/P. jamilae/P. kribbensis* | 99% |
| 273 | *Paenibacillus polymyxa/P. peoriae/P. jamilae/P. kribbensis* | 99% |
| TAu1 | *Paenibacillus polymyxa/P. peoriae/P. jamilae/P. kribbensis* | 99% |
| 44 | *Paenibacillus polymyxa/P. peoriae/P. jamilae/P. kribbensis* | 99% |
| To99 | *Paenibacillus polymyxa/P. peoriae/P. jamilae/P. kribbensis* | 99% |
| TFr60 | *Paenibacillus polymyxa/P. peoriae/P. jamilae/P. kribbensis* | 99% |
| TM54 | *Paenibacillus polymyxa/P. peoriae/P. jamilae/P. kribbensis* | 99% |
| TP29 | *Paenibacillus polymyxa/P. peoriae/P. jamilae/P. kribbensis* | 99% |
| VFb49 | *Bacillus subtilis* group | 99% |
| 33 | *Bacillus subtilis* group | 100% |
| 335 | *Bacillus subtilis* group | 97% |
| 71 | *Bacillus subtilis* group | 98% |
| 16 | *Bacillus subtilis* group | 99% |
| 237 | *Bacillus subtilis* group | 99% |
| | Fungi | |
| VFb1 | *Mortierella alpina* Peyronel | 99% |
| TFr4 | *Gibberella moniliformis* Wineland | 99% |
| FI3S | *Fusarium oxysporum* Schltdl. | 99% |
| 8PT | *Aspergillus niger* Tiegh. | 99% |
| FG | *Neosartorya hiratsukae* Udagawa, Tsub. & Y. Horie (*Aspergillus hiratsukae*) | 99% |
| VFr37 | *Penicillium* sp., *Penicillium ochrochloron* Biourge | 99%-98% | iii. 2.3 Amplification of specific genes from *Burkholderia* and *Paenibacillus* species BURKHOLDERIA Isolates 19 and 153 of the *Burkholderia cepacia* complex were identified by recA sequence analysis. Fragment of recA gene was amplified in a 25-µL reaction mixture (Table 9) using recA_FS/recA_RS primer pairs (Table 10) and specific temperature protocol (Table 11). After DNA amplification, recA fragments were analyzed by agarose gel electrophoresis, stained by ethidium bromide, and visualized under UV illumination.

Gel electrophoresis of PCR products was done using 1.0% agarose in the presence of a molecular size standard (GeneRuler™ 1Kb DNA Ladder, Fermentas) and sent for sequencing. *Burkholderia cepacia* ATCC 25416 was used as positive control. The same primers were used for the initial PCR reaction and the sequencing reactions.

The obtained sequences of recA gene were processed with the BioEdit™ sequence alignment editor and analyzed using NCBI BLAST sequence alignment system (http://blast.ncbi.nlm.nih.gov/Blast.cgi?PROGRAM=blastn&PAGE_TYPE=BlastSearch&LINK_LOC=blasthome).

TABLE 9

Reaction mixture
In a final volume of 25 µL

| | | |
|---|---|---|
| 1X | Taq buffer | |
| 200 µM | dNTPs mix | |
| 0.4 µM | Primer(s) F | |
| 0.4 µM | Primer(s) R | |
| 1 unit | Taq polymerase | DNA |
| 50 ng | Bacterial extract | DNA |

TABLE 10

Primers used to determine the recA gene of *Burkholderia cepacia* complex isolates

| Primers | Target | Sequence 5'→3' | Product size | Reference |
|---|---|---|---|---|
| recA_FS | recA gene | TGACCGCCGAGAAGAGCAA (SEQ ID NO: 5) | 390 bp | Baldwin et al., 2005 |
| recA_RS | | GACCGAGTCGATGACGAT (SEQ ID NO: 6) | | |

TABLE 11

Temperature program for amplification of recA DNA fragments of Burkholderia isolates

| Step | Protocol | |
|---|---|---|
| 1 | 5 min 95° C. | initial denaturation |
| 2 | 30 s 95° C. | denaturation |
| 3 | 45 s 58° C. | annealing |
| 4 | 1 min 72° C. | elongation |
| 5 | Repeat steps 2 to 4 | 29 times |
| 6 | 10 min 72° C. | final elongation |
| 7 | ∞ 4° C. | stop PCR reaction and refrigerate DNA products |
| 8 | end | |

Figure 7:
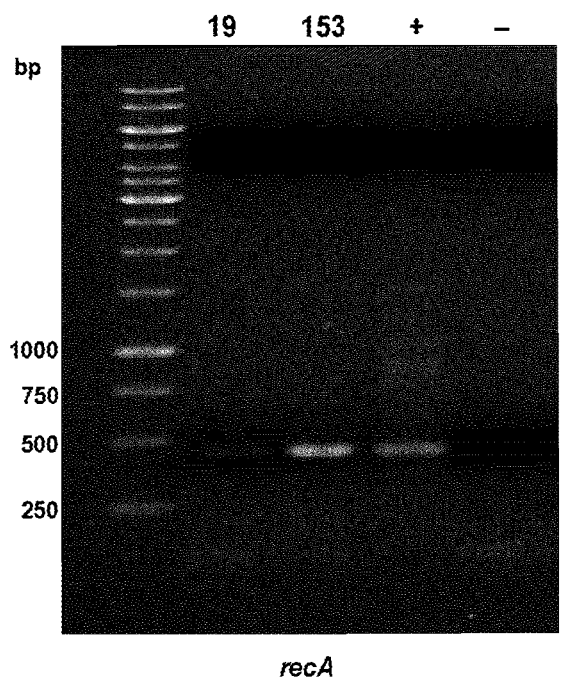
FIG. 7 shows the agarose gel electrophoresis profiles of a PCR-amplified 390-bp region of the recA gene in two bacterial isolates: "19" and "153". "+" is *Burkholderia cepacia* ATCC 25416, "−" is a negative control. Molecular sizes in base pairs of the DNA standard (GeneRuler™ 1 Kb DNA Ladder, Fermentas) are indicated in the left-hand margin.

Based on the 390 bp sequence of recA gene, bacterial isolates 19 and 153 showed 99% similarity with *Burkholderia cepacia* strains from GeneBank data base of NCBI. Thus, they were identified as *B. cepacia* (FIG. 7).

Paenibacillus

In order to refine the identification of *Paenibacillus* sp. isolates, the rpoB gene was amplified using the primer pair rpoB1698f/rpoB2041r (Table 12). PCR-amplifications were carried out in a 25-μL reaction mixture (Table 13). The amplifications were performed using specific PCR temperature protocol (Table 14).

TABLE 12

Primers used to determine the rpoB gene of *Paenibacillus* isolates

| Primers | Target | Sequence 5'→3' | Product size | Reference |
|---|---|---|---|---|
| rpoB1698f | rpoB gene | AACATCGGTTTGATCAAC (SEQ ID NO: 7) | 240 bp | Dahllof et al., 2000; da Mota et al., 2005 |
| rpoB2041r | | CGTTGCATGTTGGTACCCAT (SEQ ID NO: 8) | | |

TABLE 13

Reaction mixture
In a final volume of 25 μL

| | |
|---|---|
| 1X | Taq buffer |
| 200 M | dNTPs mix |
| 0.4 μM | Primer rpoB1698f |
| 0.4 μM | Primer rpoB2041r |
| 1 unit | Taq DNA polymerase |
| 50 ng | Bacterial DNA extract |

TABLE 14

Temperature program for amplification of rpoB DNA fragments of *Paenibacillus* isolates

| Step | Protocol | |
|---|---|---|
| 1 | 5 min 95° C. | initial denaturation |
| 2 | 30 s 95° C. | denaturation |
| 3 | 40 s 55° C. | annealing |
| 4 | 35 s 72° C. | elongation |
| 5 | Repeat steps 2 to 4 | 29 times |
| 6 | 10 min 72° C. | final elongation |
| 7 | ∞ 4°C | stop PCR reaction and refrigerate DNA products |
| 8 | end | |

After DNA amplification, rpoB fragments were analyzed by agarose gel electrophoresis, stained by ethidium bromide and visualized under UV illumination.

All PCR products were purified on a 1% agarose gel using a Gel extraction kit (Bio Basic Canada Inc., Markham, Ontario, Canada) and sent for sequencing. The same primers were used for the initial PCR reaction and the sequencing reactions. The obtained sequences of the rpoB gene of *Paenibacillus* sp. were processed with the BioEdit™ sequence alignment editor and analyzed using the basic local alignment search tool (BLAST) sequence alignment system: (http://blast.ncbi.nlm.nih.gov/Blast.cgi?PROGRAM=blastn&PAGE_TYPE=BlastSearch&LINK_LOC=blasthome).

Based on the sequence of the rpoB gene, 16 isolates of *Paenibacillus* sp. were divided in three groups based on their similarity with species from GeneBank data base (NCBI). The first group includes four isolates 44, To99, TM54 and TP29 which showed 100% similarity with *P. polymyxa*. The second group represents nine isolates that had 99% nucleotide identity with *P. polymyxa*. Thus, thirteen isolates were preliminary identified as *Paenibacillus polymyxa*. The third group includes isolates 62, 344 and TFr101 showed 94-96% of similarity with *P. polymyxa* and *P. peoriae* (Table 15).

Since the identification of these 3 isolates based on rpoB DNA sequence identification were not clear enough, biochemical methods using Biolog™ microbial identification system (BIOLOG Inc., Hayward, USA) and fatty acid analysis (Keystone Labs Inc., Edmonton, Alberta, Canada) were performed to refine the identification.

TABLE 15

Identification of *Paenibacillus* sp. isolates by rpoB DNA sequencing

| Isolate | Microorganism | % of similarity |
|---|---|---|
| 62 | *Paenibacillus polymyxa/P. peoriae* | 95-96% |
| 344 | *Paenibacillus polymyxa/P. peoriae* | 94-96% |
| TFr101 | *Paenibacillus polymyxa/P. peoriae* | 95-96% |
| V25T | *Paenibacillus polymyxa* | 99% |
| TP77 | *Paenibacillus polymyxa* | 99% |
| 329 | *Paenibacillus polymyxa* | 99% |
| T1B | *Paenibacillus polymyxa* | 99% |
| TP12 | *Paenibacillus polymyxa* | 99% |
| 390 | *Paenibacillus polymyxa* | 99% |
| 273 | *Paenibacillus polymyxa* | 99% |
| TAu1 | *Paenibacillus polymyxa* | 99% |
| 44 | *Paenibacillus polymyxa* | 100% |
| To99 | *Paenibacillus polymyxa* | 100% |
| TFr60 | *Paenibacillus polymyxa* | 99% |
| TM54 | *Paenibacillus polymyxa* | 100% |
| TP29 | *Paenibacillus polymyxa* | 100% | iv. 2.3a Biolog™ analyses of *Paenibacillus* species

To refine the identification of *Paenibacillus* species, the biochemical test system Biolog™ GENIII MicroPlate (OmniLog) was used. It allows analyzing a microorganism in 94 phenotypic tests: 71 carbon source utilization assays and 23 chemical sensitivity assays. Several isolates from each group mentioned above were chosen for performing this test. Well known *Paenibacillus polymyxa* and *P. peoriae* strains (*P. polymyxa* ATCC7070, *P. polymyxa* CR1, *P. peoriae* LMG 16104, *P. peoriae* LMG 16111), as well as type strains: *P. polymyxa* LMG 13294, *P. peoriae* LMG 14832 and *P. jamilae* LMG 21667 were used for comparison with our isolates.

The isolates to be identified were grown on TSA and then resuspended in a special gelling inoculating fluid. Then, bacterial cell suspension was inoculated into the GENIII MicroPlate and incubated at 34° C. for 24 h to allow the phenotypic fingerprint to form. After incubation, the phenotypic fingerprints of purple wells were compared within isolates, known *Paenibacillus polymyxa* and *P. peoriae* strains and type strains of these species.

The carbohydrate utilization capabilities and chemical sensitivity of bacterial isolates are shown in Table 16. In general, obtained results of 94 biochemical tests revealed 11 differences between bacterial isolates and *P. polymyxa* LMG 13294 type strain, while there were less differences between the presently tested isolates and *P. polymyxa* CR1 (non type strain), as well as *P. jamilae* LMG 21667 (type strain). In two cases, utilization of methyl pyruvate, L-malic acid, bromo-succinic acid, and sensitivity to pH 5, 4% NaCl, rifamycin SV, lithium chloride varied within strains of tested bacterial isolates, type strains and well known non type strains (Table 16).

TABLE 16

Phenotypic characterization of *Paenibacillus* isolates and known *Paenibacillus* strains
Phenotypic characterization of *Paenibacillus* isolates and known *Paenibacillus* strains

| Test | *P. polymyxa* LMG 13294 (type) | *P. polymyxa* ATCC7070 | *P. polymyxa* CR1 | *P. peoriae* LMG 14832 (type) | *P. peoriae* LMG 16104 | *P. peoriae* LMG 16111 | *P. jamilae* LMG 21667 | TP29 | To99 | 390 | 273 | 329 | V25T | 62 | 344 | TFr101 |
|---|---|---|---|---|---|---|---|---|---|---|---|---|---|---|---|---|
| | | | | | carbon source utilization assays | | | | | | | | | | | |
| Dextrin | + | + | + | + | + | + | + | + | + | + | + | + | + | + | + | + |
| D-Maltose | + | + | + | + | + | + | + | + | + | + | + | + | + | + | + | + |
| D-Trehalose | + | + | + | − | − | − | + | + | + | + | + | + | + | + | + | + |
| D-Cellobiose | + | + | + | + | + | + | + | + | + | + | + | + | + | + | + | + |
| Gentiobiose | + | + | + | + | + | + | + | / | + | + | + | + | + | + | + | + |
| Sucrose | + | + | + | + | + | + | + | + | + | + | + | + | + | + | + | + |
| D-Turanose | + | + | + | + | / | + | + | + | + | + | + | + | + | + | + | + |
| Stachyose | + | + | + | + | + | + | + | + | + | + | + | + | + | + | + | + |
| D-Raffinose | + | + | + | + | + | + | + | + | + | + | + | + | + | + | + | + |
| α-D-Lactose | + | + | + | + | + | + | + | + | + | + | + | + | + | + | + | + |
| D-Melibiose | + | + | + | + | + | + | + | + | + | + | + | + | + | + | + | + |
| β-Methyl-DGlucoside | + | + | + | + | + | + | + | + | + | + | + | + | + | + | + | + |
| D-Salicin | + | + | + | + | + | + | + | + | + | + | + | + | + | + | + | + |
| N-Acetyl-DGlucosamine | + | − | − | − | − | − | − | − | − | − | − | − | − | − | − | − |
| N-Acetyl-β-DMannosamine | − | − | − | − | − | − | − | − | − | − | − | − | − | − | − | − |
| N-Acetyl-DGalactosamine | − | − | − | − | − | − | − | − | − | − | − | − | − | − | − | − |
| N-AcetylNeuraminic Acid | − | − | − | − | − | − | − | − | − | − | − | − | − | − | − | − |
| α-D-Glucose | + | + | + | + | + | + | + | + | + | + | + | + | + | + | + | + |
| D-Mannose | + | + | + | + | + | + | + | + | + | + | + | + | + | + | + | + |
| D-Fructose | + | + | + | + | + | + | + | + | + | + | + | + | + | + | + | + |
| D-Galactose | − | + | + | + | + | + | + | + | + | + | + | + | + | + | + | + |
| 3-Methyl Glucose | − | − | − | − | − | − | − | − | − | − | − | − | − | − | − | − |
| D-Fucose | − | − | − | − | − | − | − | − | − | − | − | − | − | − | − | − |
| L-Fucose | − | − | − | − | − | − | − | − | − | − | − | − | − | − | − | − |
| L-Rhamnose | − | − | − | − | + | − | − | − | − | − | − | − | − | − | − | − |
| Inosine | − | + | − | + | − | − | − | − | − | − | − | − | − | − | − | − |
| D-Sorbitol | + | − | − | − | − | − | − | − | − | − | − | − | − | − | − | − |
| D-Mannitol | + | + | + | + | + | + | + | + | + | + | + | + | + | + | + | + |
| D-Arabitol | − | − | − | − | − | − | − | − | − | − | − | − | − | − | − | − |
| myo-Inositol | + | − | − | − | − | − | − | − | − | − | − | − | − | − | − | − |
| Glycerol | + | + | + | + | + | + | + | + | + | + | + | + | + | + | + | + |
| D-Glucose-6-PO4 | − | − | − | − | − | − | − | − | − | − | − | − | − | − | − | − |
| D-Fructose-6-PO4 | − | − | − | − | − | − | − | − | − | − | − | − | − | − | − | − |
| D-Aspartic Acid | − | − | − | + | + | + | − | − | − | − | − | − | − | − | − | − |
| D-Serine | − | − | − | − | − | − | − | − | − | − | − | − | − | − | − | − |
| Gelatin | − | − | − | − | − | − | − | − | − | − | − | − | − | − | − | − |
| Glycyl-L-Proline | − | − | − | − | − | − | − | − | − | − | − | − | − | − | − | − |
| L-Alanine | + | − | − | − | − | − | − | − | − | − | − | − | − | − | − | − |
| L-Arginine | + | − | − | − | − | − | − | − | − | − | − | − | − | − | − | − |
| L-Aspartic Acid | + | − | − | + | + | + | − | − | − | − | − | − | − | − | − | − |
| L-Glutamic Acid | + | − | − | − | − | − | − | − | − | − | − | − | − | − | − | − |
| L-Histidine | − | − | − | − | − | − | − | − | − | − | − | − | − | − | − | − |
| L-Pyroglutamic Acid | − | − | − | − | − | − | − | − | − | − | − | − | − | − | − | − |
| L-Serine | − | − | − | − | − | − | − | − | − | − | − | − | − | − | − | − |
| Pectin | − | + | + | + | + | + | + | + | + | + | + | + | + | + | + | + |

TABLE 16-continued

Phenotypic characterization of *Paenibacillus* isolates and known *Paenibacillus* strains

| Test | *P. polymyxa* LMG 13294 (type) | *P. polymyxa* ATCC7070 | *P. polymyxa* CR1 | *P. peoriae* LMG 14832 (type) | *P. peoriae* LMG 16104 | *P. peoriae* LMG 16111 | *P. jamilae* LMG 21667 | TP29 | To99 | 390 | 273 | 329 | V25T | 62 | 344 | TFr101 |
|---|---|---|---|---|---|---|---|---|---|---|---|---|---|---|---|---|
| D-Galacturonic Acid | + | + | − | + | + | + | − | − | − | − | − | − | − | − | + | − |
| L-Galactonic Acid Lactone | + | + | + | + | + | + | + | − | − | − | − | − | − | + | + | + |
| D-Gluconic Acid | − | + | + | + | + | + | + | + | + | + | + | + | + | + | + | + |
| D-Glucuronic Acid | − | − | − | − | − | − | − | − | − | − | − | − | − | − | − | − |
| Glucuronamide | − | − | − | − | − | − | − | − | − | − | − | − | − | − | − | − |
| Mucic Acid | − | − | − | − | − | − | − | − | − | − | − | − | − | − | − | − |
| Quinic Acid | − | − | − | − | − | − | − | − | − | − | − | − | − | − | − | − |
| D-Saccharic Acid | − | − | − | − | − | − | − | − | − | − | − | − | − | − | − | − |
| p-Hydroxy-Phenylacetic Acid | − | − | − | − | − | − | − | − | − | − | − | − | − | − | − | − |
| Methyl Pyruvate | + | − | + | + | + | + | − | − | + | + | + | − | + | − | − | − |
| D-Lactic Acid Methyl Ester | − | − | − | − | − | − | − | − | − | − | − | − | − | − | − | − |
| L-Lactic Acid | + | − | − | − | − | − | − | − | − | − | − | − | − | − | − | − |
| Citric Acid | + | − | − | − | − | − | − | − | − | − | − | − | − | − | − | − |
| α-Keto-Glutaric Acid | − | − | − | − | − | − | − | − | − | − | − | − | − | − | − | − |
| D-Malic Acid | − | − | − | − | − | − | − | − | − | − | − | − | − | − | − | − |
| L-Malic Acid | + | / | + | + | + | + | + | − | + | + | + | + | + | − | − | − |
| Bromo-Succinic Acid | − | − | − | + | / | + | − | − | − | − | − | − | + | − | − | − |
| Tween 40 | − | − | − | − | − | − | − | − | − | − | − | − | − | − | − | − |
| γ-Amino-Butyric Acid | − | − | − | − | − | − | − | − | − | − | − | − | − | − | − | − |
| α-Hydroxy-Butyric Acid | − | − | − | − | − | − | − | − | − | − | − | − | − | − | − | − |
| β-Hydroxy-D,L-butyric Acid | − | − | − | − | − | − | − | − | − | − | − | − | − | − | − | − |
| α-Keto-Butyric Acid | − | − | − | − | − | − | − | − | − | − | − | − | − | − | − | − |
| Acetoacetic Acid | − | − | − | − | − | − | − | − | − | − | − | − | − | − | − | − |
| Propionic Acid | − | − | − | − | − | − | − | − | − | − | − | − | − | − | − | − |
| Acetic Acid | − | − | − | − | − | − | − | − | − | − | − | − | − | − | − | − |
| Formic Acid | − | − | − | − | − | − | − | − | − | − | − | − | − | − | − | − |
| chemical sensitivity assays | | | | | | | | | | | | | | | | |
| pH 6 | + | + | + | + | + | + | + | + | + | + | + | + | + | + | + | + |
| pH 5 | + | + | + | + | + | + | − | + | + | + | − | − | − | − | − | − |
| 1% NaCl | + | + | + | + | + | + | + | + | + | + | + | + | + | + | + | + |
| 4% NaCl | + | − | − | − | + | − | − | − | − | + | − | + | + | + | − | − |
| 8% NaCl | + | − | − | − | − | − | − | − | − | − | − | − | − | − | − | − |
| 1% Sodium Lactate | + | + | + | + | + | + | + | + | + | + | + | + | + | + | + | + |
| Fusidic Acid | − | − | − | − | − | − | − | − | − | − | − | − | − | − | − | − |
| D-Serine | − | − | − | − | − | − | − | − | − | − | − | − | − | − | − | − |
| Troleandomycin | − | − | − | − | − | − | − | − | − | − | − | − | − | − | − | − |
| Rifamycin SV | − | + | − | − | − | + | + | − | − | − | − | − | − | + | + | + |
| Minocycline | − | − | − | − | − | − | − | − | − | − | − | − | − | − | − | − |
| Lincomycin | − | − | − | − | − | − | − | − | − | − | − | − | − | − | − | − |
| Guanidine HCl | + | + | + | + | − | + | + | + | + | + | + | + | + | + | + | + |
| Niaproof 4 | − | − | − | − | − | − | − | − | − | − | − | − | − | − | − | − |
| Vancomycin | − | − | − | − | − | − | − | − | − | − | − | − | − | − | − | − |
| Tetrazolium Violet | − | − | − | − | − | − | − | − | − | − | − | − | − | − | − | − |
| Tetrazolium Blue | − | − | − | − | − | − | − | − | − | − | − | − | − | − | − | − |
| Nalidixic Acid | − | − | − | − | − | − | − | − | − | − | − | − | − | − | − | − |
| Lithium Chloride | + | + | − | − | − | − | + | + | + | − | + | − | − | + | + | + |
| Potassium Tellurite | + | + | + | + | / | + | + | + | + | + | + | + | + | + | + | + |
| Aztreonam | + | + | − | − | − | − | − | − | − | − | − | − | − | − | − | − |
| Sodium Butyrate | + | + | + | + | + | + | + | + | + | + | + | + | + | + | + | + |
| Sodium Bromate | − | − | − | − | − | − | / | − | − | − | − | − | − | − | − | − |

+: positive result;
−: negative result;
/: borderline result (BIOLOG ™, OmniLog)

In order to more easily understand these results, the percentage of similarity between isolated bacteria and the most closely related references strains *P. polymyxa* CR1, *P. jamilae* LMG 21667 (type strain) and *P. peoriae* LMG 16111 (type strain) was calculated (Table 17). Only the highest percentage of similarity for each isolate is indicated in this table. Thus, isolates 62, 344, TFr101 and TP12 showed the highest similarity (about 97%) to *P. jamilae* LMG 21667. The isolates To99, 399 and V25T were more similar to *P. polymyxa* CR1 with 97.5% and 95.7% of similarity, respectively. Bacterial isolates 329 and 273 showed the same similarity (96.8%) to *P. polymyxa* CR1 and *P. jamilae* LMG 21667 (Table 17). Due to these differences, fatty acid analyses were performed for further bacterial isolate identification.

TABLE 17

Similarity of *Paenibacillus* sp. isolates with the most closely related reference strains based on their phenotypical characteristics BIOLOG identification of *Paenibacillus* sp. isolates

| Isolate | Microorganism | % of similarity |
|---|---|---|
| 62 | *Paenibacillus jamilae* | 97.9% |
|  | *Paenibacillus polymyxa* | 93.6% |
| 344 | *Paenibacillus jamilae* | 96.8% |
|  | *Paenibacillus polymyxa* | 94.7% |
| TFr101 | *Paenibacillus jamilae* | 98.9% |
|  | *Paenibacillus polymyxa* | 94.7% |
| V25T | *Paenibacillus polymyxa* | 95.7% |
|  | *Paenibacillus jamilae* | 93.6% |
| 329 | *Paenibacillus polymyxa*, | 96.8% |
|  | *Paenibacillus jamilae* | 96.8% |
|  | *Paenibacillus peoriae* | 95.7% |
| 390 | *Paenibacillus polymyxa* | 97.9% |
|  | *Paenibacillus jamilae* | 93.6% |
| 273 | *Paenibacillus polymyxa*, | 96.8% |
|  | *Paenibacillus jamilae* | 96.8% |
|  | *Paenibacillus peoriae* | 91.5% |
| To99 | *Paenibacillus polymyxa* | 97.9% |
|  | *Paenibacillus jamilae* | 95.7% |
| TP29 | *Paenibacillus jamilae* | 96.8% |
|  | *Paenibacillus polymyxa* | 94.7% |

The percentage of similarity is calculated as follows: (number of similar characteristics/total number of tests (94))*100.

v. 2.4 Fatty acid analyses of *Paenibacillus* isolates

Fatty acids analysis was performed to confirm the identification of the *Paenibacillus* isolates (Keystone Labs Inc., Edmonton, Alberta, Canada). The fatty acids analysis is accomplished with the MIDI™ method (which analyzes fatty acid methyl esters in bacterial samples by gas chromatography) and then compared with the Sherlock libraries consisting in more than 100,000 analyses of strains obtained from experts and from culture collections (www.midi-inc.com). Microbial identification results from the MIDI system are expressed as a similarity index. The similarity index (SI) is a numerical value which is an expression of the relative distance from the population mean. An exact match of the fatty acid makeup of the unknown and the mean of the library entry would result in a SI of 1.000. As each fatty acid varies from the mean percentage, the SI will decrease in proportion to the cumulative variance between the composition of the unknown and the library entry.

Identification of *Paenibacillus* isolates based on the analysis of their fatty acid content was performed with the aim to distinguish closely related species within the same genus (Table 14). Based on the data of SI of fatty acid profiles, all bacterial isolates were identified as *Paenibacillus polymyxa* (SI ranged 0.7-0.9) with the exception of isolate TP29 with the lowest SI (0.598) that is closely related to *Rothia dentocariosa* (Table 18). According to the literature, this species is part of the normal community of microbes residing in the mouth and respiratory tract, while bacterial isolate TP29 was isolated from soil samples. Of note, there is no entry in the database to compare the isolates with the *Paenibacillus jamilae* strains. In fact, the fatty acid analysis of the *P. jamilae* LMG 21667 type strain gives an identification close to *P. polymyxa* (SI=0.632) and to *Arthrobacter globiformis* (SI=0.617).

TABLE 18

Identification of *Paenibacillus* isolates based on the analysis of their fatty acid content

| Isolate | Identification | Similarity index |
|---|---|---|
| 62 | *Paenibacillus polymyxa* | 0.808 |
|  | *Arthrobacter globiformis* GC subgroup A | 0.676 |
| 344 | *Paenibacillus polymyxa* | 0.799 |
|  | *Arthrobacter globiformis* GC subgroup A | 0.676 |
| TFr101 | *Paenibacillus polymyxa* | 0.861 |
|  | *Arthrobacter globiformis* GC subgroup A | 0.675 |
| 329 | *Paenibacillus polymyxa* | 0.777 |
|  | *Artrhobacter globiformis* GC subgroup A | 0.622 |
|  | *Rothia dentocariosa* | 0.473 |
| 273 | *Paenibacillus polymyxa* | 0.934 |
|  | *Arthrobacter globiformis* GC subgroup A | 0.692 |
| To99 | *Paenibacillus polymyxa* | 0.865 |
|  | *Arthrobacter globiformis* GC subgroup A | 0.685 |
| V25T | *Paenibacillus polymyxa* | 0.815 |
|  | *Arthrobacter globiformis* GC subgroup A | 0.723 |
| TP29 | *Rothia dentocariosa* | 0.598 |
|  | *Brevibacterium liquefaciens* | 0.593 |
|  | *Paenibacillus polymyxa* | 0.572 |
|  | *Arthrobacter globiformis* GC subgroup A | 0.381 | vi. 2.5 Amplification of Specific Genes from *Bacillus* Species

The rpoB, gyrA and gyrB gene fragments were used as molecular diagnostic markers to specifically identify bacterial isolates within the *Bacillus subtilis* group. To this end, specific primers for amplification of each gene were used (Table 19). PCR-amplifications were carried out in a 25-µL reaction mixture (Table 20). The amplifications were performed using specific PCR temperature protocol (Table 21).

After DNA amplification, rpoB, gyrA and gyrB fragments were analyzed by agarose gel electrophoresis, stained by ethidium bromide, and visualized under UV illumination.

All PCR products were purified on a 1% agarose gel using a Gel extraction kit (Bio Basic Canada Inc., Markham, Ontario, Canada). The rpoB fragments were cloned into a pGEM-T-Easy Vector™ (pGEM-t easy kit, Promega, Medison, USA) and sent for sequencing using the Sp6 and T7 primers (Table 19). The gyrA fragments were sequenced with the same primers that were used for the initial PCR reaction. The gyrB fragments were amplified with the universals UP-1 and UP-2r primers and sequenced with the UP-1S and the UP-2Sr primers (Table 19).

The obtained sequences were processed with the BioEdit sequence alignment editor and analysed by NCBI BLAST program: http://blast.ncbi.nlm.nih.gov/Blast.cgi?PROGRAM=blastn&PAGE_TYPE=BlastSearch&LINK_LOC=blasthome).

TABLE 19

Primers used to determine specific genes of Bacillus isolates

| Primers | Target | Sequence 5'→3' | Product size (bp) | Ref. |
|---|---|---|---|---|
| rpoB-f rpoB-r | rpoB gene | AGGTCAACTAGTTCAGTATGGAC (SEQ ID NO: 9) AAGAACCGTAACCGGCAACTT (SEQ ID NO: 10) | 579 | De Clerck et al., 2004; Gonzalez et al., 2013 |
| gyrA-f gyrA-r | gyrA gene | CAGTCAGGAAATGCGTACGTCCTT (SEQ ID NO: 11) CAAGGTAATGCTCCAGGCATTGCT (SEQ ID NO: 12) | 1025 | De Clerck et al., 2004; Gonzalez et al., 2013 |
| UP-1 UP-2r | gyrB gene (amplificati | GAAGTCATCATGACCGTTCTGCAYGCNG GNGGNAARTTYGA (SEQ ID NO: 13) AGCAGGGTACGGATGTGCGAGCCRTCNA CRTCNGCRTCNGTCAT (SEQ ID NO: 14) | 1200 | Wang et al., 2010; Yamamoto and Harayama, 1995 & 1998 |
| UP-1S UP-2Sr | gyrB gene (sequencing) | GAAGTCATCATGACCGTTCTGCA (SEQ ID NO: 15) AGCAGGGTACGGATGTGCGAGCC (SEQ ID NO: 16) | 1200 | Yamamoto and Harayama, 1995 |
| Sp6T7 | pGEM-T-Easy vector | AGC TAT TTA GGT GAC ACT ATA G (SEQ ID NO: 17) TTG TAA TAC GAC TCA CTA TAG GG (SEQ ID NO: 18) | | Promega, 2010 |

TABLE 20

Reaction mixture
In a final volume of 25 μL

| | |
|---|---|
| 1X | Taq buffer |
| 200 μM | dNTPs mix |
| 0.4 μM | Primer F |
| 0.4 μM | Primer R |
| 1 unit | Taq DNA polymerase |
| 50 ng | Bacterial DNA extract |

TABLE 21

Temperature program for amplification of DNA fragments of
Bacillus subtilis group specific genes by PCR

| Step | rpoB | gyr A | gyr B | Protocol |
|---|---|---|---|---|
| 1 | 5 min 95° C. | 5 min 95° C. | 5 min 95° C. | initial denaturation |
| 2 | 1 min 95° C. | 30 s 95° C. | 1 min 95° C. | denaturation |
| 3 | 1 min 51° C. | 45 s 51° C. | 1 min 60° C. | annealing |
| 4 | 1 min 72° C. | 1 min 72° C. | 2 min 72° C. | elongation |
| 5 | Repeat steps 2 to 4 | Repeat steps 2 to 4 | Repeat steps 2 to 4 | 29 times |
| 6 | 10 min 72° C. | 10 min 72° C. | 10 min 72° C. | final elongation |
| 7 | ∞ 4° C. | ∞ 4° C. | ∞ 4° C. | stop PCR reaction and refrigerate DNA products |
| 8 | end | end | end | |

Based on gyrA sequence analysis, all six isolates of Bacillus subtilis group showed the closet similarity relative to Bacillus amyloliquefaciens, with sequence similarity of 99% and even 100% for isolates 71 and 237 (Table 22). Also, isolates 16 and 335 were high similar to B. velezensis that is a later heterotrophic synonym of B. amyloliquefaciens [Wang et al., 2008].

The partial sequence of the gene encoding the subunit B protein of DNA gyrase (gyrB) analysis and the sequence of rpoB DNA fragment showed the highest similarity (98-100%) of B. subtilis group isolates with B. amyloliquefaciens subsp. plantarum.

Thus, based on the results the sequencing of three specific genes from Bacillus subtilis group, all of the isolates belong to Bacillus amyloliquefaciens species and most likely to the plantarum subspecies.

TABLE 22

Identification of *Bacillus* sp. isolates based on sequencing of specific genes

| Isolate | gyrA | % of similarity | gyrB | | rpoB | |
|---|---|---|---|---|---|---|
| VFb49 | *B. amyloliquefaciens* | 99% | — | | *B. amyloliquefaciens* subsp. *plantarum* | 99% |
| 33 | *B. amyloliquefaciens* | 99% | *B. amyloliquefaciens* subsp. *plantarum* | 98% | *B. amyloliquefaciens* subsp. *plantarum* | 99% |
| | | | | | *B. amyloliquefaciens* subsp. *amyloliquefaciens* | 99% |
| 335 | *B. amyloliquefaciens* | 99% | *B. amyloliquefaciens* subsp. *plantarum* | 99% | *B. amyloliquefaciens* subsp. *plantarum* | 100% |
| | *B. velezensis* | 99% | | | | |
| 16 | *B. amyloliquefaciens* | 99% | *B. amyloliquefaciens* subsp. *plantarum* | 99% | *B. amyloliquefaciens* subsp. *plantarum* | 100% |
| | *B. velezensis* | 99% | | | | |
| 71 | *B. amyloliquefaciens* | 100% | *B. amyloliquefaciens* subsp. *plantarum* | 99% | *B. amyloliquefaciens* subsp. *plantarum* | 99% |
| | | | | | *B. amyloliquefaciens* subsp. *amyloliquefaciens* | 99% |
| 237 | *B. amyloliquefaciens* | 100% | *B. amyloliquefaciens* subsp. *plantarum* | 100% | *B. amyloliquefaciens* subsp. *plantarum* | 100% | vii. 2.6 Detection of genes coding for metabolites by PCR

Different strains of *B. amyloliquefaciens* may produce enzymes and antibiotics, specially bacteriocins, lipopeptides and polyketides. In order to better characterize the *B. amyloliquefaciens* subsp. *plantarum* isolates, polymerase chain reactions were performed to determine the presence of metabolite genes involved in their biosynthesis. PCR-amplifications were carried out in a 25-μL reaction mixture (Table 23) with specific primers for each gene of interest (Table 24) and specific temperature protocol for each amplification reaction (Table 25). After DNA amplification, PCR products were analyzed by agarose gel electrophoresis (1.0% of agarose, 100V, 60 mi), DNA was stained by ethidium bromide (0.5 μg/mL), and visualized under UV illumination.

TABLE 23

Reaction mixture
In a final volume of 25 μL

| | |
|---|---|
| 1X | Taq buffer |
| 200 μM | dNTPs mix |
| 0.4 μM | Primer F |
| 0.4 μM | Primer R |
| 1 unit | Taq DNA polymerase |

TABLE 24

Amplification primers used to determine the presence of different metabolite genes in *Bacillus* sp. isolates

| Primers | Target | Sequence 5'→3' | Product size | Reference |
|---|---|---|---|---|
| OsboP1N | Subtilosin | CCTCATGACCAGGACTTCGCCTT (SEQ ID NO: 19) | 1220 bp | Kabore et al., 2012 |
| OsboP2N | | CGGTGCCGAGCGCTTCAGGT (SEQ ID NO: 20) | | |
| SpaS_F | Subtilin | CAAAGTTCGATGATTTCGATTTGGATGT (SEQ ID NO: 21) | 152 bp | Sutyak et al., 2008 |
| SpaS_R | | GCAGTTACAAGTTAGTGTTTGAAGGAA (SEQ ID NO: 22) | | |
| Eric_F | Ericin | TCAACTGACCGGGCAGGAGC (SEQ ID NO: 23) | 1440 bp | Kabore et al., 2012 |
| Eric_R | | AAGTATTTGGCCTACAGCGACTCG (SEQ ID NO: 24) | | |
| SUNT-F1 | Sublancin | GCTTTGTTAGAAGGGGAGGAAT (SEQ ID NO: 25) | 974 bp | Chung et al., 2008 |
| SUNT-R1 | | CTTGTCCCAACCCATAGGATAA (SEQ ID NO: 26) | | |
| ITUC-F1 | Iturin | CCCCCTCGGTCAAGTGAATA (SEQ ID NO: 27) | 594 bp | Chung et al., 2008 |
| ITUC-R1 | | TTGGTTAAGCCCTGATGCTC (SEQ ID NO: 28) | | |

TABLE 24-continued

Amplification primers used to determine the presence of different metabolite genes in *Bacillus* sp. isolates

| Primers | Target | Sequence 5'→3' | Product size | Reference |
|---|---|---|---|---|
| ITUD1 F<br>ITUD1 R | IturinA | GATGCGATCTCCTTGGATGT (SEQ ID NO: 29)<br>ATCGTCATGTGCTGCTTGAG (SEQ ID NO: 30) | 647 bp | Athukorala et al., 2009;<br>Ramarathnam et al., 2007 |
| SRFA-F1<br>SRFA-R1 | Surfactin | AGAGCACATTGAGCGTTACAAA (SEQ ID NO: 31)<br>CAGCATCTCGTTCAACTTTCAC (SEQ ID NO: 32) | 626 bp | Chung et al., 2008 |
| Am1-F<br>Tm1-R | Mycosubtilin | CAKCARGTSAAAATYCGMGG (SEQ ID NO: 33)<br>CCDASATCAAARAADTTATC (SEQ ID NO: 34) | 419 bp | Tapi et al., 2010 |
| Af2-F<br>Tf1-R | Fengycin | GAATAYMTCGGMCGTMTKGA (SEQ ID NO: 35)<br>GCTTTWADKGAATSBCCGCC (SEQ ID NO: 36) | 542 bp | Tapi et al., 2010 |
| Ap1-F<br>Tp1-R | Plipastatin | AGMCAGCKSGCMASATCMCC (SEQ ID NO: 37)<br>GCKATWWTGAARRCCGGCGG (SEQ ID NO: 38) | 959 bp | Tapi et al., 2010 |
| baeR_F<br>baeR_R | Bacillaene | ATGTCAGCTCAGTTTCCGCA (SEQ ID NO: 39)<br>GATCGCCGTCTTCAATTGCC (SEQ ID NO: 40) | 688 bp | Compaore et al., 2013 |
| mlnA_F<br>mnlA_R | Macrolactin | CCGTGATCGGACTGGATGAG (SEQ ID NO: 41)<br>CATCGCACCTGCCAAATACG (SEQ ID NO: 42) | 668 bp | Compaore et al., 2013 |
| bacA/B_F<br>bacA/B_R | Bacilysin | TGCTCTGTTATAGCGCGGAG (SEQ ID NO: 43)<br>GTCATCGTATCCCACCCGTC (SEQ ID NO: 44) | 910 bp | Compaore et al., 2013 |
| bmyA_F<br>bmyA_R | Bacillomycin | CTCATTGCTGCCGCTCAATC (SEQ ID NO: 45)<br>CCGAATCTACGAGGGGAACG (SEQ ID NO: 46) | 853 bp | Compaore et al., 2013 |
| dfnA_F<br>dfnA_R | Difficidin | GGATTCAGGAGGGCATACCG (SEQ ID NO: 47)<br>ATTGATTAAACGCGCCGAGC (SEQ ID NO: 48) | 653 bp | Compaore et al., 2013 |

TABLE 25

PCR program for amplification of DNA fragments of genes involved in metabolite production in *Bacillus* sp. isolates

| Step<br>Metabolite | initial denaturation<br>1 | denaturation<br>2 | annealing<br>3 | elongation<br>4 | number of cycles<br>5 | final elongation<br>6 | Stop and refrigerate<br>7 | 8 |
|---|---|---|---|---|---|---|---|---|
| *Subtilosin* | 5 min 95° C. | 1 min 95° C. | 1 min 58° C. | 90 s 72° C. | 30 | 10 min 72° C. | ∞ 4° C. | end |
| *Subtilin* | 5 min 95° C. | 1 min 95° C. | 1 min 55° C. | 30 s 72° C. | 30 | 10 min 72° C. | ∞ 4° C. | end |
| *Ericin* | 5 min 95° C. | 1 min 95° C. | 1 min 58° C. | 90 s 72° C. | 30 | 10 min 72° C. | ∞ 4° C. | end |
| *Sublancin* | 5 min 95° C. | 1 min 95° C. | 1 min 55° C. | 60 s 72° C. | 30 | 10 min 72° C. | ∞ 4° C. | end |
| *Iturin* | 5 min 95° C. | 1 min 95° C. | 1 min 55° C. | 40 s 72° C. | 30 | 10 min 72° C. | ∞ 4° C. | end |

TABLE 25-continued

PCR program for amplification of DNA fragments of genes involved in metabolite production in Bacillus sp. isolates

| Step Metabolite | initial denaturation 1 | denaturation 2 | annealing 3 | elongation 4 | number of cycles 5 | final elongation 6 | Stop and refrigerate 7 | 8 |
|---|---|---|---|---|---|---|---|---|
| IturinA | 5 min 95° C. | 1 min 95° C. | 1 min 60° C. | 50 s 72° C. | 30 | 10 min 72° C. | ∞ 4° C. | end |
| Surfactin | 5 min 95° C. | 1 min 95° C. | 1 min 55° C. | 50 s 72° C. | 30 | 10 min 72° C. | ∞ 4° C. | end |
| Mycosubtilin | 5 min 95° C. | 1 min 95° C. | 1 min 45° C. | 30 s 72° C. | 30 | 10 min 72° C. | ∞ 4° C. | end |
| Fengycin | 5 min 95° C. | 1 min 95° C. | 1 min 45° C. | 30 s 72° C. | 30 | 10 min 72° C. | ∞ 4° C. | end |
| Plipastatin | 5 min 95° C. | 1 min 95° C. | 1 min 58° C. | 60 s 72° C. | 30 | 10 min 72° C. | ∞ 4° C. | end |
| Bacillaene | 5 min 95° C. | 1 min 95° C. | 1 min 57° C. | 60 s 72° C. | 30 | 10 min 72° C. | ∞ 4° C. | end |
| Macrolactin | 5 min 95° C. | 1 min 95° C. | 1 min 57° C. | 60 s 72° C. | 30 | 10 min 72° C. | ∞ 4° C. | end |
| Bacililysin | 5 min 95° C. | 1 min 95° C. | 1 min 57° C. | 60 s 72° C. | 30 | 10 min 72° C. | ∞ 4° C. | end |
| Bacillomycin | 5 min 95° C. | 1 min 95° C. | 1 min 57° C. | 60 s 72° C. | 30 | 10 min 72° C. | ∞ 4° C. | end |
| Difficidin | 5 min 95° C. | 1 min 95° C. | 1 min 57° C. | 60 s 72° C. | 30 | 10 min 72° C. | ∞ 4° C. | end |

As shown in Table 26, all the *B. amyloliquefaciens* subsp. *plantarum* isolates were found to be negative for the genes involved in the biosynthesis of subtilosin (ywiB, sboA), subtilin (spaS), ericin (eriC, eriSa, eriSb), sublancin (sunT), surfactin (srfA) and plipastatin (pps). Genes involved in the production of iturin (ituA) was detected in *B. amyloliquefaciens* subsp. *plantarum* isolates VFb49, 71 and 237. Only isolate 335 of this species does not have the gene involved in the biosynthesis of fengycin (fen). Gene involved in the production of bacilysin (bacA/B, bacB) was detected in *B. amyloliquefaciens* subsp. *plantarum* isolates VFb49, 237 and 16, while bacillomycin gene (bmyA) was detected in isolates VFb49, 237 and 16 of this species (Table 26). All isolates of *B. amyloliquefaciens* subsp. *plantarum* have genes involved in biosynthesis of iturinA (ituA), mycosubtilin (myc itu), bacillaene (baeA), macrolactin (mnlA) and difficidin (dfnA) (Table 26). The detection of macrolactin, bacillomycin and difficidin genes is specific to *B. amyloliquefaciens* subsp. *plantarum*, since the primers were specifically designed for the type strain of this subspecies (*B. amyloliquefaciens* subsp. *plantarum* FZB42) [Compaore et al., 2013].

TABLE 26

Presence of metabolite production genes in Bacillus sp. isolates

| Isolate | Subtilosin | Subtilin | Ericin | Sublancin | Iturin | IturinA | Surfactin | Mycosubtilin |
|---|---|---|---|---|---|---|---|---|
| VFb49 | N | N | N | N | Y | Y | N | Y |
| 71 | N | N | N | N | Y | Y | N | Y |
| 237 | N | N | N | N | Y | Y | N | Y |
| 16 | N | N | N | N | N | Y | N | Y |
| 33 | N | N | N | N | N | Y | N | Y |
| 335 | N | N | N | N | N | Y | N | Y |

Presence of metabolite production genes in Bacillus sp. isolates

| Isolate | Fengycin | Plipastatin | Bacillaene | Macrolactin | Bacililysin | Bacillomycin | Difficidin |
|---|---|---|---|---|---|---|---|
| VFb49 | Y | N | Y | Y | Y | Y | Y |
| 71 | Y | N | Y | Y | Y | N | Y |
| 237 | Y | N | Y | Y | N | Y | Y |
| 16 | Y | N | Y | Y | Y | Y | Y |
| 33 | Y | N | Y | Y | N | N | Y |
| 335 | Y | N | Y | Y | N | Y | Y |

Yes: Yes, presence of the gene coding metabolite production;
N: No, absence or no detection of the gene c)

d) Example 3

Testing supernatants against different plant and human pathogens

One strain of *Bacillus* and two strains of *Paenibacillus* species were selected for further analysis on crops (tomato and lettuce) because of their high antibacterial activity against pathogenic *Xanthomonas* bacteria. The supernatants of *Bacillus amyloliquefaciens* subsp. *plantarum* 71, *Paenibacillus* sp. TFr101, and *Paenibacillus polymyxa* To99 were tested against plant pathogens (*X. perforans* T4, *X. campestris* 901, *X. euvesicatoria* R4, *X. gardneri* DC00T7A, *X.* fragariae LMG 708, E. amylovora 435, B. glumae LMG10905, and P. syringae DC3000), as well as against B. subtilis ED66 and human pathogens (Escherichia coli 0157: H7 EDL933, and S. aureus ED711, P. aeruginosa PA416A), as shown in Table 27.

TABLE 27

Activity of bacterial supernatants against plant and human pathogens

| | Diameter (mm) of growth inhibition zone(including well diameter)* | | |
|---|---|---|---|
| Bacterial strains | B. amyloliquefaciens subsp. plantarum 71 | P. polymyxa To99 | P. polymyxa TFr101 |
| X. campestris 901 | 34.0 ± 0.5 | 31.0 ± 0.5 | 29.5 ± 0.31 |
| X. perforans T4 | 31.0 ± 0.5 | 30.5 ± 0.21 | 32.3 ± 0.21 |
| X. euvesicatoria R4 | 25.1 ± 0.31 | 26.0 ± 0.5 | 25.0 ± 0.5 |
| X. gardneri DC00T7A | 24.0 ± 0.5 | 34.0 ± 0.5 | 24.0 ± 0.5 |
| X. fragariae LMG 708 | n/a | n/a | n/a |
| Pseudomonas syringae DC3000 | 18.0 ± 0.5 | 20.0 ± 0.5 | 17.0 ± 0.5 |
| Erwinia amylovora 435 | 20.0 ± 0.5 | 20.0 ± 0.5 | 17.0 ± 0.5 |
| Burkholderia glumae LMG10905 | 21.0 ± 0.5 | No activity | 14.0 ± 0.5 |
| Escherichia coli O157:H7 EDL933 | No activity | 20.0 ± 0.5 | 17.0 ± 0.5 |
| Bacillus subtilis ED66 | 13.0 ± 0.5 | No activity | 19.0 ± 0.5 |
| Staphylococcus aureus ED711 | No activity | No activity | 16.5 ± 0.29 |
| Pseudomonas aeruginosa PA416A | No activity | 17.0 ± 0.41 | 13.5 ± 0.29 |

Based on the results in Table 27, the supernatants of B. amyloliquefaciens subsp. plantarum 71, P. polymyxa To99, and P. polymyxa TFr101 were highly active against all four Xanthomonas species tested. However, they were less active against other plant pathogenic bacteria such as B. glumae which causes panicle blight in rice, Erwinia amylovora which causes fire blight in apples and pears, and finally against Pseudomonas syringae that causes bacterial specks in many crops.

Some of the supernatants were also active against a species of Gram-positive Bacillus, as well as other human pathogens such as Escherichia coli 0157:H7 and Staphylococcus aureus. It is clear from above experiments that these supernatants produced by B. amyloliquefaciens subsp. plantarum 71, P. polymyxa To99 and P. polymyxa TFr101 are specifically active against Xanthomonas species.

The cell free supernatants of B. amyloliquefaciens subsp. plantarum 71, P. polymyxa To99 and P. polymyxa TFr101 stored for 1 year at −80° C. were tested against plant and human pathogens. The zone of inhibition using the well diffusion test was equal to 25 mm in diameter against Xanthomonas perforans T4, indicating the long-term stability of supernatants.

e) Example 4

Testing Interspecies and Inter-Strains Antibacterial Activity of Cell-Free Supernatants Following the screening for antimicrobial activity-producing bacteria against Xanthomonas perforans T4, the inhibitory effect of cell-free supernatants was tested within the most active bacterial species and strains (Table 28).

TABLE 28

Interspecies and inter-strains antibacterial activity of cell-free supernatants

| | Diameter (mm) of growth inhibition zone (including well diameter)* | | |
|---|---|---|---|
| Bacterial strains | B. amyloliquefaciens subsp. plantarum 71 | P. polymyxa To99 | P. polymyxa TFr101 |
| B. amyloliquefaciens subsp. plantarum 71 | 0.00 ± 0.00 | 26.83 ± 0.47 | 26.16 ± 0.31 |
| P. polymyxa To99 | 25.16 ± 0.31 | 37.16 ± 0.31 | 0.00 ± 0.00 |
| P. polymyxa TFr101 | 29.00 ± 0.36 | 12.5 ± 0.22 | 0.00 ± 0.00 |

"±" Standard Error of Mean (SEM)
*Diameter of well is 10 mm

Thus, B. amyloliquefaciens subsp. plantarum 71 inhibited the growth of P. polymyxa To99 and P. polymyxa TFr101 showing a clear halo with diameter 26 mm, while these two strains of P. polymyxa showed the antimicrobial activity against B. amyloliquefaciens subsp. plantarum 71 with 25.16 and 29.00 mm growth inhibitory zones, respectively (Table 28).

Inter-strains activity was shown within P. polymyxa. P. polymyxa TFr101 inhibited the growth of P. polymyxa To99 showing a clear halo with diameter 12.5 mm, whereas P. polymyxa To99 was not capable of inhibiting P. polymyxa TFr101 (Table 28).

Auto-antimicrobial activity was not confirmed for B. amyloliquefaciens subsp. plantarum 71 and P. polymyxa TFr101, while P. polymyxa To99 showed the biggest auto-antimicronial activity, with a growth inhibition zone 37.16 mm in diameter. Also, P. polymyxa To99 showed a large growth inhibition zone (25.16 mm) against B. amyloliquefaciens subsp. plantarum 71 (Table 28).

Without being bound by theory, these data suggest that cell-free supernatant of P. polymyxa To99 contains compounds (e.g., proteinaceous compounds such as bacteriocins or lantibiotics) produced by the bacteria to inhibit the growth of similar or closely related bacterial strains. Metabolites resembling bacteriocins or lantibiotics in structure would likely kill pathogens by binding to lipids on their cell membranes and making the cells porous. This would cause intracellular fluid to leak out, which would destroy the pathogen. Another example of such a molecule is nisin, produced by bacteria found in dairy products. Normally, lantibiotics are only effective against Gram-positive bacteria, but they can be induced to destroy Gram-negative pathogens such as those that cause plant diseases, by being combined with a chelator like EDTA. It is clear from above experiments that supernatants produced by these active species have wide-spectrum activity against other bacteria and even against bacteria within the same genus and the same species as the active bacteria.

f) Example 4.1

Enhancing the Anti-Xanthomonas Activity of P. polymyxa and B. amyloliquefaciens by Fermentation in Optimized Media i. 4.1.1 Fermentation in Optimized Media The precultures of P. polymyxa and B. amyloliquefaciens subsp. plantarum isolates were prepared as follows: 5 µL of the respective bacterial culture stored at −80° C. was inoculated into 3 mL of Tryptic Soy Broth (TSB) and incubated in a rotary shaker at 250 rpm overnight at 30° C. The appropriate aliquots of each culture broth were used to inoculate production media to start with an initial optical density of 0.01, corresponding to about $8 \times 10^6$ CFU/mL.

With the goal of identifying more optimal nutrient medium and fermentation conditions for enhancing anti-*Xanthomonas* activity of the metabolites, optimization experiments were performed (data not shown) comparing 10 different nutrient media, as well as different fermentation conditions. For example, the different conditions tested included: various time periods of incubation (48 h, 72 h, 96 h, etc.); different volumes of medium (e.g., 250 mL or 500 mL); and difference Erlenmeyer flask sizes (e.g., 1 L or 2 L flask). The results of these experiments revealed that the optimal media for *Bacillus* and Paenbacillus isolates were Landy medium and TSB, respectively. Thus, TSB was used as a production medium for *P. polymyxa* isolates, while Landy's medium was used for cultivation of *B. amyloliquefaciens* subsp. *plantarum* isolates. Landy's medium contains: glucose 20 g/L, L-glutamic acid 5.0 g/L, yeast extract 1.0 g/L, $K_2HPO_4$ 1.0 g/L, $MgSO_4$ $(7H_2O)$ 0.5 g/L, KCl 0.5 g/L, $CuSO_4$ 1.6 mg/L, $Fe_2(SO_4)_3$ 1.2 mg/L, $MnSO_4$ 0.4 mg/L.

The production of metabolites was carried out in 2 L conical flasks with 500 mL of TSB or 200 mL of Landy's medium, and shaken at 250 rpm at 30° C. for 48 h. Culture media were then centrifuged at 25 000 rpm for 1 hour. The pellets were discarded and the supernatants were filtered using stericup vacuum filtration system (0.2 µm). The supernatants were collected and stored at −20° C. until usage.

ii. 4.1.2 Anti-*Xanthomonas* Activity of Cell-Free Supernatants Following Culture in Optimized Media Cell-free supernatants of a number of different *B. amyloliquefaciens* subsp. *plantarum* isolates (including VFb49, 71, 237, 16, 33, and 335), as well as 16 different *P. polymyxa* isolates (including To99, TFr101, T1B, 44, 273 and 329) were obtained by culturing in optimized media as described in Example 4.1.1. The supernatants were diluted 10-fold and tested for activity against *X. gardneri* DC00T7A, *X. perforans* T4, and *X. campestris* 901 using a well-diffusion inhibition assay (Obradovic et al., 2002; WO/2012/051699; Lindow et al., 2003).

Figure 10:
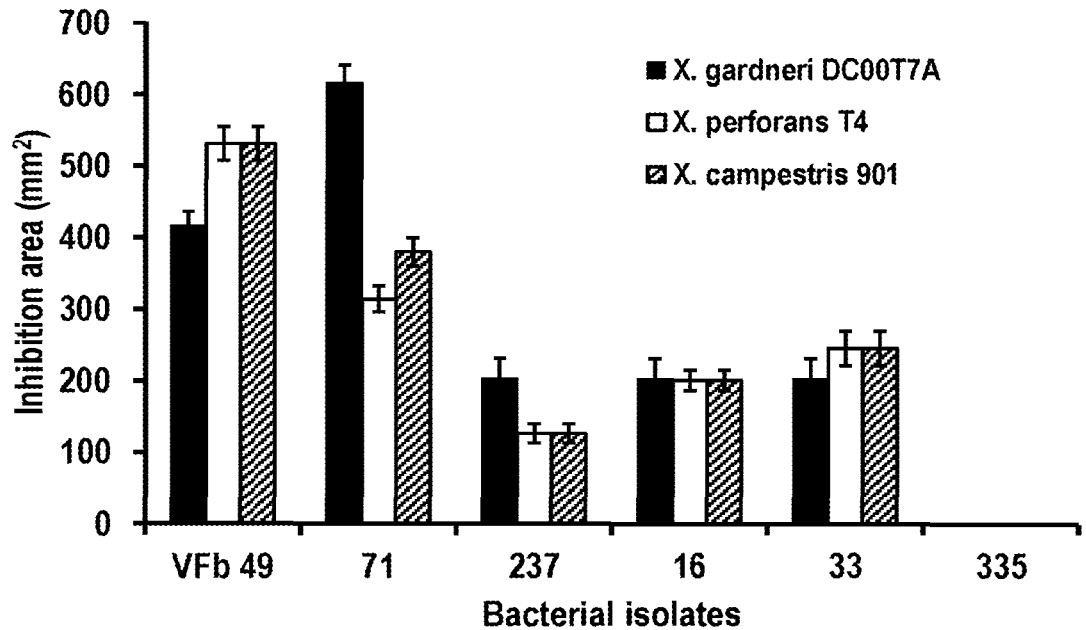
FIG. 10 shows the antimicrobial activity of *Bacillus amyloliquefaciens* subsp. *plantarum* 10-fold diluted cell-free supernatants against *Xanthomonas* species.

As shown in FIG. 10, 10-fold diluted cell-free supernatants of *B. amyloliquefaciens* subsp. *plantarum* isolates 71 and VFb49 showed the highest antimicrobial activity amongst the supernatants tested against *X. gardneri* DC00T7A, *X. perforans* T4, and *X. campestris* 901. Ten-fold diluted supernatants of *B. amyloliquefaciens* subsp. *plantarum* isolates 237, 16, and 33 were about 2-fold less active against all three *Xanthomonas* species tested, while 10-fold diluted supernatant of *B. amyloliquefaciens* subsp. *plantarum* 335 showed no detectable anti-Xanthomas activity in this assay.

Figure 11:
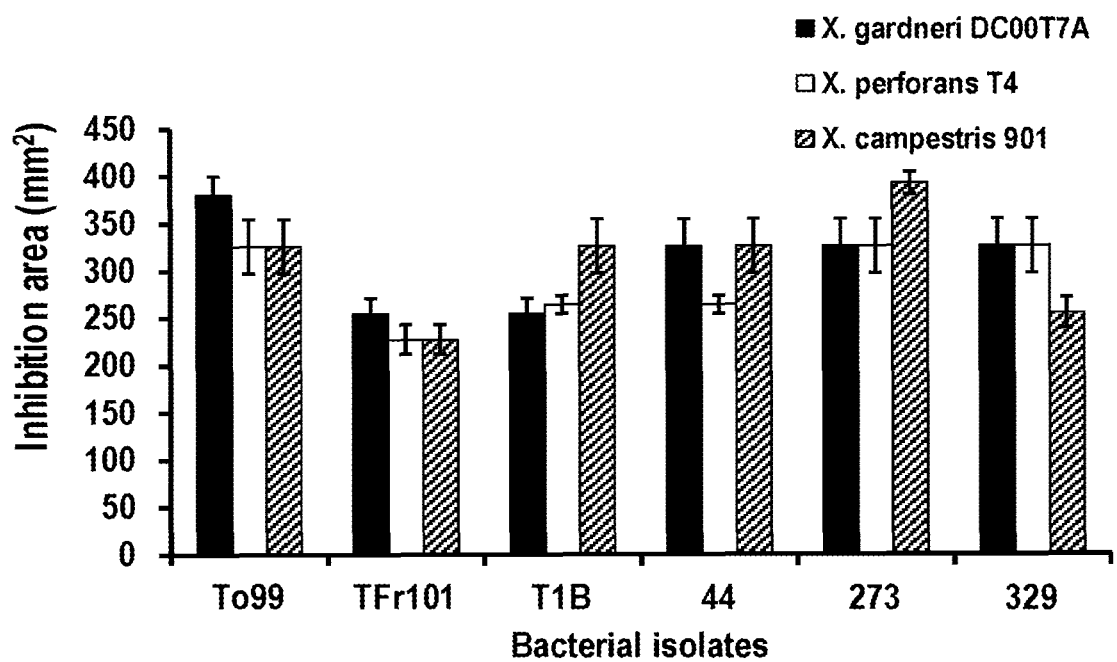
FIG. 11 shows the antimicrobial activity of *Paenibacillus polymyxa* 10-fold diluted cell-free supernatants against *Xanthomonas* species.

Among the 16 *P. polymyxa* isolates that were tested in the Example, 10-fold diluted supernatants of 6 isolates (To99, TFr101, T1B, 44, 273 and 329) showed the highest anti-*Xanthomonas* activity (FIG. 11). Based on these results, *B. amyloliquefaciens* subsp. *plantarum* isolates VFb49 and 71, as well as *P. polymyxa* isolates To99, TFr101, and 273 were selected for further characterization of their metabolites.

g) Example 5

Figure 8:
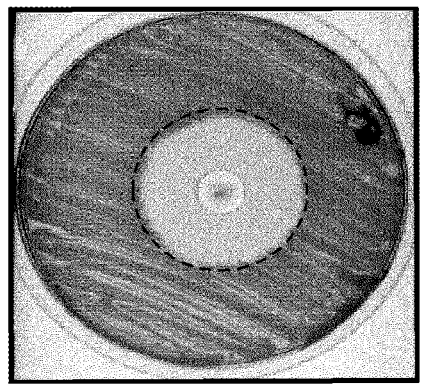
FIG. 8 shows the bactericidal effect of a solution of copper:mancozeb (2:1) against *Xanthomonas perforans* T4. The halo boundary is indicated with a dotted circle.

Efficacy of Bacterial Cell-Free Supernatants and their Live Cells in Controlling Tomato Bacterial Spot Disease Caused by *Xanthomonas* Species i. 5.1 Bacterial Cell-Free Supernatants The five bacterial isolates from Examples 4 and 4.1 that showed the highest activities against *Xanthomonas* species were used in this example: *Bacillus* amyliquefaciens subsp. *plantarum* isolates 71 and VFb49, and *Paenibacillus polymyxa* isolates To99, 273, and TFr101. Of note, the pathogen growth inhibition zone caused by cell-free supernatants of these strains was more than 30 mm in diameter (Table 3, FIG. 5), or the inhibition area of pathogen caused by 10-fold diluted bacterial supernatant was more than 200 $mm^2$. This result is comparable to the efficacy of copper plus mancozeb (2 g/L and 1 g/L, respectively; diameter of growth inhibition zone: 28.41±0.51; see FIG. 8), which is used by growers to control bacterial spot disease caused by *Xanthomonas* species. Production of secondary metabolites by *Bacillus* and *Paenibacillus* isolates for testing their efficacy in controlling tomato bacterial spot disease was performed as described above in Example 4.1.1.

ii. 5.2 Plant Pathogens

Bacterial spot of tomato is one of the most pervasive diseases that faces tomato production all over the world. It is caused by four closely related species of *Xanthomonas*: *X. gardneri*, *X. euvesicatoria*, *X. vesicatoria*, and *X. perforans*. After a number of early revisions, they were classified for some time as *Xanthomonas campestris* pv. *vesicatoria* (Xcv) [Dye, 1978]. Comparative studies of whole genome sequences from reference strains, as well as data of carbon utilization, amylolitic and pectolytic activities of these four species showed considerable diversity between these pathogens, especially the difference between *X. gardneri* and other three *Xanthomonas* species [Potins et al., 2011; EPPO Bulletin, 2013]. Also, Race T1, caused by *X. euvesicatoria* was the endemic race in Florida until 1991, when *X. perforans* race T3 (antagonistic to race T1), emerged. Race T4 came about as a result of a mutation in the *X. perforans* avrXv3 gene, and has recently become prevalent [Jones et al., 2004; Jones et al., 2005]. Thus, *X. perforans* race T4 and *X. gardneri* DC00T7A were used herein.

*X. perforans* T4 or *X. gardneri* DC00T7A was incubated in TSB at 30° C. for 16h (overnight). Cell culture medium was centrifuged at 10,000×g for 5 min. The supernatant was discarded and bacterial cells were resuspended in sterile distilled water. The NanoDrop™ ND-1000 spectrophotometer was set to measure absorbance at 600 nm wavelength, and the suspension was adjusted to an optical density $(OD_{600nm})$ of 0.2, which was empirically determined to represent $2 \times 10^8$ CFU/mL by plating serial dilutions of the suspension and counting colonies. Prior to spraying tomato seedlings, cell suspension of pathogen was mixed with the surfactant Silwet L-77 at 0.025% (v/v) to help in the penetration and infection of the plants.

iii. 5.3 Plant Materials

Tomato *Solanum lycopersicum* L. var. *cerasiforme* (Dunal) (D. M. Spooner et al.) cv. Bonny Best (OSC Seeds, Waterloo, Ontario, Canada) or Florida 47 (Harris seeds, Rochester, NY, US) seeds were planted in Pro-Mix™ BX Mycorrhizae™ (Premier horticulture Inc., Quakertown, Pennsylvania, USA) with adding all-purpose NPK (20-20-20) fertilizer (Plant Products Co. LTD., Brampton, Ontario, Canada).

Tomato seedlings were grown in plastic pots (6.0×6.0 cm) in a growth chamber (25° C., relative humidity (RH) 40%, with a photoperiod of 16 hours (light intensity is about 200.0 lum/sqf) for two weeks (the four-true-leaf stage) prior to infestation by *X. perforans* T4 or *X. gardneri* DC00T7A.

Temperature, relative humidity (RH), and lightness were monitored hourly during the research using Hobo™ digital system (Onset computer corporation) that was located in the center of the shelf with tomatoes.

iv. 5.4 Experimental Design

The trials under growth chamber conditions were carried out on tomato seedlings to assess the efficacy of cell-free bacterial supernatants of *B. amyliquefaciens* subsp. *plantarum* and *P. polymyxa* isolates in controlling artificial infections caused by *X. perforans* T4, as compared to a mix of copper and mancozeb (2 and 1 g/L, respectively).

Each treatment was replicated 3 times with four seedlings per replicate, according to a randomized blocks design. The same number of not-inoculated and treated by water, not-inoculated and treated by TSB plants served as negative controls. Inoculated and treated by water, inoculated and treated by TSB tomato seedlings served as positive controls. Bacterial cell-free supernatants from each strain were applied for testing their phytotoxic effect in plants.

Tomato seedlings were sprayed on abaxial and adaxial leaf surfaces to leaf wetness with a hand sprayer, applying approximately 2 mL of *X. perforans* T4 suspension per plant. After 1 h of inoculation, seedlings were treated by spraying cell-free supernatants, water, or TSB, respectively, using a hand-pump up to run-off of plants. Tomato seedlings were maintained for 48h under plastic bags and then placed in a growth chamber (30° C., RH 60% with a photoperiod of 16 hours) for one week.

Figure 9:
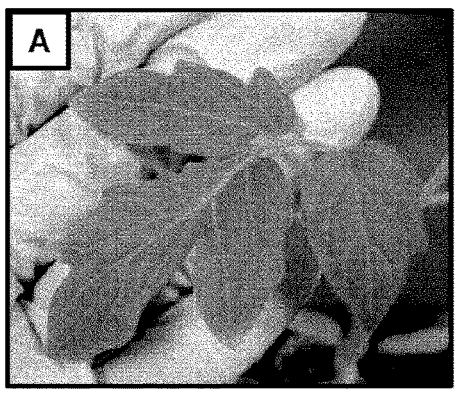
FIG. 9 presents photographs showing the effects of different treatments on leaf spots on the leaves of tomato seedlings. In the individual panels, A: not-infected and treated by water; B: infected by *X. perforans* T4 and treated by Tryptic Soy Broth (TSB); C & D: infected by *X. perforans* T4 and treated by water—upper (C) and lower (D) leaves surfaces are shown; E & F: infected by *X. perforans* T4 and treated by copper plus mancozeb—upper (E) and lower (F) leaves surfaces are shown; G & H: infected by *X. perforans* T4 and treated by cell-free supernatant of *B. amyloliquefaciens* subsp. *plantarum* 71—upper (G) and lower (H) leaves surfaces are shown; I & J: infected by *X. perforans* T4 and treated by cell-free supernatant of *P. polymyxa* To99—upper (I) and lower (J) leaves surfaces are shown; K & L: infected by *X. perforans* T4 and treated by cell-free supernatant of *P. polymyxa* TFr101: upper (K) and lower (L) leaves surfaces are shown; M: not-infected and treated by cell-free supernatant of *B. amyloliquefaciens* subsp. *plantarum* 71; and N: not-infected and treated by cell-free supernatant of *P. polymyxa* To99; O & P: infected by *X. perforans* T4 and treated with cell-free supernatant of *B. amyloliquefaciens* subsp. *plantarum* VFb49: adaxial (O) and abaxial (P) leaves surfaces are shown; Q & R: infected by *X. perforans* T4, treated with cell-free supernatant of *P. polymyxa* 273: adaxial (Q) and abaxial (R) leaves surfaces.
Figure 9:
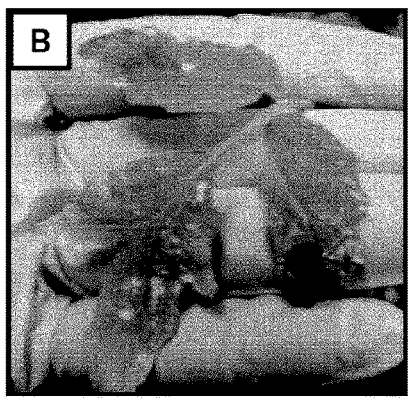
Figure 9:
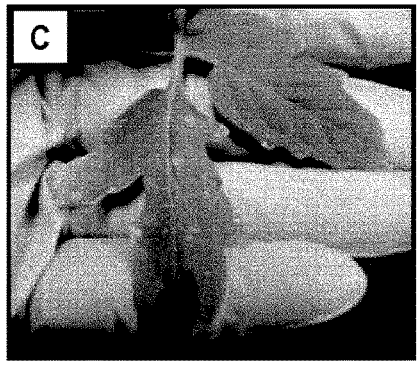
Figure 9:
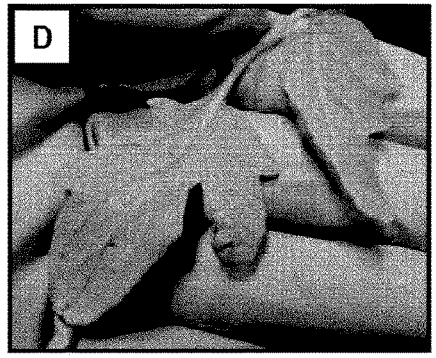
Figure 9:
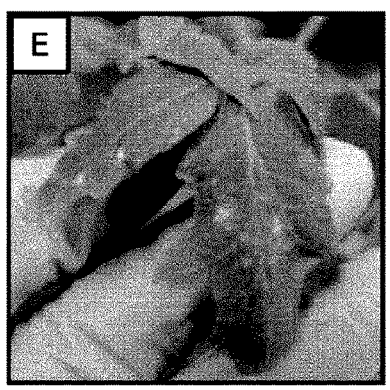
Figure 9:
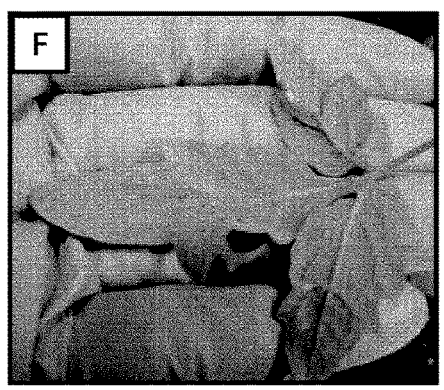

The plants were assessed for disease severity by visual estimation of the percentage of leaf tissue with spots and lesions 10 days after infestation. Symptoms on the leaves were recorded for each plant by two persons independently. Disease severity assessments were made based on leaf rating compiled from three separate experiments.

v. 5.5 Curative Effect of Cell-Free Bacterial Supernatants Reduction of Leaf Spots All treatments with bacterial cell-free supernatants were effective in controlling leaf spot caused by *X. perforans* T4 on tomato seedlings (FIG. 9 A-R).

Thus, severity disease was evaluated as 70% in plants infected by *X. perforans* T4 and treated by water, and 90% in plants infected by *X. perforans* T4 and treated by TSB, comparative to not-infected tomato seedlings (FIG. 9 A-D). Susceptible reactions manifested 7 days after infestation as small, greasy water-soaked spots (about ⅛ inch) on leaflets. Older spots became dry and brown, and often surrounded by yellow halos. Spots increased in size to form large, irregular dead spots. Lesions were frequently surrounded by large chlorotic haloes and perforations, referring to the holes in the leaf following infection by the bacterium (FIG. 9 A-L, O-R).

Treatment with bacterial cell-free supernatant of *B. amyloliquefaciens* subsp. *plantarum* isolates 71 (FIG. 9 G-H) and VFb49 (FIG. 9 O-P), as well as *P. polymyxa* isolates TFr101 (FIG. 9 K-L) and 273 (FIG. 9 Q-R) reduced disease severity by almost 4 times compared to the water-treated control (FIG. 9 C, D). Thus, only 20% of leaf surface was infected by *X. perforans* T4 after tomato treatment by cell-free supernatants of these isolates (FIG. 9 G, H, K, L, O, P, Q, R).

Almost the same effect in controlling bacterial spot disease was shown for cell-free supernatants of *B. amyloliquefaciens* subsp. *plantarum* VFb49 (FIG. 9 O, P) and *P. polymyxa* 273 (FIG. 9 Q, R), reducing disease severity by about 4.6-fold as compared to the water-treated control. Only 40% of leaf surfaces of tomato seedlings treated by metabolites of these isolates were infected by *X. perforans* T4.

The cell-free supernatant of *P. polymyxa* To99 reduced disease severity by about 2-fold as compared to positive control (FIG. 9 I, J). Thus, about 40% of leaf surfaces of tomato seedlings were infected by *X. perforans* T4, which is comparable with treatment by copper and mancozeb (FIG. 9 C-F, I, J). Of note, spots and lesions appeared on only one of six leaves per plant infected by *X. perforans* T4 and treated by bacterial cell-free supernatants, while infected and not-treated plants had four of six leaves with these disease symptoms.

Bacterial cell-free supernatant of all strains sprayed as is with no dilution did not cause any phytotoxic effect in tomato plants (e.g., FIG. 9 M, N).

In conclusion, cell-free supernatants of bacterial isolates showed suppression of bacterial spot disease caused by *X. perforans* T4, comparable to copper-mancozeb, suggesting that they may be potentially suitable replacements to chemical biocides.

vi. 5.6 Preparation of Live Cell Suspensions of Bacterial Isolates and Application to Tomato Leaves

*P. polymyxa* and *B. amyloliquefaciens* subsp. *plantarum* isolates were removed from frozen stock vials and 5 µL of each isolate was added to 3 mL of TSB. Bacteria were cultivated at 30° C. for 16h (overnight). Cell culture medium was centrifuged at 10,000×g for 5 min and washed twice by 0.85% NaCl. The supernatant was discarded and bacterial cells were resuspended in sterile 0.85% NaCl adjusting to the final concentration $3\times10^8$ CFU/mL (OD=0.3). Live cell suspension of bacterial isolates was applied on tomato leaves immediately after preparing.

Foliar treatment of tomato seedlings was performed by suspension of live bacterial cells ($3\times10^8$ CFU/mL) of *Bacillus* and *Paenibacillus* isolates, and respective control solutions using a hand trigger sprayer with application on abaxial and adaxial leaf surfaces until run-off. To confirm the presence of live bacterial isolates on tomato leaves, leaf print on Tryptic Soy Agar (TSA) plates and serial dilution method were performed 1 hour and 6 days after treatment.

Figure 12:
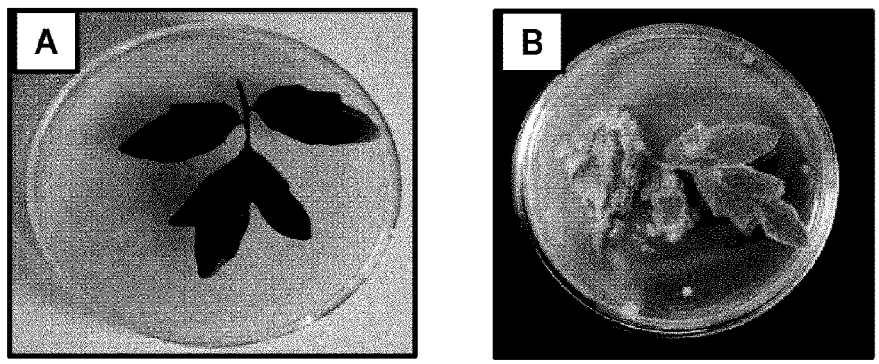
FIG. 12 shows a typical print of an untreated tomato leaf in panel (A), and one treated with *B. amyloliquefaciens* subsp. *plantarum* 71 in panel (B) after 24 hours of incubation.

For the leaf print method, one tomato leaf from each plant treated by a respective bacterial isolate was cut and put directly onto TSA plate. Plates were incubated overnight in the dark at 30° C. Then leaves were removed and plates were incubated at 30° C. for 48h. FIG. 12 shows a typical print of an untreated tomato leaf in panel (A), and one treated with *B. amyloliquefaciens* subsp. *plantarum* 71 panel (B) after 24 hours of incubation.

Figure 13:
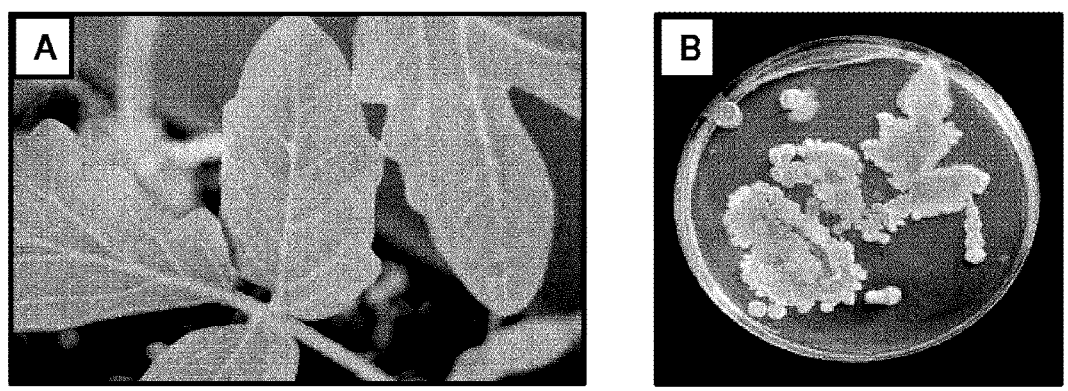
FIG. 13 shows microbial viability of bacterial isolates on tomato leaves as evaluated by the leaf print method. A whitish film on tomato leaves formed by *Bacillus* and Paenibacillus isolates 6 days after respective treatments (panels A, C, E, G, I), as well as leaf shape of their live bacterial colonies after leaf printing (panels B, D, F, H, J) are shown.
Figure 13:
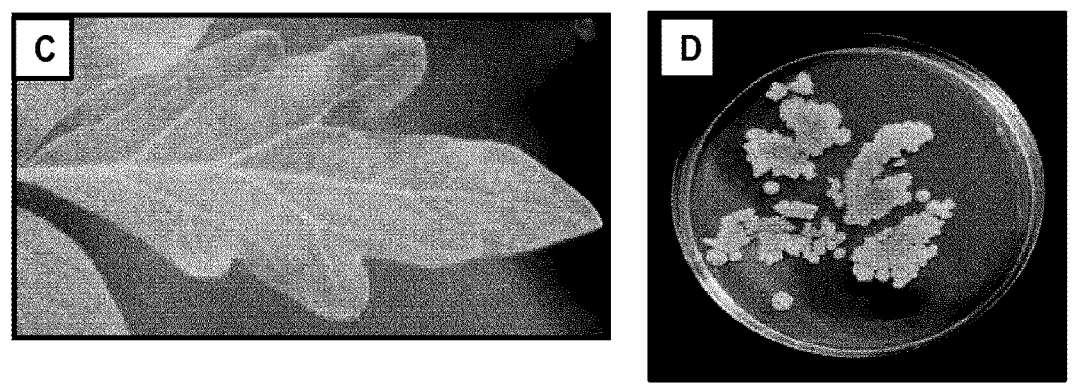
Figure 13:
Figure 13:
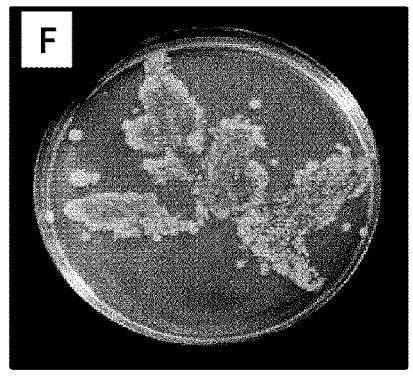
Figure 13:
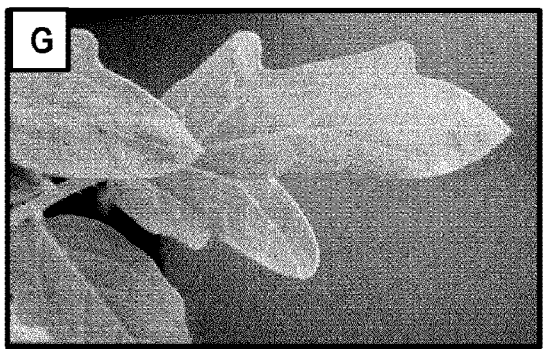
Figure 13:
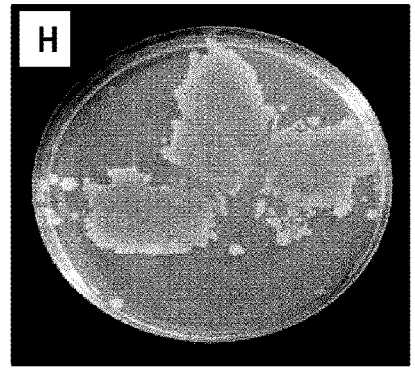
Figure 13:
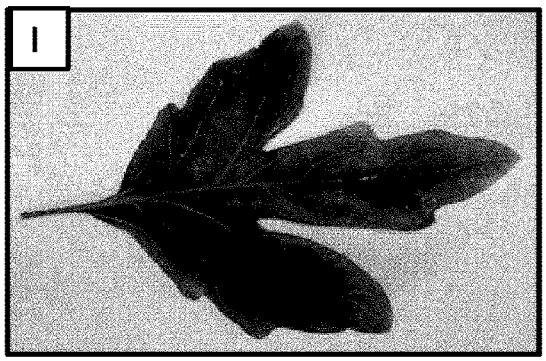
Figure 13:
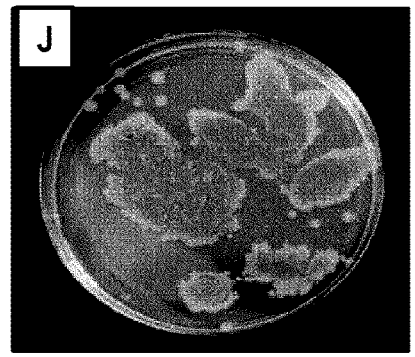

For the serial dilution method, one leaf from each plant was cut onto segments (0.5 cm²), placed in tubes containing 5 mL of 0.85% NaCl and 0.01% Triton-100, resuspended by vortexing for 5 min. Then, 100 µL of each dilution ($10^{-2}$, $10^{-3}$ and $10^{-4}$) were spread on TSA plates for isolation of bacteria. Plates were incubated in the dark at 30° C. for 2 days. Quantity of grown colonies was counted and CFU/leaf was calculated. Isolation of microorganisms was performed in triplicate. vii. 5.7 Microbial viability of bacterial isolates on tomato leaves The leaf print method used in this study (Example 5.6) allowed us to confirm the formation of bacterial biofilm on tomato leaves. FIG. 13 shows a whitish film on tomato leaves formed by *Bacillus* and *Paenibacillus* isolates 6 days after respective treatments (panels A, C, E, G, I), as well as leaf shape of their live bacterial colonies after leaf printing (panels B, D, F, H, J).

Figure 14:
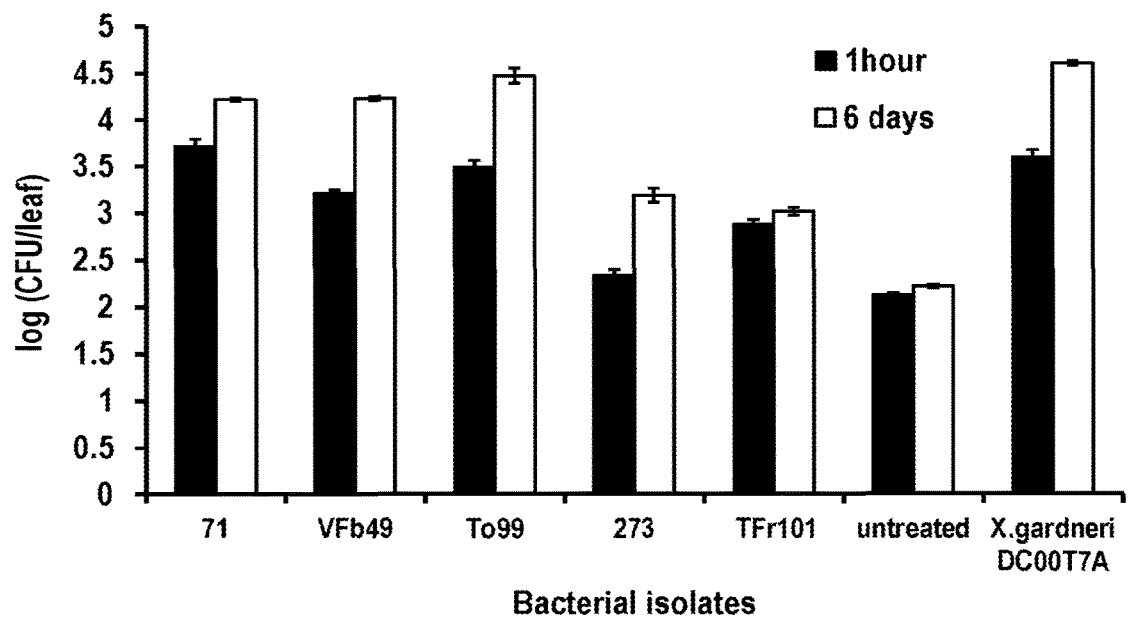
FIG. 14 shows the quantity of CFUs per leaf at 1 h or 6 h following treatment of tomato leaves with live bacterial cells of the indicated *Bacillus* and *Paenibacillus* isolates, as compared to untreated tomato leaves.

Bacterial cells of all *Bacillus* and *Paenibacillus* isolates tested in this Example were still alive on tomato leaves even 6 days following treatments, but the quantity of CFUs per leaf was different depending on the isolates. As shown in FIG. 14, 1 hour after treatment, the leaves treated by *B. amyloliquefaciens* subsp. *plantarum* 71 contained the highest quantity (log of CFU/leaf reached 3.77) of bacterial live cells, while the quantity of *P. polymyxa* 273 live cells was 1.6-fold less (log of CFU/leaf reached up 2.33). Six days after treatment, the quantity of CFU/leaf of *Bacillus* and *Paenibacillus* isolates increased by about 1.5 fold. There was no significant difference in the quantity of live bacterial cells on untreated tomato leaves after 1 hour and 6 days (FIG. 14, "untreated"), while the CFU/leaf of *X. gardneri* DC00T7A was 1.3-fold higher after 6 days of inoculation (FIG. 14, "*X. gardneri* DC00T7A").

Figure 15:
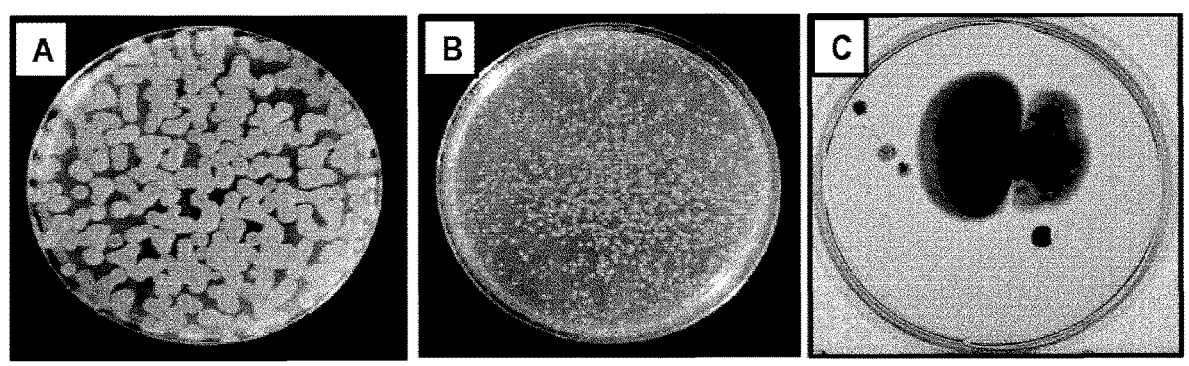
FIG. 15 shows the colonies formed on TSA by microorganisms isolated from untreated tomato leaves after 6 days (panel C), or from tomato leaves treated 6 days prior with *B. amyloliquefaciens* subsp. *plantarum* 71 (panel A) or *P. polymyxa* To99 (Panel B).

Of note, the colonies formed on TSA by bacteria isolated from untreated tomato leaves were morphologically different from those treated by *Bacillus* and *Paenibacillus* isolates. Using the serial dilution method (Example 5.6), 2 fungal and 4 bacterial morphologically different colonies were isolated from untreated tomato leaves after 6 days (FIG. 15C), while only *B. amyloliquefaciens* subsp. *plantarum* 71 and *P. polymyxa* To99 colonies appeared on TSA after their isolation from respectively treated tomato leaves (FIG. 15A, B). viii. 5.8 Preventive effect of bacterial live cells and their supernatants in controlling bacterial spot disease caused by *X. gardneri* DC00T7A Tomato seedlings were sprayed on abaxial and adaxial leaf surfaces to leaf wetness with a hand sprayer, applying approximately 2 mL of cell-free bacterial supernatants or live cell suspension per plant. Water and TSB were used as controls. After treatment, plants were placed in a growth chamber (30° C., RH 60% with a photoperiod of 16 hours) for one week. Then, tomato seedlings were infected by *X. gardneri* DC00T7A in the same way using a hand-pump up to run-off of plants and placed in a growth chamber. After 10 days, the effectiveness of cell-free supernatants and live cells was evaluated as the reduction of spot numbers per plant compared to the pathogen-only control. The results were compiled from three separate experiments.

Figure 16:
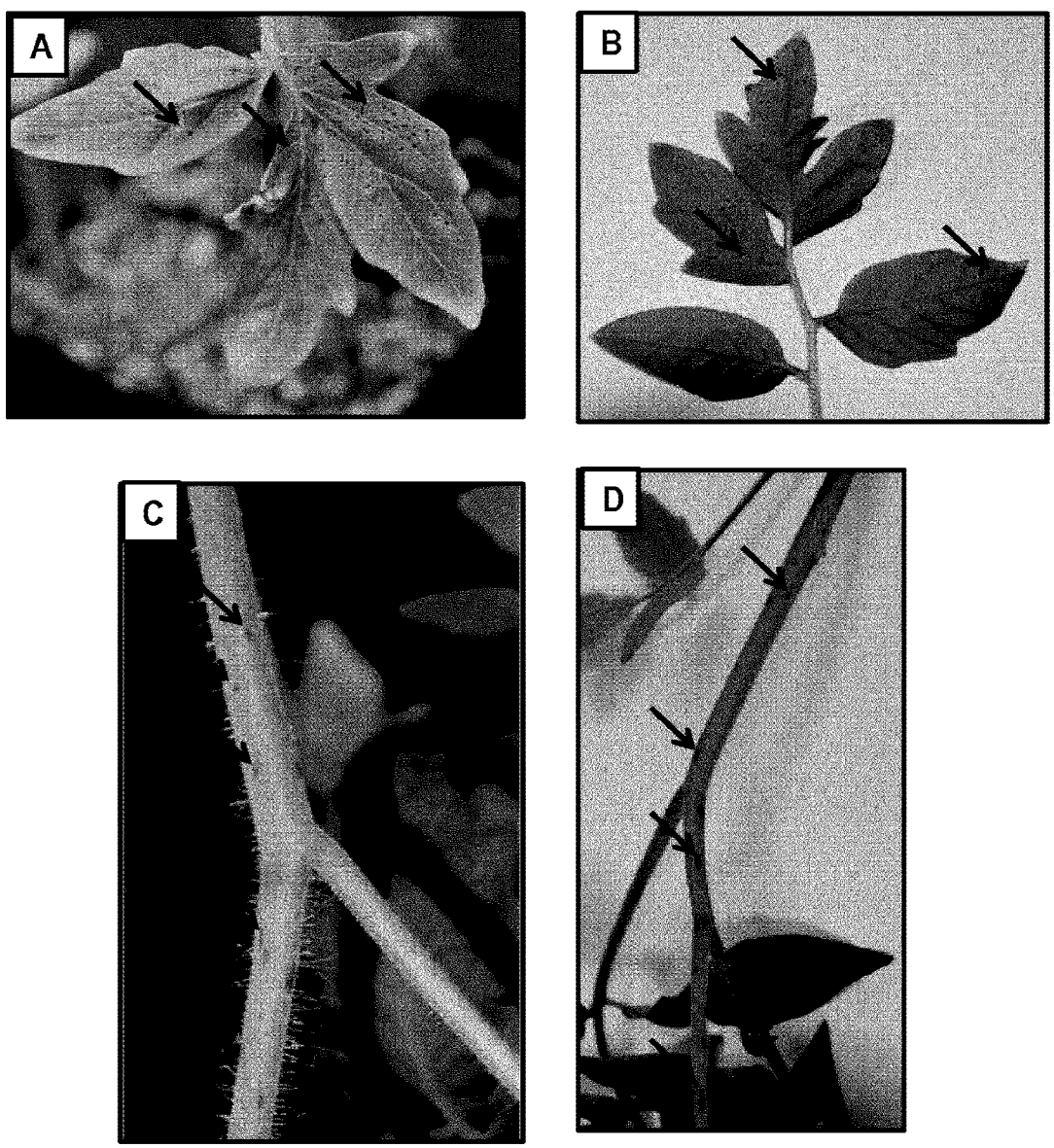
FIG. 16 shows yellow-brownish lesions caused by *X. perforans* T4 on tomato leaves, susceptible reaction caused by *X. gardneri* DC00T7A manifested 10 days after infestation as well-defined brown spots appeared on leaves (panels A and B) and stems (panels C and D). Brown spot are indicated with arrows.

In contrast to yellow-brownish lesions caused by *X. perforans* T4 on tomato leaves, susceptible reaction caused by *X. gardneri* DC00T7A manifested 10 days after infestation as well-defined brown spots appeared on leaves (FIG. 16 A, B) and stems (FIG. 16 C, D). Brown spot are indicated with arrows. Thus, the preventive effect of live cells of *B. amyloliquefaciens* subsp. *plantarum* (isolates 71 and VFb49) and *P. polymyxa* (isolates To99, Tfr101 and 273) and their metabolites was evaluated as the reduction of spot numbers per plant.

Figure 17:
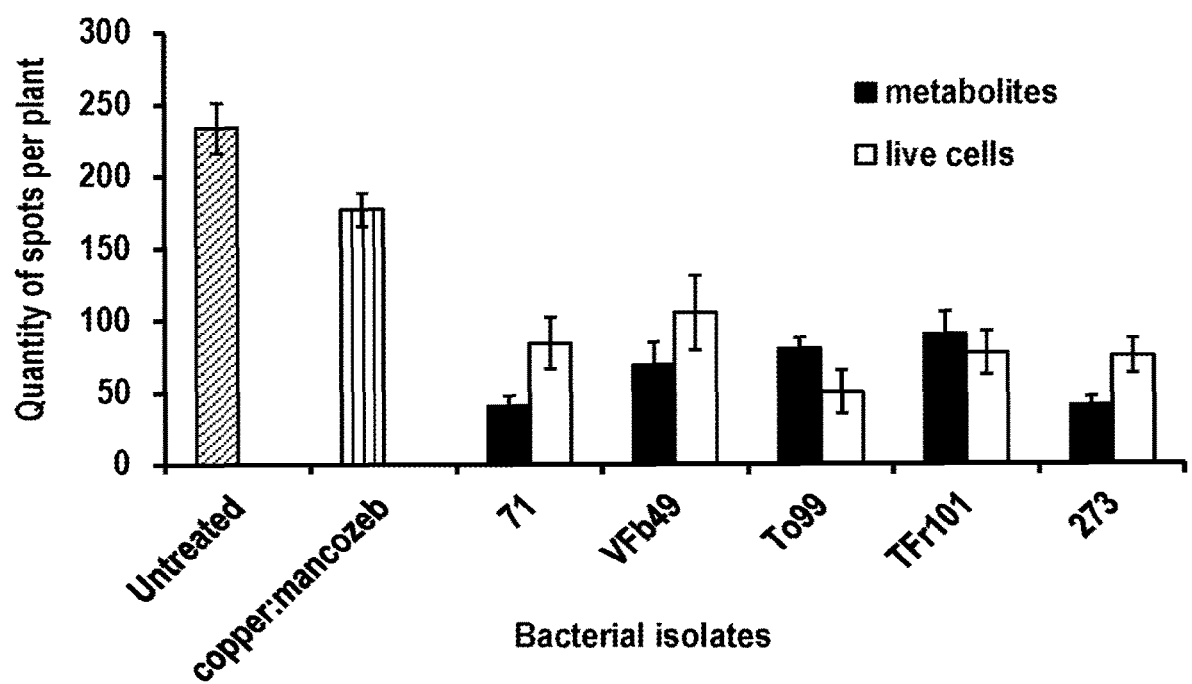
FIG. 17 shows the preventative effect of pre-treating the leaves of tomato seedlings with live cells of *Bacillus* and *Paenibacillus* isolates, or their metabolites (supernatants), followed by infection with *X. gardneri* DC00T7A. Results are expressed as the quantity of spots per plant.

As shown in FIG. 17, treatment of the leaves of tomato seedlings with live cells of *Bacillus* and *Paenibacillus* isolates (as well as by their metabolites) 6 days before *X. gardneri* DC00T7A infection reduced bacterial spot disease by about 2-5 fold as compared to untreated plants. The metabolites of *B. amyloliquefaciens* 71 and *P. polymyxa* 273 were twice more effective in controlling this disease than their live cells, while metabolites of *P. polymyxa* To99 were 1.6 fold less effective than their live cells. There was no statistical difference between the efficacy of live cells and their metabolites of *P. polymyxa* TFr101 and *B. amyloliquefaciens* VFb49 in reduction of bacterial spots caused by *X. gardneri* DC00T7A. All *Bacillus* and *Paenibacillus* isolates (live cells as well as metabolites) showed 2-fold suppression of bacterial spot disease caused by *X. gardneri* DC00T7A, as compared to copper:mancozeb.

h) Example 6

Characterization of secondary metabolites produced by *Bacillus* and *Paenibacillus* isolates Cell-free supernatants of the *B. amyloliquefaciens* subsp. *plantarum* isolates VFb49 and 71, as well as the *P. polymyxa* isolates To99, TFr101, 273 and 329) were obtained by culturing in optimized media as described in Example 4.1.1.

i. 6.1 Sensitivity of Metabolites to Light Exposure

Figure 18:
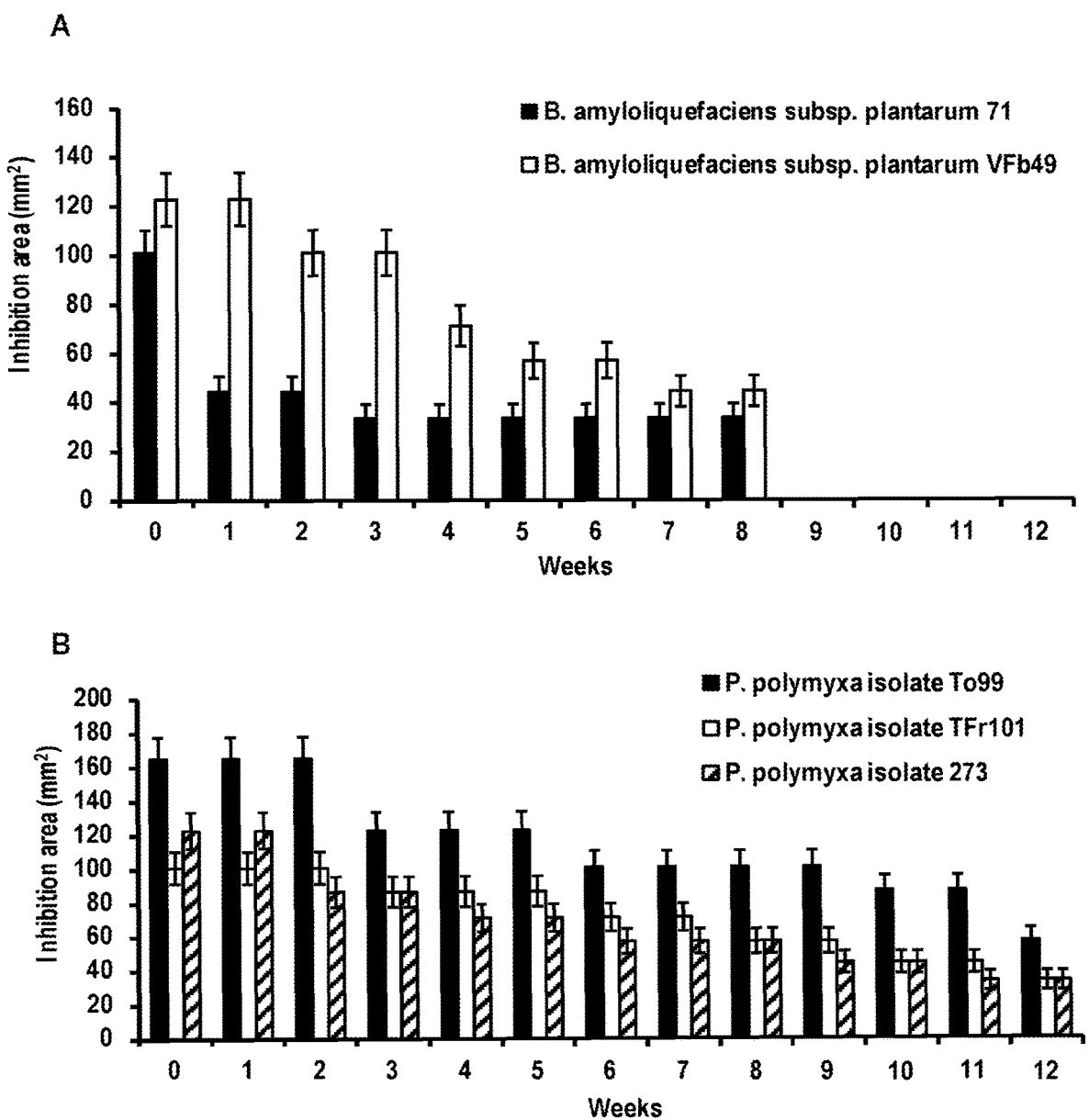
FIG. 18 shows the results of agar disc diffusion assays performed in order to evaluate the sensitivity of bacterial metabolites (cell-free supernatants) to light exposure for 0 to 12 weeks. Antimicrobial activity was then tested weekly by placing the paper discs saturated with 10-fold diluted cell-free supernatants on a lawn of *Xanthomonas gardneri* DC00T7A and measuring the inhibition area (in mm$^2$). (A) *B. amyloliquefaciens* subsp. *plantarum* 71 and VFb49; (B) *P. polymyxa* To99, TFr101, and 273.
Figure 19:
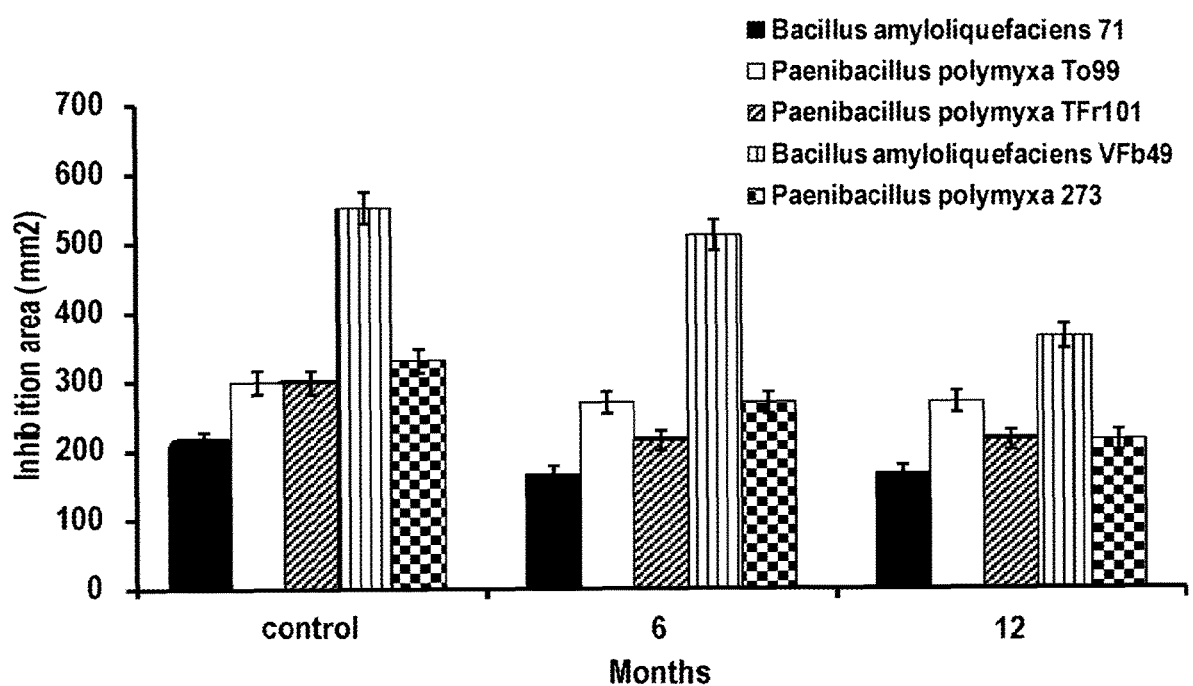
FIG. 19 shows the antimicrobial activities of *Paenibacillus* and *Bacillus* 10-fold diluted cell-free supernatants against *X. gardneri* DC00T7A after storage at −20° C. for 0, 6 or 12 months.

An agar disc diffusion assay was performed in order to evaluate the sensitivity of bacterial metabolites to light exposure. Paper blank discs (diameter=6 mm) were saturated with 10-fold diluted cell-free supernatants (20 µL), air-dried overnight in the biological cabinet, and exposed to light at room temperature (22° C.) for 3 months. Antimicrobial activity was then tested weekly by placing the saturated discs on a lawn of *Xanthomonas gardneri* DC00T7A and measuring the inhibition area (in mm$^2$). The results are shown in FIG. 18 A and B.

As shown in FIG. 18A-B, the anti-*Xanthomonas* activities of the 10-fold diluted cell-free supernatants of almost all of the tested isolates gradually decreased with increasing exposure to light. The cell-free supernatants exhibiting the highest resistance to light exposure were those from the tested strains of *Paenibacillus polymyxa*, whose activity began to decrease only after 3 weeks of light exposure. In fact, the *P. polymyxa*-derived supernatants exhibited activity against *X. gardneri* DC00T7A even after 12 weeks of light exposure, in contrast to those from the *B. amyloliquefaciens* subsp. *plantarum* strains. Among the supernatants from the different *Paenibacillus polymyxa* strains tested, *P. polymyxa* To99 exhibited the highest activity against *X. gardneri* DC00T7A.

ii. 6.2 Thermal stability of metabolites

To determine the thermal stability of the metabolites, aliquots of each cell-free supernatants were heated at 40° C., 60° C., 80° C. or 100° C. for 30 min, or autoclaved (121° C.) for 15 min (Kabore et al., 2012; Meng et al., 2012; Compaore et al, 2013). The aliquots of each supernatant were also exposed to 4° C. and room temperature (about 22° C.) for 6 weeks, and to −20° C. for 1 year. The antimicrobial activity was then tested by the agar-well diffusion method by measuring the inhibition area (mm$^2$) of *Xanthomonas gardneri* DC00T7A, as described in Example 6.1. The results are shown in Tables 29 and 30.

TABLE 29

Effect of heating on the antimicrobial activity of 10-fold diluted *Bacillus* and *Paenibacillus* cell-free supernatants against *X. gardneri* DC00T7A

| Temperature/ incubation time | Paenibacillus polymyxa | | | Bacillus amyloliquefaciens subsp. plantarum | |
|---|---|---|---|---|---|
| | To99 | 273 | TFr101 | 71 | VFb49 |
| Untreated | 284 ± 30 | 255 ± 20 | 212 ± 29 | 285 ± 14 | 514 ± 22 |
| 40° C. for 30 min | 186 ± 13 | 172 ± 9 | 149 ± 9 | 241 ± 11 | 430 ± 20 |
| 60° C. for 30 min | 177 ± 16 | 172 ± 9 | 145 ± 11 | 144 ± 9 | 433 ± 20 |
| 80° C. for 30 min | 163 ± 12 | 156 ± 10 | 137 ± 9 | 144 ± 9 | 430 ± 20 |
| 100° C. for 30 min | 144 ± 12 | 150 ± 9 | 0 | 137 ± 9 | 296 ± 27 |
| 121° C. for 15 min | 0 | 0 | 0 | 137 ± 9 | 0 |

"±" Standard Error of Mean (SEM)

As shown in Table 29, 10-fold diluted cell-free supernatants from all the tested *Paenibacillus* and *Bacillus* isolates were at least somewhat sensitive to heating, as their anti-*Xanthomonas* activities decreased with increasing temperature. Those most sensitive to high temperatures were the cell-free supernatants from the *P. polymyxa* isolates and *B. amyloliquefaciens* subsp. *plantarum* VFb49, which completely lost their activities after autoclaving at 121PC for 15 minutes. In contrast, 10-fold diluted cell-free supernatant of *B. amyloliquefaciens* subsp. *plantarum* 71 was still active against *X. gardneri* DC00T7A even after autoclaving.

TABLE 30

Effect of storage of Bacillus and Paenibacillus cell-free supernatants at different temperatures on their antimicrobial activity against *X. gardneri* DC00T7A

| | Inhibition area* (mm2) *Paenibacillus polymyxa* | | | | | | | | | |
|---|---|---|---|---|---|---|---|---|---|---|
| | To99 | | | | | | *Bacillus amyloliquefaciens* subsp. *plantarum* | | | |
| | 4° C. | | 273 | | TFr101 | | 71 | | VFb49 | |
| Weeks | 514+28 | 22° C. | 4° C. | 22° C. | 4° C. | 22° C. | 4° C. | 22° C. | 4° C. | 22° C. |
| control | 475 ± 21 | 514 ± 22 | 394 ± 19 | 394 ± 18 | 327 ± 17 | 327 ± 17 | 314 ± 22 | 314 ± 17 | 607 ± 19 | 607 ± 19 |
| 1 | 437 ± 20<br>p = 0.004 | 506 ± 22 | 366 ± 18 | 360 ± 18 | 308 ± 13 | 290 ± 25 | 314 ± 22 | 302 ± 17 | 607 ± 19 | 589 ± 23 |
| 2 | 430 ± 20 | 380 ± 24<br>p = 0.001 | 314 ± 22<br>p-0.003 | 314 ± 22<br>p = 0.003 | 308 ± 13 | 290 ± 32 | 302 ± 20 | 121 ± 11<br>p = 0.002 | 598 ± 23 | 531 ± 29 |
| 3 | 366 ± 18 | 380 ± 24 | 314 ± 22 | 302 ± 17 | 243 ± 15<br>p = 0.001 | 254 ± 20<br>p = 0.003 | 255 ± 20<br>p = 0.002 | 0 | 598 ± 23 | 498 ± 17<br>p = 0.001 |
| 4 | 254 ± 20 | 290 ± 25 | 314 ± 22 | 302 ± 17 | 249 ± 12 | 227 ± 19 | 255 ± 11 | 0 | 589 ± 23 | 483 ± 17 |
| 5 | 248 ± 12 | 216 ± 14 | 249 ± 12 | 249 ± 12 | 196 ± 11 | 201 ± 18 | 206 ± 18 | 0 | 555 ± 22 | 437 ± 20 |
| 6 | | | | | | | | | | |

"±" Standard Error of Mean (SEM)

*Inhibition area represent the effect of 10-fold diluted supernatants

Values in bold are significantly different (at the indicated p value) from the corresponding control value. The control is the anti-*Xanthomonas* activity of fresh supernatants after 1 h storage at 4° C. and 22° C., respectively.

The antimicrobial activities of *Paenibacillus* and *Bacillus* 10-fold diluted cell-free supernatants against *X. gardneri* DC00T7A after storage at −20° C. are shown in FIG. 19. The most resistant to the storage at −20° C. were metabolites of *P. polymyxa* To99 and *B. amyloliquefaciens* subsp. *plantarum* VFb49. There was no statistically significant difference ($p<0.05$) between anti-*Xanthomonas* activity of *P. polymyxa* To99 supernatants, even after 6 and 12 months comparing to control. The control was the anti-*Xanthomonas* activity of fresh supernatant that was tested against *Xanthomonas* on the same day when it was obtained; and it was not subjected to any of the indicated conditions (i.e., 4° C., 22° C. and −20° C.).

iii. 6.3 Extraction of Secondary Metabolites and their Effects on Anti-*Xanthomonas* Activity Extraction of secondary metabolites by butanol allowed for the detection of particular types compounds (e.g., lipopeptides) produced by *Bacillus* and *Paenibacillus* isolates. This method was performed according to Wulf et al. (2002) and Yokota et al. (2012) with some modifications. Briefly, 2 mL of culture supernatant was extracted using 2 mL of 2-butanol by vortex mixing for 20 seconds. After centrifugation at 10 000× g for 5 min at 20° C., the organic (upper) layer was collected into glass vials. The remaining aqueous layer was extracted twice adding 500 μL of 2-butanol. The organic fractions were combined and evaporated at 30° C. under a gentle stream of nitrogen. The dried sample was dissolved in 2 mL of $dH_2O$. The antimicrobial activity of undiluted and 10-fold diluted fractions was estimated using well diffusion method by measuring the inhibition area ($mm^2$) of *Xanthomonas gardneri* DC00T7A, as described in Example 6.1. The results are shown in Table 31.

TABLE 31

Antimicrobial activity of *Bacillus and Paenibacillus* metabolite extractions against *X. gardneri* DC00T7A

| | Inhibition area* ($mm^2$) Supernatant | | | | | |
|---|---|---|---|---|---|---|
| | 100% | | Organic phase | | Aqueous phase | |
| Bacterial isolates | 572 ± 30 | 10% | 100% | 10% | 100% | 10% |
| *P. polymyxa* To99 | 445 ± 31 | 549 ± 23 | 584 ± 30 | 0 | 708 ± 86 | 243 ± 15 |
| *P. polymyxa* TFr101 | 564 ± 35 | 191 ± 13 | 145 ± 11 | 0 | 539 ± 34 | 172 ± 19 |
| *P. polymyxa* 273 | 547 ± 36 | 243 ± 15 | 191 ± 13 | 0 | 539 ± 34 | 238 ± 15 |
| *B. amyloliquefaciens* subsp. *plantarum* 71 | 1110 ± 32 | 227 ± 19 | 438 ± 33 | 141 ± 18 | 206 ± 21 | 0 |
| *B. amyloliquefaciens* subsp. plantarum VFb49 | | | | | | |

The anti-*Xanthomonas* activity of organic and aqueous phases of all 5 bacterial isolates indicates that they produce several compounds, including lipopeptides, with different diffusion abilities. For example, 100% organic phase (lipopeptides) of *P. polymyxa* To99 supernatant showed the same anti-*Xanthomonas* activity as 100% crude supernatant, while 100% aqueous phase of its supernatant was 1.2-fold more active against *X. gardneri* DC00T7A. Regarding *P. polymyxa* isolates TFr101 and 273, the aqueous phases of their supernatants were more active against *X. gardneri* DC00T7A than their organic phases. In contrast, the aqueous phases of *Bacillus* supernatants were less active against *X. gardneri* DC00T7A than their corresponding organic phases. Among all 5 bacterial isolates, the organic phase of *B. amyloliquefaciens* subsp. *plantarum* VFb49 supernatant, as well as its crude supernatant, showed the highest anti-*Xanthomonas* activity (Table 31).

i) Example 7

Complete Genome Sequencing

The whole genome sequencing was performed to further confirm the taxonomic identification of the isolates, in addition to the results already obtained from the sequencing of 16S rDNA (Example 2.2) and specific (gyrA, gyrB and rpoB) genes (Examples 2.3 and 2.5), biochemical tests of Biolog™ microbial identification system (Example 2.3a), and fatty acid analyses (Example 2.4).

i. 7.1 Materials and Methods

Genomic DNA was isolated from an overnight culture of each strain (71, VFb49, To99, TFr101, and 273) using a Qiagen DNeasy™ blood and tissue kit (Qiagen Inc., Valencia, CA). Genome sequencing was performed using Illumina MiSeq™ sequencing system (Illumina, San Diego, CA), achieving >50× average genome coverage. De novo assembly was created for each genome using SPAdes™ 3.0.0 (St. Petersburg genome assembler), and annotated with the NCBI Prokaryotic Genomes Automatic Annotation Pipeline (http://www.ncbi.nlm.nih.gov/genomes/static/Pipeline.html). Taxonomy of each strain was assigned using Kraken™ (Wood and Salzberg, 2014), a metagenomics sequence classification tool (http://ccb.jhu.edu/software/kraken/). Genome mining of biosynthetic gene clusters, including non-ribosomal peptide synthetases (NRPSs) and other secondary metabolites, were predicted with antibiotics & Secondary Metabolite Analysis SHell™ (antiSMASH™) (Weber et al., 2015) web server (http://antismash.secondarymetabolites.org/).

ii. 7.2 Results

*Bacillus amyloliquefaciens* subsp. *plantarum* isolates 71 and VFb71, as well as *Paenibacillus polymyxa* isolates To99, TFr101 and 273 possessing the highest anti-*Xanthomonas* activity were subjected to the whole genome sequence analysis. Genome annotations for these bacterial isolates are summarized below.

High genome coverage (88-119%) and very low (2.06-10.47%) percentage of unclassified reads of all isolates reflect the accuracy of the species identification (Table 32.1).

TABLE 32.1

Genome sequencing and annotation details of the most active isolates against *Xanthomonas perforans*

| Isolates | *Bacillus amyloliquefaciens* subsp. *plantarum* | | *Paenibacillus polymyxa* | | |
|---|---|---|---|---|---|
| | 71 | VFb49 | To99 | TFr101 | 273 |
| Genome coverage (%) | 97 | 119 | 110 | 109 | 88 |
| N50 (bp) | 93,762 | 589,918 | 92,187 | 141,501 | 364,236 |
| Number of contigs | 105 | 53 | 203 | 188 | 206 |
| Unclassified reads (%) | 2.06 | 2.97 | 4.53 | 10.47 | 7.37 |

The ANI calculator was used (http://enve-omics.ce.gatech.edu/ani/index) to compare the nucleotide identity of the bacterial isolates with already known and type strains of *Paenibacillus* and *Bacillus* species from the NCBI database (http://www.ncbi.nlm.nih.gov/nuccore). The ANI calculator estimates the average nucleotide identity using both best hits (one-way ANI) and reciprocal best hits (two-way ANI) between two genomic datasets, as calculated by Goris et al., 2007. Typically, the ANI values between genomes of the same species are above 95%.

TABLE 32.2

The average nucleotide identity (%) based on complete genome sequencing between *Bacillus* (A) and *Paenibacillus* (B) isolates possessing anti-*Xanthomonas* activity and type strains

A

| Bacterial strains | VFb49 | *Bacillus amyloliquefaciens* subsp. *amyloliquefaciens* DSM7 | *Bacillus amyloliquefaciens* subsp. *plantarum* CC178 |
|---|---|---|---|
| 71 | 98.58 | 93.57 | 99.02 |
| VFb49 | — | 93.52 | 98.60 |

B

| Bacterial strains | TFr101 | 273 | *Paenibacillus peoriae* HS311 | SC2 |
|---|---|---|---|---|
| To99 | 95.17 | 99.20 | 99.03 | 89.24 |
| TFr101 | — | 95.19 | 95.19 | 89.50 |
| 273 | — | — | 99.04 | 89.26 |

Thus, the VFb49 and 71 isolates showed about 99% nucleotide identity with *Bacillus amyloliquefaciens* subsp. *plantarum* (Table 32.2A), which confirms our previous identification based on sequencing of gyrA, gyrB and rpoB genes, specific for *Bacillus subtilis* group.

Comparing complete genome sequencing of *Paenibacillus* isolates To99, TFR101 and 273 with two closely related and well known strains *Paenibacillus peoriae* HS311 and *Paenibacillus polymyxa* SC2, we observed that nucleotide identity of both isolates To99 and 273 with *Paenibacillus peoriae* strain HS311 reached 99%, while isolate TFr101 showed 95% identity with this strain (Table 32.2B). All three *Paenibacillus* isolates showed only 89% nucleotide identity (<95%) with *Paenibacillus polymyxa* SC2. Thus, *Paenibacillus* isolates To99, 273 and TFr101 are more accurately re-identified as *Paenibacillus peoriae*, instead of *Paenibacillus polymyxa*.

Comparing complete genome sequencing of *Bacillus* and *Paenibacillus* isolates between themselves showed that isolates To99 and 273 are closely related isolates with nucleotide identity of 99.20%, while isolate TFr101 was different from both of them and its nucleotide identity with these isolates averaged only 95%. Taking into account that the ANI value between isolate TFr101 and *Paenibacillus peoriae* strain HS311 is on the border of 95%, probably *Paenibacillus* isolate TFr101 could be a new species, or it can be explained by high value (10.47%) of unclassified reads.

The antibiotics Secondary Metabolite Analysis Shell (antiSMASH™) tool allowed us to identify 3 polyketide synthetases (PKSs), 15 non-ribosomal peptide synthetases (NRPSs), and 3 hybrid PKSs/NRPSs genes that could be involved in the synthesis of secondary metabolites of *Bacillus amyloliquefaciens* subsp. *plantarum* and *Paenibacillus polymyxa* isolates possessing the highest anti-*Xanthomonas* activity (Table 32.3). Genome of *B. amyloliquefaciens* subsp. *plantarum* (isolates 71 and VFb49) and *P. polymyxa* (isolates To99, TFr101 and 273) harboured different gene clusters responsible for the production of polyketides, lipopeptides, bacteriocins and lantibiotics putatively involved in controlling bacterial leaf spot caused by *Xanthomonas* species (Table 32.3).

TABLE 32.3

Presence of genes belonging to biosynthetic clusters encoding secondary metabolites of *Bacillus amyloliquefaciens* subsp. *plantarum* and *Paenibacillus polymyxa* isolates displaying the highest anti-*Xanthomonas* activity

| | *Bacillus amyloliquefaciens* subsp. *plantarum* | | *Paenibacillus polymyxa* | | |
|---|---|---|---|---|---|
| Gene clusters | 71 | VFb49 | To99 | TFr101 | 273 |
| Polyketides, synthesized by Polyketide Synthetases (PKSs) | | | | | |
| Bacillaene | + | + | + | − | + |
| Difficidin | + | + | − | − | − |
| Macrolactin | + | − | − | − | − |
| Polyketides, synthesized by hybrid PKSs and non-ribosomal peptide synthetases (NRPSs) | | | | | |
| Kalimantacin/batumin | + | − | − | − | − |
| Myxovirescin | − | − | − | − | + |
| Nosperin | − | − | + | − | + |
| Lipopeptides, synthesized by NRPSs | | | | | |
| Surfactin | + | + | − | − | − |
| Fengycin | + | + | − | − | − |
| Plipastatin | − | + | − | − | − |
| Iturin | + | + | − | − | − |
| Bacilysin | + | + | − | − | − |
| Bacillibactin | + | + | − | − | − |
| Bacillomycin | − | − | + | + | − |
| Locillomycin | − | + | − | − | − |
| Paenilarvin | − | − | + | − | − |
| Pelgipeptin | − | − | + | + | − |
| Polymyxin | − | − | + | + | + |
| Paenibacterin | − | − | + | − | + |
| Fusaricidin | − | − | + | + | + |
| Bacitracin | − | − | − | + | + |
| Tridecaptin | − | − | − | + | + |
| Peptides, synthesized by Ribosomal Peptide Synthetases (RPSs) | | | | | |
| Plantathiazolicin/plantazolicin | + | − | − | − | − |
| Bacteriocin | + | − | − | − | − |
| Lantipeptides, ribosomally synthesized and post-translationally modified | | | | | |
| Subtilin | − | + | − | − | − |
| Paenicidin B | − | − | − | + | − |
| Paenibacillin | − | − | − | + | − |

"−": absence or no detection of the gene cluster;
"+": presence or detection of the gene cluster For example, the genome of *B. amyloliquefaciens* subsp. *plantarum* 71 resulted in the identification of gene clusters for the synthesis of polyketides such as bacillaene, difficidin, macrolactin. It is interesting to note that *B. amyloliquefaciens* subsp. *plantarum* VFb49 does not possess gene cluster encoding macrolactin production, while bacillaene and difficidin gene clusters were revealed in its genome. Among gene clusters involved in polyketide production by *P. polymyxa* isolates, the genes clusters responsible for the synthesis of bacillaene and nosperin were revealed in *P. polymyxa* isolates To99 and 273. The genes encoding kalimantacin/batumin and myxovirescin were discovered in *B. amyloliquefaciens* subsp. *plantarum* 71 and *P. polymyxa* 273 genomes (Table 32.3).

Interestingly, only the genomes of *B. amyloliquefaciens* subsp. *plantarum* isolates 71 and VFb49 resulted in the identification of gene clusters responsible for the synthesis of non-ribosomal lipopeptides (NR-Ps) such as surfactin, fengycin, plipastatin (only for VFb49 isolate), iturin, bacilysin, bacillibactin, locillomycin (only for VFb49 isolate), while the genome of *P. polymyxa* isolates does not possess these gene clusters. In contrast, all three isolates (To99, TFr101 and 273) of *P. polymyxa* possess gene cluster responsible for the synthesis of NRPs such as polymyxin and fusaricidin. Gene clusters involved in bacillomycin and pelgipeptin biosynthesis were found in *P. polymyxa* isolates To99 and TFr101. Gene cluster responsible for tridecaptin and bacitracin synthesis was discovered in the genome of *P. polymyxa* isolates TFr101 and 273. Only the genome of *P. polymyxa* To99 possesses gene clusters involved in synthesis of paenilarvin and paenibacterin.

Gene clusters responsible for the peptide biosynthesis by RPSs such as plantathiazolicin/plantazolicin and bacteriocins were detected only in the genome of *B. amyloliquefaciens* subsp. *plantarum* 71. Among gene clusters involved in the biosynthesis of lantipeptides, *B. amyloliquefaciens* subsp. *plantarum* VFb49 possesses gene cluster for subtilin, while gene clusters encoding paenicidin B and paenibacillin biosynthesis are found in the genome of *P. polymyxa* TFr101 (Table 32.3).

The genomes of both isolates (71 and VFb49) of *B. amyloliquefaciens* subsp. *plantarum* possessing anti-*Xanthomonas* activity harbour gene clusters involved in the biosythensis of cyclic lipopeptides such as surfactin, fengycin, plipastatin and iturin; as well as of the siderophore, bacillibactin. The isolate VFb49 also harbour gene clusters involved in the biosythensis of locillomycin, a new family of cyclic lipopeptides (Luo et al., 2015).

j) Example 8

Greenhouse Trials

Two greenhouse trials were conducted to determine the efficacy of metabolites and/or live bacterial strains to control bacterial leaf spots, as compared to standard chemicals agents. The two greenhouse trials were conducted by FarmForest at the University of Ottawa, the first in 2014 and the second in 2015. In general, each plot consisted of at least 6 tomato plants raised from seed in the greenhouse. Each treatment was replicated at least 4 times (24 plants per treatment total). The plants were maintained in conditions similar to those of commercial greenhouse practice, with the appropriate use of fertilizers and insecticides. Plants were inoculated with a virulent strain of *Xanthomonas gardneri*, two days after the initial application of the treatments. The copper fungicide (Kocide™ 3000) was used at 1.68 kg/ha+ Tanos at 0.42 kg/ha with 200 L/ha water volume. Initial treatments were applied 2 DBI as foliar spray, followed by foliar spray applications every 7 days+/−1 day for 4 more weeks for a total of 5 applications.

Figure 20:
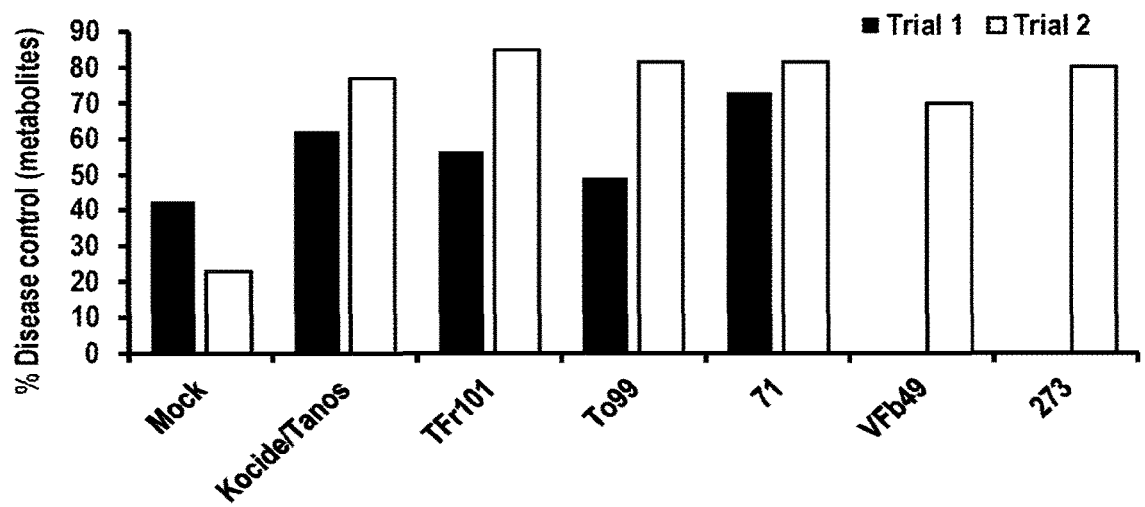
Figure 21:
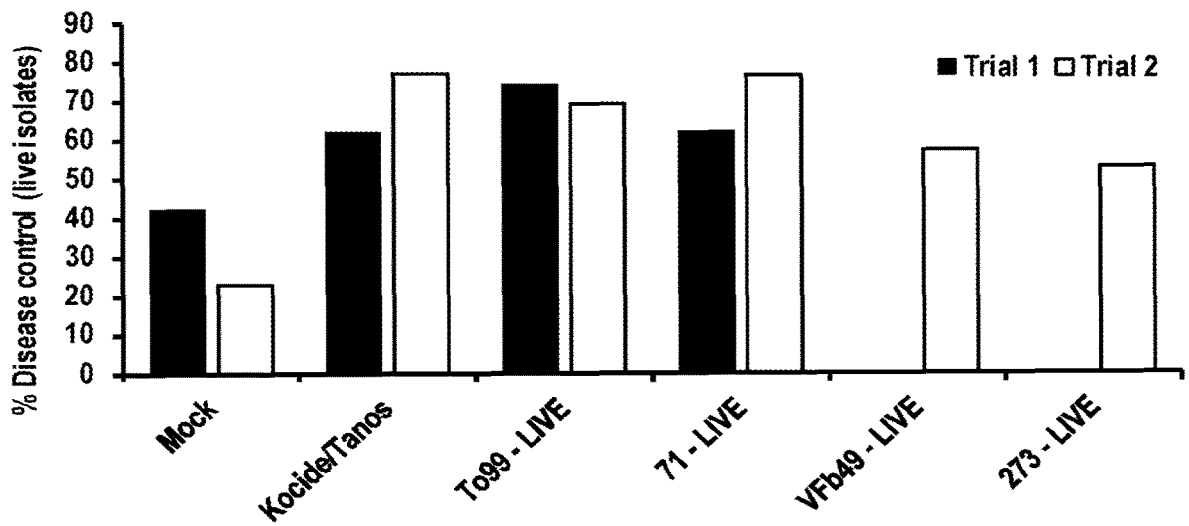

The results of the two greenhouse trials are shown below in Tables 33-35 and FIGS. 20-23. "LIVE" indicates that live strains were administered instead of only metabolites. In general, the results show that all treatments, whether metabolites or live strains, had an effect in controlling the *Xanthomonas gardneri* and were much better than untreated or Mock (Media used for growth). In some case, the treatments were even equal or better than Copper/Tanos standards. FIG. 20 shows the disease control percentage of the metabolites compared to Copper/Tanos mixture in both trials. FIG. 21 shows the disease control percentage of the live isolates compared to Copper/Tanos mixture in both trials. FIG. 22 shows the AUDPC disease control percentage of the metabolites compared to Copper/Tanos mixture in both trials. FIG. 23 shows the AUDPC disease control percentage of the live isolates compared to Copper/Tanos mixture in both trials.

TABLE 33

Efficacy of the treatments compared to Copper/Tanos mixture in two consecutive greenhouse trials

| Efficacy of treatments | FarmForest 2014 | FarmForest 2015 |
|---|---|---|
| Untreated | 0 | 0 |
| Mock | 34 | 28 |
| Control (Copper/Tanos) | 67 | 75 |
| *B. amyloliquefaciens* subsp. *plantarum* 71 | 72 | 81 |
| *P. peoriae* To99 | 49 | 85 |
| *P. peoriae* TFr101 | 47 | 84 |
| *B. amyloliquefaciens* subsp. *plantarum* VFb49 | Not tested | 64 |
| *P. peoriae* 273 | Not tested | 77 |
| *B. amyloliquefaciens* subsp. *plantarum* 71-LIVE | 41 | 76 |
| *P. peoriae* To99-LIVE | 79 | 63 |
| *B. amyloliquefaciens* subsp. *plantarum* VFb49 LIVE | Not tested | 57 |
| *P. peoriae* 273-LIVE | Not tested | 56 |

TABLE 34

Details of the first trial conducted by FarmForest at the University of Ottawa

| FarmForest Trial 2014 | % Damage | Sign | % Ctrl | AUDPC | Sign | % Ctrl |
|---|---|---|---|---|---|---|
| UTC | 17.7 | a | 0 | 202 | a | 0 |
| Mock | 10.2 | b | 42 | 132.7 | a b | 34 |
| Kocide/Tanos | 6.7 | b c | 62 | 66.4 | b c d | 67 |
| *P. peoriae* TFr101 | 7.7 | b c | 56 | 108.6 | d | 46 |
| *P. peoriae* To99 | 9 | b c | 49 | 104.3 | b c d | 48 |
| *B. amyloliquefaciens* subsp. *plantarum* 71 *B. amyloliquefaciens* subsp. *plantarum* VFB49 *P. peoriae* 273 | 4.8 | c | 73 | 56.1 | d | 72 |

TABLE 34-continued

Details of the first trial conducted by FarmForest at the University of Ottawa

| FarmForest Trial 2014 | % Damage | Sign | % Ctrl | AUDPC | Sign | % Ctrl |
|---|---|---|---|---|---|---|
| P. peoriae To99-LIVE | 4.6 | c | 74 | 42.3 | c d | 79 |
| B. amyloliquefaciens subsp. plantarum 71-LIVE | 6.7 | b c | 62 | 119.6 | bc | 41 |
| B. amyloliquefaciens subsp. plantarum VFb49-LIVE | | | | | | |
| P. peoriae 273-LIVE | | | | | | |

In the Table above, the letters a, b, c, and d indicate statistical significance.

TABLE 35

Details of the second trial conducted by FarmForest at the University of Ottawa

| FarmForest Trial 2015 | % Damage | Sign | % Ctrl | AUDPC | Sign | % Ctrl |
|---|---|---|---|---|---|---|
| UTC | 29.2 | a | 0 | 364.6 | a | 0 |
| Mock | 22.5 | ab | 23 | 236.3 | bc | 35 |
| Kocide ™ 3000 | 6.7 | cd | 77 | 89.7 | de | 75 |
| P. peoriae TFr101 | 4.4 | d | 85 | 58.3 | de | 84 |
| P. peoriae To99 | 5.4 | cd | 82 | 52.5 | e | 86 |
| B. amyloliquefaciens subsp. plantarum 71 | 5.4 | cd | 82 | 70 | de | 81 |
| B. amyloliquefaciens subsp. plantarum VFb49 | 8.8 | cd | 70 | 130.5 | e | 64 |
| P. peoriae 273 | 5.8 | cd | 80 | 83.1 | de | 77 |
| P. peoriae To99-LIVE | 9 | cd | 69 | 134.2 | cde | 63 |
| B. amyloliquefaciens subsp. plantarum 71-LIVE | 6.9 | cd | 76 | 86.8 | de | 76 |
| B. amyloliquefaciens subsp. plantarum VFb49-LIVE | 12.5 | cde | 57 | 157.5 | cd | 57 |
| P. peoriae 273-LIVE | 13.8 | cde | 53 | 160.4 | bcd | 56 |

In the Table above, the letters a, b, c, and d indicate statistical significance.

The present description refers to a number of documents, the content of which is herein incorporated by reference in their entirety. The scope of the claims should not be limited by the preferred embodiments set forth in the examples, but should be given the broadest interpretation consistent with the description as a whole.

REFERENCES

Agarry et al., "Antagonistic properties microorganisms associated with cassava (Manihotesculenta Crantz) products". *African Journ. Biotechnol*. Vol. 4 (7). P. 627-632, 2005.

Aguilera et al., "*Paenibacillus jamilae* sp. nov., an exopolysaccharide-producing bacterium able to grow in olive-mill wastewater", *Int J Syst Evol Microbiol*, 2001. 51(Pt 5): p. 1687-92.

Athukorala et al., "Identification of antifungal antibiotics of *Bacillus* species isolated from different microhabitats using polymerase chain reaction and MALDI-TOF mass spectrometry". *Can J Microbiol*, 2009. 55(9): p. 1021-32.

Ayed et al., "Enhancement of solubilization and bidegradation of diesel oil by biosurfactant from *Bacillus amyloliquefaciens* An6." *International Biodeterioration and Biodegradation*. 2015. 99: 8-14.

Baldwin et al., "Multilocus sequence typing scheme that provides both species and strain differentiation for the *Burkholderia cepacia* complex". *J Clin Microbiol*, 2005. 43(9): p. 4665-73.

Ben Ayed et al. (2015). "Enhancement of solubilization and biodegradation of diesel oil by biosurfactant from *Bacillus amyloliquefaciens* An6." *International Biodeterioration & Biodegradation* 99: 8-14.

Cawoy et al. (2011). "*Bacillus*-based biological control of plant diseases." Pesticides in the modern world—pesticides use and management. *InTech, Rijeka*: 273-302.

Chen et al. (2008). "Isolation and characterization of lipopeptide antibiotics produced by *Bacillus subtilis*." *Lett Appl Microbiol* 47(3): 180-186.

Chen et al. (2009). "Difficidin and bacilysin produced by plant-associated *Bacillus amyloliquefaciens* are efficient in controlling fire blight disease." *J Biotechnol* 140(1-2): 38-44.

Chung et al., "Isolation and partial characterization of *Bacillus subtilis* ME488 for suppression of soilborne pathogens of cucumber and pepper". *Appl Microbiol Biotechnol*, 2008. 80(1): p. 115-23.

Compaore et al., "*Bacillus amyloliquefaciens* ssp. *plantarum* strains as potential protective starter cultures for the production of Bikalga, an alkaline fermented food". *J Appl Microbiol*, 2013. 115(1): p. 133-46.

da Mota et al., "Assessment of the diversity of *Paenibacillus* species in environmental samples by a novel rpoB-based PCR-DGGE method". *FEMS Microbiol Ecol*, 2005. 53(2): p. 317-28.

Dagher et al., "Synergistic activity of peracetic acid and at least one SAR inducer for the control of pathogens in and onto growing plants", PCT patent application publication number: WO/2012/051699, 2012.

Dahllof et al., "rpoB-based microbial community analysis avoids limitations inherent in 16S rRNA gene intraspecies heterogeneity". *Appl Environ Microbiol*, 2000. 66(8): p. 3376-80.

De Clerck et al., "Genotypic diversity among *Bacillus lichenformis* strains from various sources". *FEMS Microbiol Lett*, 2004. 231(1): p. 91-8.

Dye et al., In: Young J. M., Dye D. W., Bradbury J. F., Panagopoulos C G & Robbs C. F. "A proposed nomenclature and classification for plant pathogenic bactia." *New Zealand Journal of Agricultural Research*. 1939. 39: 413-416.

Frank et al., "Critical evaluation of two primers commonly used for amplification of bacterial 16S rRNA genes". *Appl Environ Microbiol*, 2008. 74(8): p. 2461-70.

Gonzalez et al., "Polyphasic identification of closely related *Bacillus subtilis* and *Bacillus amyloliquefaciens* isolated from dairy farms and milk powder". *Journal of Microbiology, Biotechnology and Food Science*. 2013. 2(5): p. 2326-2331.

Gordillo et al., "Preliminary study and improve the production of metabolites with antifungal activity by a *Bacillus* sp. strain IBA 33." Microbiology Insights. 2009; 2:15-24.

Goris et al., "DNA-DNA hybridization values and their relationship to whole-genome sequence similarities." *Int J Syst Evol Microbiol*. 2007 January; 57(Pt 1):81-91.

Grantastein, "Fire blight—current products, research grants and regulatory status". *Certis USA workshop*, Oct. 8, 2014. Powerpoint slide 7.

Humber, "Fungi: preservation of cultures". *Chapter V-5: Manual of Techniques in Insect Pathology*/Edited by Lauwrence Lacey. P. 269-278. 1997.

International Seed Federation, "Method for the detection of *Xanthomonas* spp. on Pepper Seed", P. 1-7, 2011.

Jones et al., "Bacterial spot-worldwide distribution, importance and review". *Acta Horticulturae* 695: 27-33, 2005.

Jones et al., Reclassification of the xanthomonads associated with bacterial spot disease of tomato and pepper. *Syst Appl Microbiol*, 2004. 27(6): p. 755-62.

Kabore et al., "Bacteriocin formation by dominant aerobic sporeformers isolated from traditional maari". *Int J Food Microbiol*, 2012. 154(1-2): p. 10-18.

Kim et al. (2015). "Biological characteristics of *Paenibacillus polymyxa* GBR-1 involved root rot of stored Korean ginseng." *Journal of Ginseng Research*.

Kunz et al., "International Development of strategies for fire blight control in organic fruit growing". *Acta Horticulturae*, 896: 431-436.

Li et al. (2014). "Responses of beneficial *Bacillus amyloliquefaciens* SQR9 to different soilborne fungal pathogens through the alteration of antifungal compounds production." *Front Microbiol* 5: 636.

Lindow et al., "Microbiology of the phyllosphere", *Appl Environ Microbiol*, 2003. 69(4): p. 1875-83.

Luo et al. (2015). "Unusual Biosynthesis and Structure of Locillomycins from *Bacillus subtilis* 916." *Appl Environ Microbiol* 81(19): 6601-6609.

Martin and Rygiewicz, "Fungal-specific PCR primers developed for analysis of the ITS region of environmental DNA extracts". *BMC Microbiol*, 2005. 5: p. 28.

Meng et al., "Characterizing a novel strain of *Bacillus amyloliquefaciens* BAC03 for potential biological control application." *Journal of Applied Microbiology*. 2012. 113: 1165-1175.

Nakamura, "*Bacillus-Polymyxa* (Prazmowski) Mace 1889 Deoxyribonucleic-Acid Relatedness and Base Composition", *International Journal of Systematic Bacteriology*, 1987. 37(4): p. 391-397.

Obradovic et al., "Management of tomato bacterial spot in the field by foliar applications of bacteriophages and SAR inducers", *Phytopathology* 92:S60, 2002.

PM 7/110 (1) *Xanthomonas* spp. (*Xanthomonas euvesicatoria, Xanthomonas gardneri, Xanthomonas perforans, Xanthomonas vesicatoria*) causing bacterial spot of tomato and sweet pepper. European and Mediterian Plant Protection Organization (EPPO). 2013. 43: 7-20.

Potnis et al., "Comparative genomics reveals diversity among xanthomonads infecting tomato and pepper." *Genomics*. 2011. 12: 146.

Priest et al., "*Bacillus-Amyloliquefaciens* Sp-Nov", Nom Rev. International *Journal of Systematic Bacteriology*, 1987. 37(1): p. 69-71.

Promega, pGEM®-T and pGEM®-T Easy Vector Systems Technical Manual. 2010.

Pusey et al., "Epiphytic bacteria and yeasts on apple blossoms and their potential as antagonists of *Erwinia amylovora*". Phytopathology, 2009. 99(5): p. 571-81.

Ramarathnam et al., "Molecular and biochemical detection of fengycin- and bacillomycin D-producing *Bacillus* spp., antagonistic to fungal pathogens of canola and wheat". *Can J Microbiol*, 2007. 53(7): p. 901-11.

Rashid and Khan, "Evaluation of antagonistic organisms against *Xanthomonas campestris* pv. *malvacearum* in vitro and on the inoculated cotton plant for the control of bacterial blight disease", Pak. Agri. Sci., 37: 135-139, 2000.

Ray et al., "Mutants of *Xanthomonas oryzae* pv. *oryzae* deficient in general secretory pathway are virulence deficient and unable to secrete xylanase", *Mol Plant Microbe Interact*, 2000. 13(4): p. 394-401.

Remeeus and Sheppard, "Proposal for a new method for detecting *Xanthomonas axonopodis* pv. *phaseoli* on bean seeds", 2006. *ISTA Method Validation Report* 3. pp. 1-11.

Roberts and Koenraadt, "Detection of *Xanthomonas campestris* pv. *campestris* on *Brassica* spp.", 2014. *International Rules for Seed Testing*. Annexe to Chapter 7: Seed Health Testing Methods. 7-019-3/International Seed Testing Association (ISTA), Bassersdorf, Switzerland. P. 1-16.

Sutyak et al., "Isolation of the *Bacillus subtilis* antimicrobial peptide subtilosin from the dairy product-derived *Bacillus amyloliquefaciens*". *J Appl Microbiol*, 2008. 104(4): p. 1067-74.

Tapi et al., "New approach for the detection of non-ribosomal peptide synthetase genes in *Bacillus* strains by polymerase chain reaction". *Appl Microbiol Biotechnol*, 2010. 85(5): p. 1521-31.

Valdes et al., 2012, US patent publication number US/2012/0183517.

Vater et al., (2015). "Characterization of Novel Fusaricidins Produced by *Paenibacillus polymyxa*-M1 Using MALDI-TOF Mass Spectrometry." *J Am Soc Mass Spectrom* 26(9): 1548-1558.

Velmurugan et al., Evaluation of antagonistic activities of *Bacillus subtilis* and *Bacillus licheniformis* against wood-staining fungi: in vitro and in vivo experiments. *J Microbiol*, 2009. 47(4): p. 385-92.

Wang et al., "*Bacillus velezensis* is a later heterotrophic synonym of *Bacillus amyloliquefaciens*". *International Journal of Systematic and Evolutionary Microbiology* (2008), 58, 671-675

Wang et al., "*Pseudomonas taiwanensis* sp. nov., isolated from soil". *Int J Syst Evol Microbiol*, 2010. 60(Pt 9): p. 2094-8.

Weber et al., "antiSMASH 3.0—a comprehensive resource for the genome mining of biosynthetic gene clusters." *Nucl. Acids Res.* 2015. doi: 10.1093/nar/gkv437

Wood and Salzberg. "Kraken: ultrafast metagenomic sequence classification using exact alignments." *Genome Biology*. 2014. 15:R46. DOI: 10.1186/gb-2014-15-3-r46

Wulff et al., "Biochemical and molecular characterization of *Bacillus amyloliquefaciens*, *B. subtilis* and *B. pumilus* isolates with distinct antagonistic potential against *Xanthomonas campestris* pv. *campestris*." *Plant Pathology*. 2002; 51: 574-584.

Yamamoto and Harayama, "PCR amplification and direct sequencing of gyrB genes with universal primers and their application to the detection and taxonomic analysis of *Pseudomonas putida* strains". *Appl Environ Microbiol*, 1995. 61(3): p. 1104-9.

Yamamoto. and Harayama, "Phylogenetic relationships of *Pseudomonas putida* strains deduced from the nucleotide sequences of gyrB, rpoD and 16S rRNA genes". *Int J Syst Bacteriol*, 1998. 48 Pt 3: p. 813-9.

Yin et al., "Evaluation of the efficacy of endophytic *Bacillus amyloliquefaciens* against *Botryosphaeria dothidea* and other phytopathogenic microorganisms", *African Journal of Microbiology Research*. Vol. 5(4). P. 340-345, 2011.

Yokota et al., "Comparative study on sample preparation methods for the HPLC quantification of iturin from culture supernatant of an antagonistic *Bacillus* strain." *J ISSAAS* 2012; Vol. 18, N 1: 70-75.

Yoshida et al., "Antimicrobial Activity of Culture Filtrate of *Bacillus amyloliquefaciens* RC-2 Isolated from Mulberry Leaves", *Phytopathology*, 2001. 91(2): p. 181-7.

Zanatta et al., "Bioassay for selection of biocontroller bacteria against bean common blight (*Xanthomonas axonopodi* spv. *phaseoli*)". *Brazilian Journal of Microbiology*. Vol. 38. P. 511-515, 2007.

What is claimed:

1. A biopesticide having antimicrobial activity against phytopathogenic *Xanthomonas* species, said biopesticide comprising *Paenibacillus peoriae* TFr101 (NRRL B-67019) and metabolites thereof, and one or more agriculturally acceptable excipients, wherein said metabolites comprise fusaricidin, bacillomycin, pelgipeptin, bacitracin, tridecaptin, paenicidin B, paenibacillin, and polymyxin, and wherein the one or more agriculturally acceptable excipients comprises a surfactant and/or preservative.

2. The biopesticide of claim 1, wherein said *Paenibacillus peoriae* TFr101 does not harbor gene clusters responsible for the production of bacillaene, difficidin, macrolactin, kalimantacin/batumin, myxovirescin, nosperin, surfactin, fengycin, plipastatin, iturin, bacilysin, bacillibactin, locillomycin, paenilarvin, paenibacterin, plantathiazolicin/plantazolicin, bacteriocin, and subtilin.

3. The biopesticide of claim 1, wherein said biopesticide has antimicrobial activity against *Xanthomonas campestris, Xanthomonas perforans, X. euvesicatoria*, and *Xanthomonas gardneri*.

4. The biopesticide of claim 1, wherein cell-free supernatant of said *Paenibacillus peoriae* TFr101 does not exhibit auto-antimicrobial activity.

5. The biopesticide of claim 1, wherein the agriculturally acceptable excipient further comprises a non-toxic carrier, nutrients, UV protectant, sticker, spreader, and/or chelating agent.

6. The biopesticide of claim 1, wherein said composition is in the form of a liquid, concentrate, powder, tablet, gel, pellets, granules, or any combination thereof.

7. A method for controlling the growth of a pathogenic microorganism on a target plant or tissue, said method comprising contacting said target plant or tissue with the biopesticide of claim 1.

8. The method of claim 7, wherein the pathogenic microorganism is a phytopathogenic *Xanthomonas* species.

9. A biopesticide having antimicrobial activity against phytopathogenic *Xanthomonas* species, said biopesticide comprising *Paenibacillus peoriae* TFr101 (NRRL B-67019) and metabolites thereof, and one or more agriculturally acceptable excipients, wherein said metabolites comprise bacillomycin, pelgipeptin, polymyxin, fusaricidin, bacitracin, tridecaptin, paenicidin B, and paenibacillin, wherein said *Paenibacillus peoriae* TFr101 does not harbor gene clusters responsible for the production of bacillaene, difficidin, macrolactin, kalimantacin/batumin, myxovirescin, nosperin, surfactin, fengycin, plipastatin, iturin, bacilysin, bacillibactin, locillomycin, paenilarvin, paenibacterin, plantathiazolicin/plantazolicin, bacteriocin, and subtilin, wherein said biopesticide has antimicrobial activity against *Xanthomonas campestris, Xanthomonas perforans, X. euvesicatoria,* and *Xanthomonas gardneri,* wherein cell-free supernatant of said *Paenibacillus peoriae* TFr101 does not exhibit auto-antimicrobial activity, and wherein the one or more agriculturally acceptable excipients comprises a surfactant and/or preservative.

10. A method for controlling the growth of a pathogenic microorganism on a target plant or tissue, said method comprising contacting said target plant or tissue with the biopesticide of claim 9.

11. The method of claim 10, wherein the pathogenic microorganism is a phytopathogenic *Xanthomonas* species.

* * * * *

UNITED STATES PATENT AND TRADEMARK OFFICE
CERTIFICATE OF CORRECTION

| | | |
|---|---|---|
| PATENT NO. | : 12,161,121 B2 | Page 1 of 1 |
| APPLICATION NO. | : 17/373703 | |
| DATED | : December 10, 2024 | |
| INVENTOR(S) | : Fadi Dagher, Eric Deziel and Snizhana Olishevska | |

It is certified that error appears in the above-identified patent and that said Letters Patent is hereby corrected as shown below:

On the Title Page

Item (73) Assignee:
Please delete "Instut" and insert --Institut--

Signed and Sealed this
Thirtieth Day of December, 2025

John A. Squires
*Director of the United States Patent and Trademark Office*